United States Patent
Olsson et al.

(10) Patent No.: US 10,090,498 B2
(45) Date of Patent: Oct. 2, 2018

(54) MODULAR BATTERY PACK APPARATUS, SYSTEMS, AND METHODS INCLUDING VIRAL DATA AND/OR CODE TRANSFER

(71) Applicants: Mark S. Olsson, La Jolla, CA (US); David A. Cox, San Diego, CA (US); Alexander L. Warren, San Diego, CA (US); Joseph B. Phaneuf, San Diego, CA (US)

(72) Inventors: Mark S. Olsson, La Jolla, CA (US); David A. Cox, San Diego, CA (US); Alexander L. Warren, San Diego, CA (US); Joseph B. Phaneuf, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 13/925,636

(22) Filed: Jun. 24, 2013

(65) Prior Publication Data
US 2014/0154535 A1    Jun. 5, 2014

Related U.S. Application Data

(60) Provisional application No. 61/663,617, filed on Jun. 24, 2012.

(51) Int. Cl.
*H01M 2/12* (2006.01)
*H01M 2/10* (2006.01)
(Continued)

(52) U.S. Cl.
CPC ....... *H01M 2/1264* (2013.01); *H01M 2/1061* (2013.01); *H01M 10/425* (2013.01); *H01M 10/613* (2015.04); *H01M 10/623* (2015.04); *H01M 10/647* (2015.04); *H01M 10/6554* (2015.04); *H01M 2/0267* (2013.01); *H01M 2/1094* (2013.01); *H01M 2/20* (2013.01);
(Continued)

(58) Field of Classification Search
USPC ................ 429/120, 93, 82, 53–56, 163–187
See application file for complete search history.

(56) References Cited

U.S. PATENT DOCUMENTS 6,191,554 B1  2/2001 Nakane et al.
6,229,280 B1  5/2001 Sakoh et al.
(Continued)

OTHER PUBLICATIONS

Deepsea Power & Light, Inc. "SeaBattery Power Module," Specifications, Apr. 4, 2014, http://www.deepsea.com/wp-content/uploads/SeaBattery_SpecSheet_04-04-2014.pdf, San Diego, CA, USA.

*Primary Examiner* — Imran Akram
(74) *Attorney, Agent, or Firm* — Steven C. Tietsworth, Esq.

(57) ABSTRACT

Intelligent modular battery pack assemblies and associated charging and docking systems are disclosed. In one embodiment a modular battery pack assembly may include an outer casing assembly, a thermally conductive structural housing element configured to house a battery assembly in an interior volume, a lid element configured to cover the opening in the thermally conductive structural housing element and mechanically strengthen the thermally conductive structural housing element, and a circuit element disposed to electrically couple the battery cell to a battery-powered device and provide viral data transfer between the battery and a coupled device.

16 Claims, 44 Drawing Sheets

(51) Int. Cl.
  *H01M 10/42* (2006.01)
  *H01M 10/647* (2014.01)
  *H01M 10/623* (2014.01)
  *H01M 10/6554* (2014.01)
  *H01M 10/613* (2014.01)
  *H01M 2/02* (2006.01)
  *H01M 2/20* (2006.01)
  *H01M 10/655* (2014.01)

(52) U.S. Cl.
  CPC .. *H01M 10/655* (2015.04); *H01M 2010/4278* (2013.01); *H01M 2220/30* (2013.01)

(56) References Cited

U.S. PATENT DOCUMENTS

| | | | |
|---|---|---|---|
| 6,314,406 B1 * | 11/2001 | O'Hagan | G06K 7/0004 705/14.23 |
| 6,350,149 B1 | 2/2002 | Nakane | |
| 6,433,515 B2 | 8/2002 | Sakakibara | |
| 6,537,694 B1 | 3/2003 | Sugiura et al. | |
| 6,563,290 B2 | 5/2003 | Sakakibara et al. | |
| 6,566,005 B1 | 5/2003 | Shimma et al. | |
| 6,577,104 B2 | 6/2003 | Sakakibara | |
| 7,030,590 B2 | 4/2006 | Sakakibara et al. | |
| 8,672,162 B2 * | 3/2014 | Okouchi | B25F 5/00 137/846 |
| 2002/0079867 A1 | 6/2002 | Sakakibara et al. | |
| 2002/0182482 A1 * | 12/2002 | Hockaday | H01M 2/0222 429/86 |
| 2003/0082439 A1 | 5/2003 | Sakakibara | |
| 2004/0135542 A1 | 7/2004 | Ito | |
| 2004/0145349 A1 | 7/2004 | Mori | |
| 2004/0167644 A1 * | 8/2004 | Swinney | H04M 11/10 700/94 |
| 2004/0239293 A1 | 12/2004 | Mori et al. | |
| 2006/0087286 A1 * | 4/2006 | Phillips | B25F 5/00 320/114 |
| 2007/0229656 A1 * | 10/2007 | Khait | A61B 1/041 348/77 |
| 2008/0220324 A1 | 9/2008 | Phillips et al. | 429/120 |
| 2011/0006729 A1 * | 1/2011 | Matthias | B25H 3/006 320/107 |
| 2011/0042156 A1 * | 2/2011 | Vincenz | B62H 5/001 180/206.5 |
| 2011/0057603 A1 * | 3/2011 | Marty | H02J 7/0075 320/106 |
| 2012/0312161 A1 * | 12/2012 | Reitzle | B01D 53/268 95/45 |

* cited by examiner

MODULAR BATTERY PACK APPARATUS, SYSTEMS, AND METHODS INCLUDING VIRAL DATA AND/OR CODE TRANSFER

CROSS-REFERENCE TO RELATED APPLICATIONS

This application claims priority under 35 U.S.C. § 119(e) to U.S. Provisional Patent Application Ser. No. 61/663,617, entitled MODULAR BATTERY PACK APPARATUS, SYSTEMS, AND METHODS INCLUDING VIRAL DATA AND/OR CODE TRANSFER, filed Jun. 24, 2012, the content of which is incorporated by reference herein for all purposes.

FIELD

This disclosure relates generally to modular sealed battery pack systems for use in powering portable electronic devices and tools or instruments. More specifically, but not exclusively, the disclosure relates to modular sealed battery packs configured to provide enhanced performance and safety features, along with associated apparatus, systems, and methods for monitoring and controlling operation and use of such battery packs and for transferring code and/or data between computer systems and battery packs or chargers as well as between battery packs and other enabled devices such as tools, instruments, or other electronic devices.

BACKGROUND

Competition to provide new and/or improved portable electronic devices continues to increase for both consumer and industrial applications. Consequently, higher density batteries that enable prolonged use and/or higher output power or duration are in high demand. In some applications, it is both desirable and necessary to operate an electronic device at remote locations without access to sources of AC power, such as electrical outlets, generators, or inverters. The inherent unpredictability and variability of conditions in many remote environments, such as variations in humidity, precipitation, and/or elevated ambient temperatures during operation and/or storage of associated batteries, compounded with the volatile chemistry of high-energy battery cells, creates additional challenges with respect to battery pack performance and safety.

A common way of providing battery power to portable devices is through use of detachable battery packs. Battery packs used to power portable electronic devices often employ rechargeable Lithium-ion based battery cells, such as Lithium-ion polymer battery (also known as Li-Poly, Li-Pol, or LiPo) cells. While Lithium-ion based battery cells are well suited for large-capacity battery applications, increasing the energy density within battery cells increases the amount of heat that will be exothermically released when the battery cells are discharged. However, if the rate of heat generated within the battery cells exceeds the rate of heat lost to the environment, the risk of explosion, fire, and the release of hazardous decomposition products increases. Likewise, exposing such a system to elevated external temperatures is equally dangerous. Thus, heat dissipation remains a challenge for high energy density battery packs.

While various approaches to regulate the internal temperature of battery packs are known in the art, these approaches may lead to a reduction in performance and/or an increase in battery pack volume, manufacturing cost, and/or power requirements. For example, some battery packs rely on a temperature feedback shut-off control to regulate the internal temperature of the battery pack. If the internal temperature of the battery pack exceeds the recommended operating temperature, the output of the power supply is automatically adjusted, or the circuit is simply cut off.

Existing battery packs may also rely on forced air and/or liquid cooling systems to reduce internal battery pack temperature. For example, a fan to blow air, or a pump to move cooling fluid, such as an ethylene glycol mixture, may be used to dissipate heat from the battery cells. However, this approach adds volume to the battery pack, increases manufacturing costs, and requires energy to run. While some existing unsealed battery packs have implemented safety valves and/or vents to release heat and/or pressure, these unsealed battery packs may not be safely stored and/or operated in moist environments. Further, if a conventional battery pack fails to dissipate the excess heat at a sufficient rate, there is no secondary safeguard in place to mitigate the effects of catastrophic failure.

Accordingly, there is a need in the art to address the above-described as well as other problems.

SUMMARY

The present disclosure relates generally to a modular battery pack apparatus and systems, as well as methods for making and using such apparatus.

In one aspect, the disclosure relates to a modular sealed battery enclosure. The enclosure may include, for example, an outer casing assembly. The enclosure may further include a thermally conductive structural housing element configured to house a battery assembly in an interior volume, where the thermally conductive structural housing element may include an opening for placement of the battery assembly within the inner volume. The enclosure may further include a lid element configured to cover the opening in the thermally conductive structural housing element and/or mechanically strengthen the thermally conductive structural housing element. The lid element may include a circuit element disposed to electrically couple the battery cell to a battery-powered device. The enclosure may further include a vent assembly configured to allow exchange of gases to and from the interior volume and/or restrict entry of water into the interior volume.

In another aspect, the disclosure relates to a battery system. The battery system may include, for example, a receiver assembly. The battery system may further include a sealed battery assembly configured to connect to the receiver assembly. The sealed battery assembly may include, for example, an outer casing assembly including a sealing assembly configured to seal one or more contacts between the outer casing assembly and the receiver assembly. The sealed battery assembly may further include a thermally conductive structural housing element configured to house a battery assembly in an interior volume. The thermally conductive structural housing element may include an opening for placement of the battery assembly within the inner volume. The thermally conductive structural housing element may further include a lid element configured to cover the opening in the thermally conductive structural housing element and mechanically strengthen the thermally conductive structural housing element. The lid element may include a circuit element disposed to electrically couple the battery cell to a battery-powered device. The sealed battery assembly may further include a vent assembly configured to allow exchange of gases to and from the interior volume and/or restrict entry of water into the interior volume.

In another aspect, the disclosure relates to an intelligent battery pack. The intelligent battery pack may include, for example, a battery assembly. The intelligent battery pack may further include an electronic circuit element electrically coupled to the battery assembly. The electronic circuit element may be configured to determine a battery state or condition. The intelligent battery pack may further include a housing assembly configured to enclose the battery assembly and electronic circuit element. The housing assembly may include a release latch assembly configured to mechanically release the battery pack from a connected device in response to a first user actuation. The latch assembly may be further configured to initiate determination of the battery state or condition in response to a first and/or subsequent user actuation.

In another aspect, the disclosure relates to non-transitory computer-readable media including instructions to implement the above-described methods, in whole or in part.

In another aspect, the disclosure relates to systems, devices, and apparatus to perform the above-described methods, in whole or in part.

In another aspect, the disclosure relates to means for performing the above-described methods, in whole or in part.

Additional aspects, features, and functionality are further described below in conjunction with the appended drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

Figure 1A:
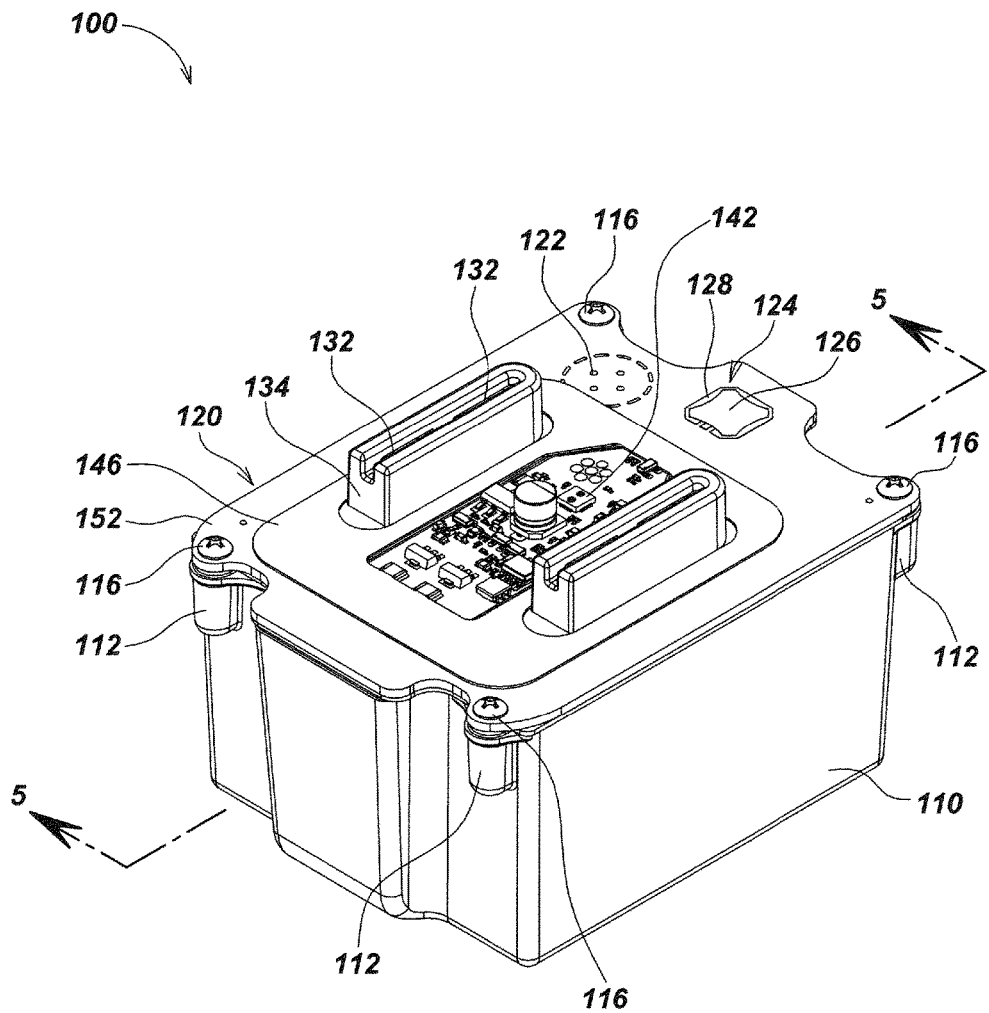
FIG. 1A is an isometric view of an embodiment of a sealed battery enclosure.

The present disclosure relates generally to modular battery pack apparatus and systems, as well as methods for making and using such apparatus and systems. Various embodiments of the present disclosure may provide a modular battery pack and associated system with an improved safety profile and performance. Embodiments of the modular battery pack apparatus and systems may be used in conjunction with various electronic devices, including buried object locators such as those described in U.S. patent application Ser. No. 13/041,320, filed Mar. 4, 2011, U.S. patent application Ser. No. 13/161,183, filed Jun. 15, 2011, U.S. patent application Ser. No. 10/268,641, filed Oct. 9, 2002, as well as other devices, such as camera devices and systems as described in U.S. Patent Application Ser. No. 61/430,932, instruments, tools, such as intelligent power tools such as saws, pressing machines, drills, powered screwdrivers, or other portable or modular tools or devices. The content of each of the above-described applications is hereby incorporated by reference herein in its entirety.

For example, in one aspect, the disclosure relates to a modular battery pack assembly. The modular battery pack assembly may include, for example, an outer casing assembly. The battery pack assembly may further include a thermally conductive structural housing element configured to house a battery assembly in an interior volume. The thermally conductive structural housing element may include an opening for placement of the battery assembly within the inner volume. The battery pack assembly may further include a lid element configured to cover the opening in the thermally conductive structural housing element and mechanically strengthen the thermally conductive structural housing element. The lid element may include a circuit element disposed to electrically couple the battery cell to a battery-powered device. The battery pack assembly may further include a vent assembly configured to allow exchange of gases to and from the interior volume and restrict entry of water into the interior volume.

In another aspect, the disclosure relates to an intelligent battery system. The intelligent battery system may include, for example, a receiver assembly and a sealed battery pack assembly. The sealed battery pack assembly may be configured to connect to the receiver assembly. The sealed battery pack assembly may include an outer casing assembly including a sealing assembly configured to seal one or more contacts between the outer casing assembly and the receiver assembly and a thermally conductive structural housing element configured to house a battery assembly in an interior volume. The thermally conductive structural housing element may include an opening for placement of the battery assembly within the inner volume. The sealed battery pack assembly may further include a lid element configured to cover the opening in the thermally conductive structural housing element and mechanically strengthen the thermally conductive structural housing element. The lid element may include a circuit element disposed to electrically couple the battery cell to a battery-powered device. The sealed battery pack assembly may further include a vent assembly configured to allow exchange of gases to and from the interior volume while restricting entry of water into the interior volume.

In another aspect, the disclosure relates to an intelligent battery pack. The battery pack may include, for example, a battery assembly, an electronic circuit element electrically coupled to the battery assembly, the electronic circuit element configured to determine a battery state or condition, and a housing assembly configured to enclose the battery assembly and electronic circuit element. The housing assembly may include a release latch assembly configured to mechanically release the battery pack from a connected device and initiate determination of the battery state or condition.

In another aspect, the disclosure relates to a modular battery pack apparatus. The modular battery pack apparatus may include, for example, a sealed battery enclosure configured for flame and/or rupture containment, moisture resistance, and/or thermal management. The sealed battery enclosure may be configured with a battery element enclosed within a housing. The housing may be attached or coupled to a lid element, which may be attached to or integral with a printed circuit board (PCB). A battery element may include, for example, at least one battery cell. The lid element may be configured with a vent element. The vent element may comprise one or more vent holes configured to allow gaseous materials to exit the sealed enclosure. The vent holes may be coupled to a selectively permeable membrane. The selectively permeable membrane may be a hydrophobic gas-permeable membrane. The PCB may further be configured with a dome switch, a plurality of status indicators, a male connecting element, and/or a plurality of conductive elements coupled to a plurality of contact assemblies. The status indicators may be light emitting diodes (LEDs) or other lighting elements.

Various additional aspects, details, features, and functions are described below in conjunction with the appended Drawing figures.

The following exemplary embodiments are provided for the purpose of illustrating examples of various aspects, details, and functions of apparatus and systems; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Modular Battery Pack Embodiments

Referring to FIG. 1A, an embodiment of a sealed battery enclosure 100 in accordance with certain aspects is illustrated. Sealed battery enclosure 100 may serve as, for example, a battery safety enclosure apparatus and/or system for providing mitigation of adverse battery events, such as excessive heat, fire or flames, rupture containment, or other safety-related conditions. In particular, sealed battery enclosure 100 may include a thermally conductive structural housing element, such as a housing 110, along with a lid or cover element, such as a lid assembly 120, which may be attached to or integral with a printed circuit board (PCB)

element, such as PCB element 152, which may be used to enclose, in a sealed fashion, a battery assembly (not shown in FIG. 1A) from ingress or water or other liquids, while allowing selective venting of the battery assembly and associated sealed volume. In an exemplary embodiment, a vent assembly may be disposed in or on the lid assembly 120, along with the PCB element 152, which may be integral with the lid assembly 120.

The thermally conductive structural housing element may be configured to provide a mechanically strong enclosure for the battery assembly to mitigate pressure and explosions, while facilitating efficient heat transfer to avoid battery shutdowns due to overheating, fire, or other heat-related problems. In an exemplary embodiment, a metal housing element may be used; however, in some embodiments other strong and thermally conductive materials, such as flame retardant plastics, polymers, ceramics, textiles, fibers, composite materials, or other equivalent materials, may also be used for the housing element.

In a typical embodiment, the thermally conductive structural housing assembly is configured to withstand explosions, fire, and release of hazardous byproducts, through appropriate selection of materials, shapes, structural elements, and the like, as well as to provide thermal heat transfer to reduce or minimize overheating through use of thermally conductive structural materials, such as metals, thermally conductive plastics, or equivalent materials.

The lid assembly 120 may include electronic circuits to monitor battery conditions, control battery operations, control battery charge and discharge, couple battery power to attached portable devices, such as locators, and/or provide related data or information, while also providing sealing for a battery assembly disposed in the interior volume of the thermally conductive structural housing element. Circuits and associated connections may be disposed on or in a PCB element 152 which may be attached or integral with the lid assembly 120. The lid assembly 120 may also be configured to include a vent element or assembly to facilitate transfer of gases while restricting entry of water or other liquids into the interior volume, as well as act as a pressure relief mechanism to release pressure in the event of fire or explosion of the battery assembly. For example, one or more vent holes 122 may be punched through lid assembly 120 to release the pressure from inside the sealed battery enclosure 100.

In addition, the lid assembly 120 may include electrical connectors or other elements to facilitate efficient transfer of electrical power from the battery to an associated electronic device during operation, as well as to facilitate charging of the battery pack through use of a battery charger, which may be an intelligent charger. In an exemplary embodiment, the lid assembly may be a mechanically strengthened printed circuit board (PCB) and/or may comprise a fire resistant PCB element layer, which may include the electronic circuits and/or electrical connectors, along with a structural layer, which may be a metal layer or other structural layer. The PCB element 152 or layer may be disposed on the exterior of the lid assembly 120, which may be denoted as a component side of the lid assembly 120, while the structural layer may be disposed on the interior (e.g., side in proximity to or in contact with the interior volume defined by the thermally conductive structural housing element).

The venting assembly or element may be disposed in the structural housing element and/or the lid assembly 120 and provide selective venting of the sealed enclosure 100 of a battery pack, which is typically the interior volume containing the battery assembly and associated battery cells. For example, the venting assembly may be configured to allow gases to pass into or out of the interior volume of the sealed battery enclosure 100, while resisting entry of water or other liquids or materials into the interior volume. In addition, the venting assembly may allow for rapid venting or pressure relief of the interior volume in the event of fire or explosion of the battery assembly or other materials, such as gases, within the interior volume (e.g., by serving as a pressure release mechanism).

Figure 6:
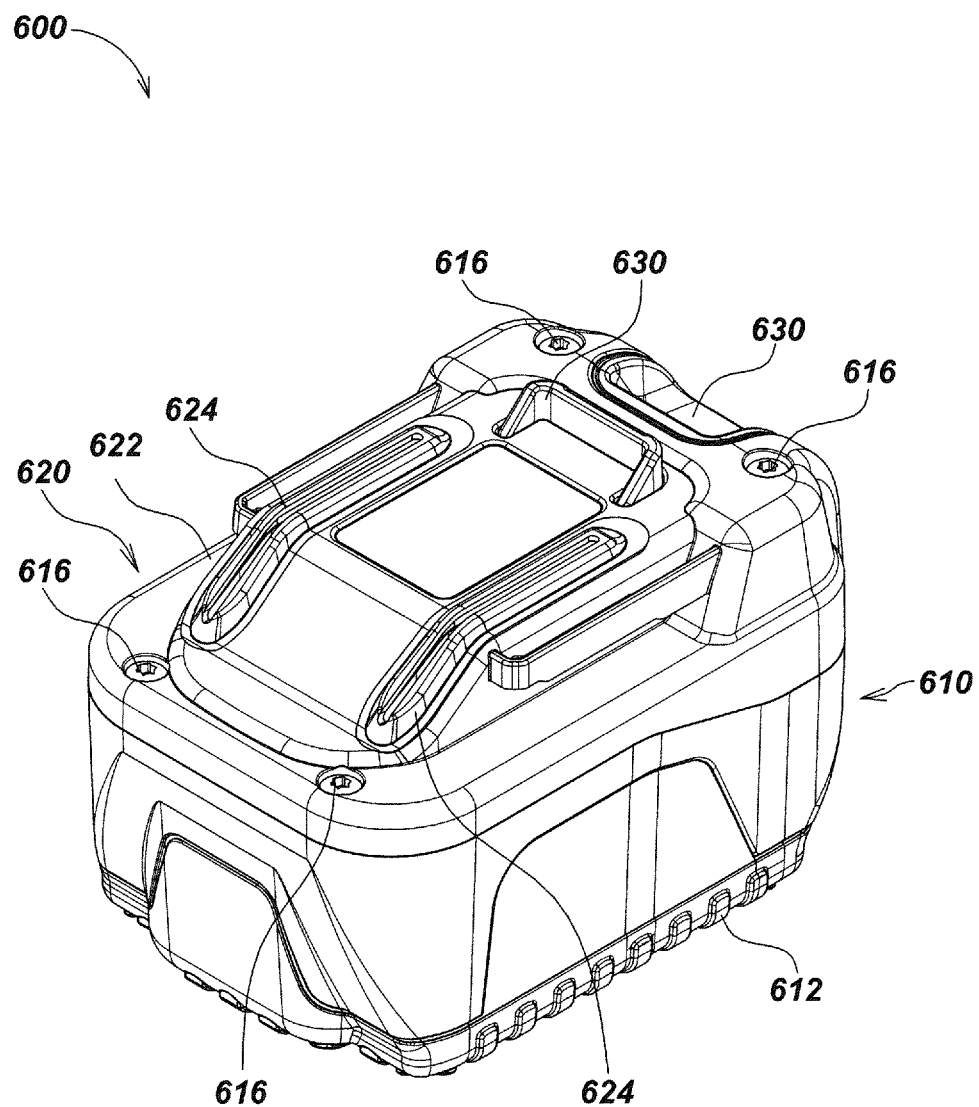
FIG. 6 is an isometric view of an embodiment of a battery pack module.

In addition, an outer casing element, such as shown in the embodiment of FIG. 6 and described subsequently herein, may enclose the thermally conductive structural housing element 110 and lid assembly 120 to provide a second layer of insulation and protection, as well as to facilitate mechanical and/or electrical coupling to a portable electronic device to which the battery is attached, such as a portable locator or other device. In an exemplary embodiment, the outer casing element comprises a molded plastic material; however, in some embodiments, the outer casing element may include other materials, such as metals, ceramics, composites, and the like.

Returning to the example embodiment of FIG. 1A, sealed battery enclosure 100 may include, for example, a battery assembly including one or more battery elements or cells (not shown), enclosed within an interior volume of a thermally conductive structural housing element, such as housing 110 as shown, which may be a diecast metal housing in an exemplary embodiment. A lid assembly, such as lid assembly 120 as shown, which may include a PCB element 152, may cover and seal the interior volume and battery assembly.

Housing 110 may be formed, molded, or cast with a suitable alloy to provide both sufficient thermal conductivity as a heat sink, and structural rigidity for mitigating adverse advents. For example, housing 110 may be formed as a single unit, from an aluminum alloy, such as A383, or from other metal alloys, such as copper alloys, etc. In some embodiments, housing 110 may be molded or otherwise fabricated from thermally conductive plastics, composites, or other materials.

Housing 110 may include a plurality of screw bosses 112, which may be formed integrally with housing 110, such that lid assembly 120 may be mounted with a plurality of screws, such as screws 116 as shown.

A lid element, such as lid assembly 120, may be configured to provide mechanical support to a battery assembly (not shown) when coupled to housing 110. This may be done by, for example, including circuit elements on one side of the lid assembly 120, and mechanical reinforcement elements, such as a metal layer or plate, on another side, or integral with the circuit elements. In an exemplary embodiment, the lid assembly 120 may be configured to include both an electronic circuit element which may be disposed on a PCB element, such as PCB element 152, along with a mechanical reinforcement element to increase the strength of the thermally conductive structural housing, and a venting element to allow transfer of gases and control discharge of pressure during a fire, explosion, or similar event.

For example, during a charge or discharge cycle, an increase in temperature exerted by the environment and/or generated by an exothermic reaction, may trigger decomposition and/or side-reactions, which may lead to the evolution of gases and/or production of undesired intermediates. Accumulation of such gases and/or undesired intermediates may lead to adverse effects, such as fire and/or rupture/explosion. Thus, providing sealed battery enclosure 100 with ventilation may prevent and/or reduce adverse effects caused by elevated internal pressure and temperature.

In an exemplary embodiment, the vent element may comprise one or more vent holes 122 (typically multiple holes 122) that may be punched or drilled through an area on the lid assembly 120, such as in the top of PCB element 152, to provide ventilation to the sealed battery enclosure 100. To facilitate sealing, the vent holes 122 may be covered by a material that allows transfer of gases while restricting entry of water and/or other liquids into the interior volume.

Other venting elements, such as pressure relief valves or other venting mechanisms, may also be used to provide venting and pressure relief in various embodiments. In addition, alternate venting assemblies and configurations may be used in some embodiments. For example, in some embodiments, a lid, such as lid assembly 120, may be configured to bend or otherwise transform in response to a predefined applied force. For example the lid assembly 120 may be configured such that when a force greater than a predetermined value, such as an expected minimum force generated by an explosion, is applied, the lid assembly 120 flexes, bends, breaks or otherwise distorts so as to release pressure and avoid a larger explosion upon complete structural failure of the lid assembly 120 or structural housing. In this way, an explosive failure may be controlled to reduce potential damage.

Lid assembly 120 may be configured for electrically interfacing a battery assembly and associated battery element(s) (not shown) with other electronic modules or components. For example, lid assembly 120 may be configured to mechanically support and electrically connect one or more electronic components using conductive pathways, tracks and/or signal traces, which may be etched from a conductive metal, such as copper, laminated onto a non-conductive substrate of the lid assembly 120. A battery assembly may be electrically interfaced with a module that is capable of receiving power and/or providing power. In one aspect, one or more battery contact elements 132 may be mounted to lid assembly 120 to electrically connect with a receiver module (not shown) when electrically connected to and/or secured onto one or more contact preload plates 134. Battery contact elements 132 may, for example, be soldered onto one or more conductive pads 230 (not shown in FIG. 1A) disposed on PCB element 152.

The circuitry of lid assembly 120 may include a PCB element 152, which may include a switching element, such as dome switch 124, which may be formed with a metal dome 126, such as, for example, a stainless steel dome, to provide a crisp, and positive tactile feedback mechanism upon compression. The base of dome switch 124 may rest on the outer rim of a primary circuit pathway 128, such that upon compression, the dome 126 may collapse and make contact with the secondary pathway (not shown), thereby completing the circuit. Dome switch 124 may be electrically connected to analog and/or digital electronic circuit elements, such as a battery control element 142 (as shown in FIG. 1A), which may include a microprocessor, microcontroller (μC), or other programmable logic device that may be used to monitor and/or control other circuitry of the sealed battery enclosure 100, as well as operation of the battery pack, such as during charge or discharge cycles. Battery control element 142 may include on-board circuit elements, such as a microprocessor, microcontroller, DSP, FPGA, or other programmable device, along with a memory element (not shown), to perform various signal conditioning, monitoring, control, and/or processing functions as described herein.

Lid assembly 120 may additionally include a sealing element, such as a face sealing element 146, which may be disposed on an external surface of PCB element 152 to provide a waterproof compartment for one or more electrical elements when housed in an outer housing element (not shown). For example, face sealing element 146, which may be a layer of silicone foam or other sealing material, may be sandwiched between the external or outer surface of PCB element 152 and the inner structure of the outer housing element (not shown) to provide a waterproof seal. This may be used to seal connections to external devices, such as chargers, locators or other instruments, or other devices to avoid shorts or other failures due to ingress of liquids, dust, etc. Other mechanisms for providing a waterproof compartment for one or more electrical elements may also be used in various embodiments.

Figure 1B:
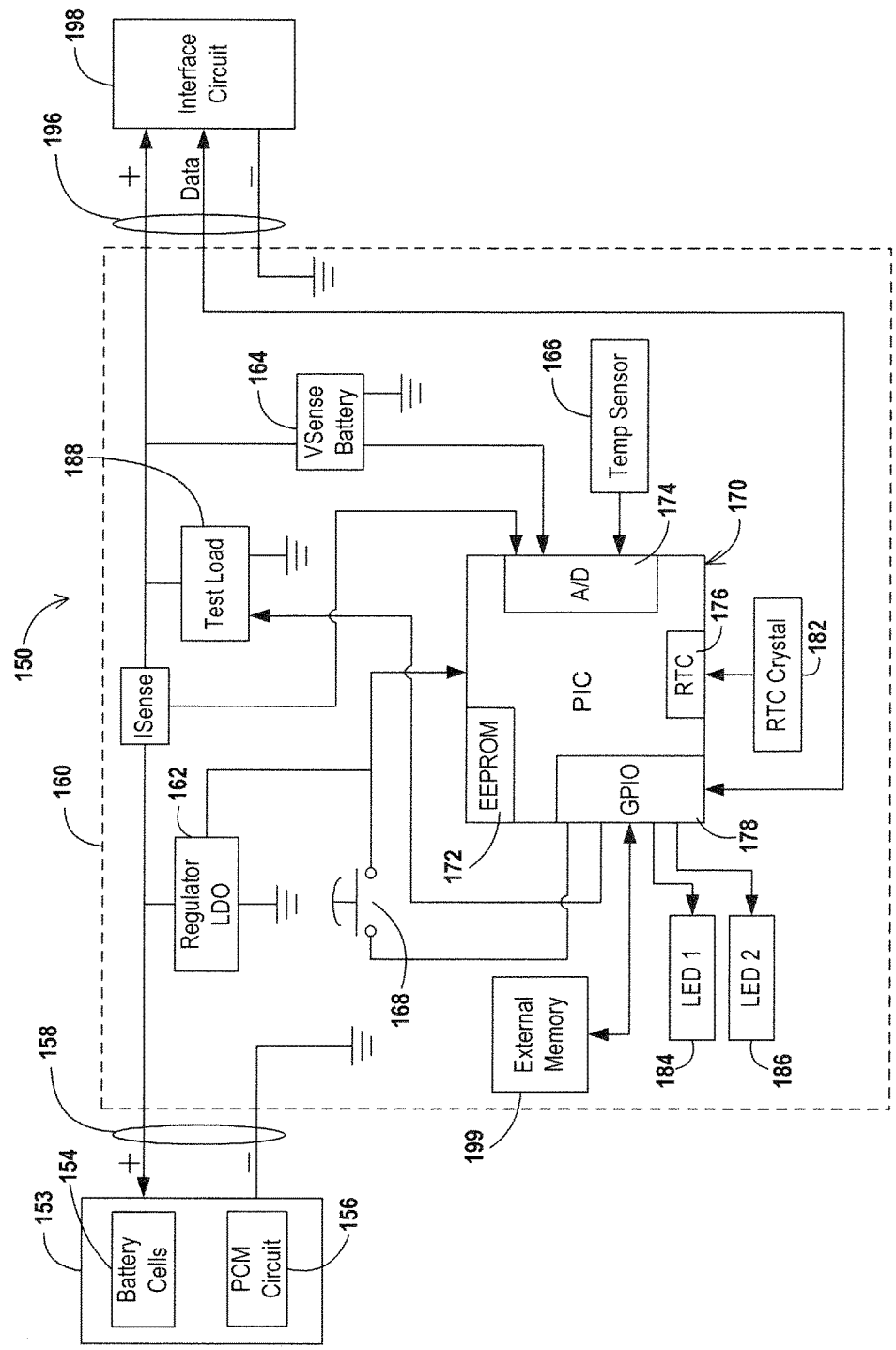
FIG. 1B is a block diagram illustrating details of an embodiment of circuitry that may be incorporated in a sealed battery enclosure lid.

Referring to FIG. 1B, details of an embodiment of a circuit 150 that may be incorporated into a lid element, as illustrated in the schematic of FIG. 1B, are shown. Such a circuit may be used as a part of an intelligent battery system (also denoted herein as a "Lucid" or "Lucid Battery" system in accordance with an embodiment provided by Seektech, Inc., assignee of this application. Circuit 150 may include a battery assembly 153, a battery circuit 160, such as a Lucid battery circuit 160, and an interface circuit 198, such as a Lucid Battery interface circuit. Battery circuit 160 may be on or incorporated in lid assembly 120, such as in the form of an integral PCB lid. Battery assembly 153, which may include one or more battery cells 154 and a protection circuit module (PCM) 156, may be electrically connected to the battery circuit 160 with a first wire bundle 158, which may include one or more wires, such as, a power wire (+) and a ground wire (−), for carrying current between the battery assembly 153 and battery circuit 160.

Battery circuit 160 may be electrically connected to an interface circuit 198, such as a Lucid Battery interface, with a second wire bundle 196, which may include one or more wires such as, for example, a power wire (+), a data wire (DATA), and a ground wire (−) for carrying current and information between battery circuit 160 and interface circuit 198.

Battery circuit 160 may include functional elements for providing battery pack and battery system management. Such elements may be embodied in hardware and/or software. A battery control element 142 (such as shown in FIG. 1A) may include on-board electronic elements, such as a microprocessor, microcontroller, or other programmable device, along with one or more memory elements, to perform various signal condition and/or processing functions as described herein. For example, a battery control element 142 (FIG. 1A) may include a Programmable Interface Controller)(PIC®) 170, such as PIC16F690-I/ML, manufactured by Microchip Technologies, or other microcontrollers, processors, DSPs, or other programmable devices, which may include on-board digital logic, such as a processing element, as well as a non-volatile memory element, such as an electrically erasable programmable read-only memory (EEPROM) 172, flash memory, and/or other digital memory devices. These may be collectively referred to as a battery control element or module. The processor element, such as the PIC® 170, may also include integrated functional blocks, such as analog-to-digital (A/D) converter 174, a real time-clock (RTC) 176, and a General Purpose Input/Output (GPIO) element 178, and/or other peripheral blocks.

Battery circuit 160 may include a dome switch 168, which may be electrically connected to PIC® 170 to monitor and/or control other circuitry of the sealed battery enclosure 100. Dome switch 168 may correspond to dome switch 124 as shown in FIG. 1A.

The GPIO element 178 may be configured to receive instructions from, and supply data to, one or more control elements between battery circuit 160 and interface circuit 198. Such data may be conveyed to the interface circuit 198 via a bus and data transmission protocol. GPIO element 178 may monitor the status of a power supply, and communicate status information by illuminating one or more status indicators, such as a red LED 184 (e.g., LED 1) and a green LED 186 (e.g. LED 2). The PIC® 170 may measure voltage output before and after a test load 188 is enabled. For example, the voltage drop with the test load 188 enabled may provide an indication corresponding to the status of the battery.

The processing element may be electrically connected to and/or include various front-end analog circuitry, such as an analog-to-digital (A/D) converter 174, a voltage sense 164, a temperature sensor 166, and/or other sensors or other devices for use in monitoring battery pack conditions or operation. In one aspect of an exemplary embodiment, a voltage sensing circuit, such as analog-to-digital (A/D) converter 174 may provide an output which varies with voltage and temperature. For example, a voltage sense 164 and a temperature sensor 166 may measure the respective voltage and temperature across one or more battery cells 154, and such temperature and voltage data may be conveyed to interface circuit 198.

The processing element may additionally include or be connected to a communications interface for supporting a bus and data transmission protocol, which may be used to communicate with other control elements. For example, various parameters saved in EEPROM 172, such as state of charge (SOC), temperature data, voltage data, time data, and the like may be polled by the interface circuit 198.

In one aspect of an exemplary embodiment, battery circuit 160 may include one or more voltage regulators, such as LDO regulator 162 for stepping down the input voltage provided from battery assembly 153, and/or generating a constant output voltage across the battery circuit 160.

In one aspect of an exemplary embodiment, one or more clock elements, such as a real-time clock (RTC) crystal 182, may be used to establish a time base, which may be useful for estimating battery self-discharge, or other battery conditions or states. For example, nonvolatile memory element, such as EEPROM 172 may store information, such as battery condition, battery state, and/or real time clock 176 data. Based on one or more battery parameter inputs stored in EEPROM 172, such as charge history, discharge history, temperature, battery age, initial capacity, current battery capacity, estimated life remaining, and the like, the processing element may provide an indication of battery conditions, such as charge or discharge state, battery cycling information, remaining battery life, and/or other similar or related information.

An external memory element 199 may be used such that executable code may reside on one or more Lucid devices. The memory may store code for other device, for example, a battery may store code for an interface device or tool, instrument, charger, etc. The memory element may also store data from various devices such as batteries, tools, instruments, chargers, etc. Thus, data and other information may be me shared across a plurality of lucid devices. The PIC® 170 may use GPIO 178 to read/write from and/or to the external memory element 199. The external memory element may be a non-volatile memory element, such as an EEPROM.

Battery circuit 160 may be configured to evaluate the total present capacity of the battery cells 154. For example, battery assembly 153 may supply a test load 188 with electrical current, and may monitor various parameters in order to determine the ampere-hours of energy delivered by the battery while it is connected to the test load 188. In addition, battery circuit 160 may be configured to adjust a battery charge state based on a particular condition. For example, if a battery has not had a predefined event (e.g., such as a charge/discharge cycle) within a predefined time interval (which may be based on a real-time clock element, such as RTC 176 (as shown in FIG. 1B), the test load 188 may be used to discharge the battery from its correct state of charge to a more suitable long term storage state of charge. For example, for lithium batteries, it may be desirable that the battery is stored at 40-60 percent of full charge.

FIGS. 1B through 24 illustrate details of aspects of embodiments which may correspond with various functions and/or components of the sealed battery enclosure 100 of FIG. 1A.

Figure 2:
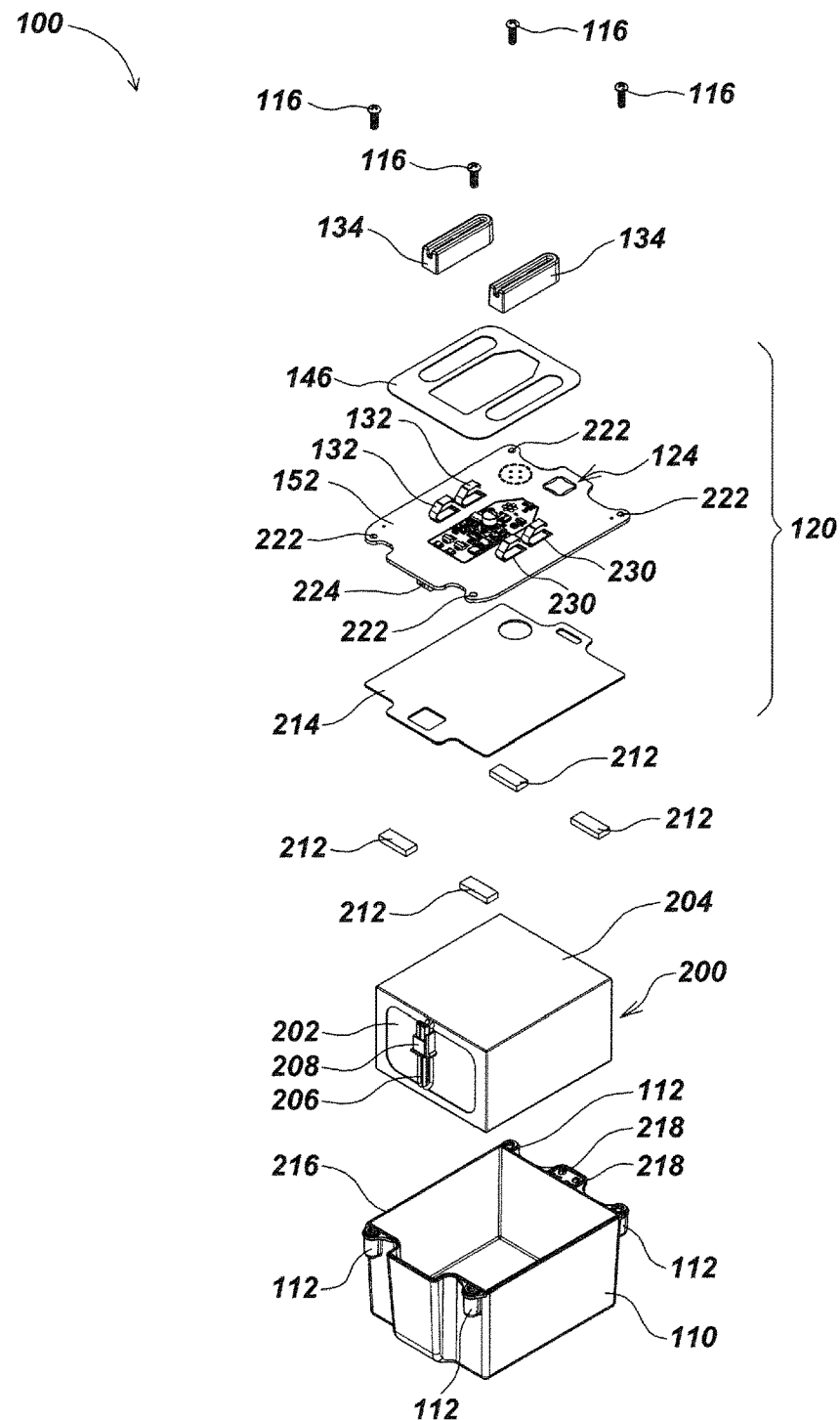
FIG. 2 is an exploded view of the sealed battery enclosure embodiment of FIG. 1A.

FIG. 2 illustrates additional details of a configuration and internal components of the sealed battery enclosure embodiment 100 of FIG. 1A. Sealed battery enclosure 100 may be configured to mechanically house a battery assembly 200, as well as provide electrical connections to power an attached portable device (not shown).

A battery assembly, such as battery assembly 200 as shown, may be housed within a sealed battery enclosure, such as within an interior volume defined by a thermally conductive structural housing assembly such as housing 110. The battery assembly may include one or more battery elements 202, which may be capable of providing current and/or receiving current, and may be, for example, a single and/or a multi-cell assembly of suitable battery cells, such as Li-Ion Polymer cells (Li-Poly), which may be electrically connected in series or parallel with a protection circuit module (PCM) (not shown in FIG. 2), for controlling an abnormal state of the battery, such as an overcharge or other abnormal state or condition.

Battery element 202, which may include a PCM, as well as other elements and/or modules for monitoring and/or controlling battery operation, may be wrapped or disposed in a thermoplastic element 204, which may be made of Polyvinyl Chloride (PVC) or other plastic materials, to provide a single rigid package. Battery assembly 200 may also include a pair of lead wires 206, such as UL 1007 20AWG wires, which may be welded or soldered to the PCM to provide an electrical connection between battery element 202 and lid assembly 120 by mating a first connecting element 208, such as MOLEX 43025-0200, with a second connecting element 224 as shown in FIG. 2.

Additional elements may be housed within or on the thermally conductive structural housing element, such as housing element 110. For example, one or more battery seating elements, which may be made of a flexible sealing material, such as silicon foam, may be disposed between the lid and battery element to aid in positioning and/or shock absorption of the battery assembly. For example, in the embodiment shown, battery seating elements 212 may be fitted between battery assembly 200 and lid assembly 120 to reduce movement of and/or provide shock protection to battery assembly 200.

A sealing element may be disposed between the thermally conductive structural housing element 110 and PCB element 152. For example, sealing element 214, which may be a layer of silicone foam or other flexible sealing material, may be sandwiched between housing 110 and PCB element 152, such that an inner rib 216 clamps down on the sealing element 214 to provide a waterproof seal. Other mechanisms for sealing the interior volume and battery assembly may also be used in various embodiments. In an exemplary embodiment, PCB element 152 configured with face sealing element 146 and sealing element 214 may collectively be referred to as lid assembly 120.

To facilitate transfer of battery-related information, such as battery condition information or operating status information, lighting elements and associated holes or openings to allow transmission of light may be provided in the structural housing element and/or lid element. For example, one or more apertures 218 may be integrally formed within housing 110 and/or lid assembly 120 such that light emitted from one or more lighting elements (not shown in FIG. 2) may exit the sealed battery enclosure 100.

Lid assembly 120 may be mounted to housing 110 with one or more attachment elements, such as a plurality of screws 116. For example, screws 116 may be fed through a plurality of holes 222 of lid assembly 120, and threaded into a plurality of screw bosses 112, to securely fasten lid assembly 120 to the housing 110. Alternate elements and/or mechanisms may be employed to mount the PCB lid element 120 to the housing 110.

One or more contact elements 132 may be disposed on one or more conductive pads 230 mounted on the component side of the lid assembly 120, such that battery element 202 of sealed battery enclosure 100 (such as shown in FIGS. 1A and 2) may provide an electrical current to a portable device (not shown) in a discharge mode when mated with battery contact elements 132 (such as shown in FIG. 1A). Battery element 202 may also receive current in a charge mode through battery contact elements 132 (FIG. 1A) from a receiver module (not shown in FIG. 2) electrically connected to a power source. Conductive pads 230 may be made of copper or other conductive materials, and may serve as solder points for battery contact elements 132.

Battery element 202 may be electrically coupled to lid assembly 120 by mating a first connecting element 208, such as MOLEX 43025-2P, with a second connecting element 224. These connecting elements may be, for example, surface mount connectors or other connectors.

Figure 3:
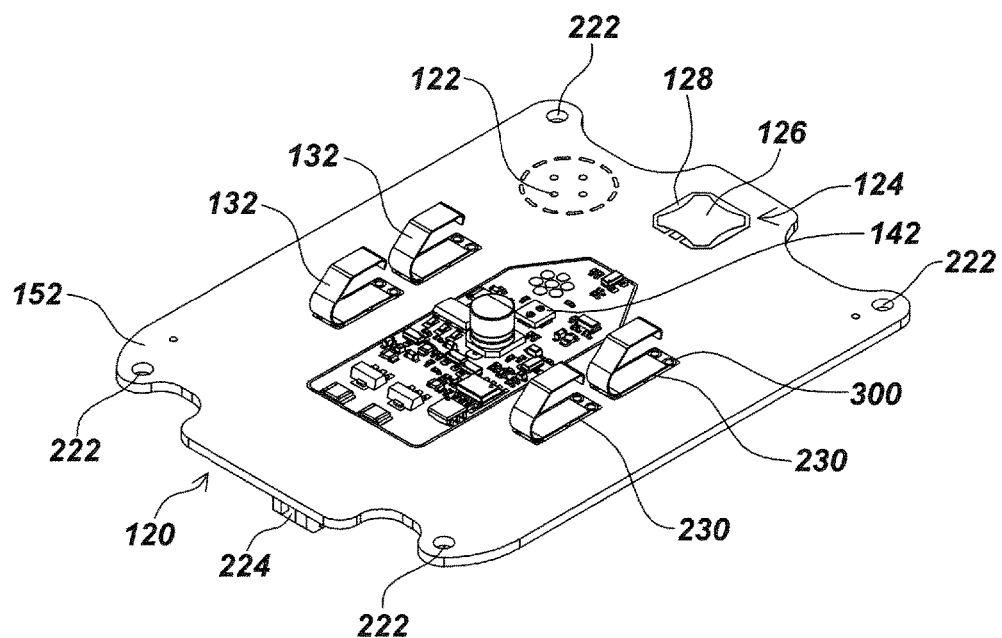
FIG. 3 is an enlarged detailed isometric view of an embodiment of a printed circuit board (PCB) element, taken from the component side thereof.

FIG. 3 illustrates an enlarged detailed view of an embodiment of an upper, top, or component side of a PCB element 152 to illustrate details and/or additional elements in accordance with various aspects. In a typical embodiment, PCB element 152 includes a top or upper layer including electronic circuit devices, such as analog and/or digital integrated circuits, discrete components, such as resistors, capacitors, diodes, and the like. The upper layer is typically positioned on the side opposite to the interior volume and battery assembly (denoted herein as the top or upper side, which typically includes all or most of the electrical circuit components).

Figure 4:
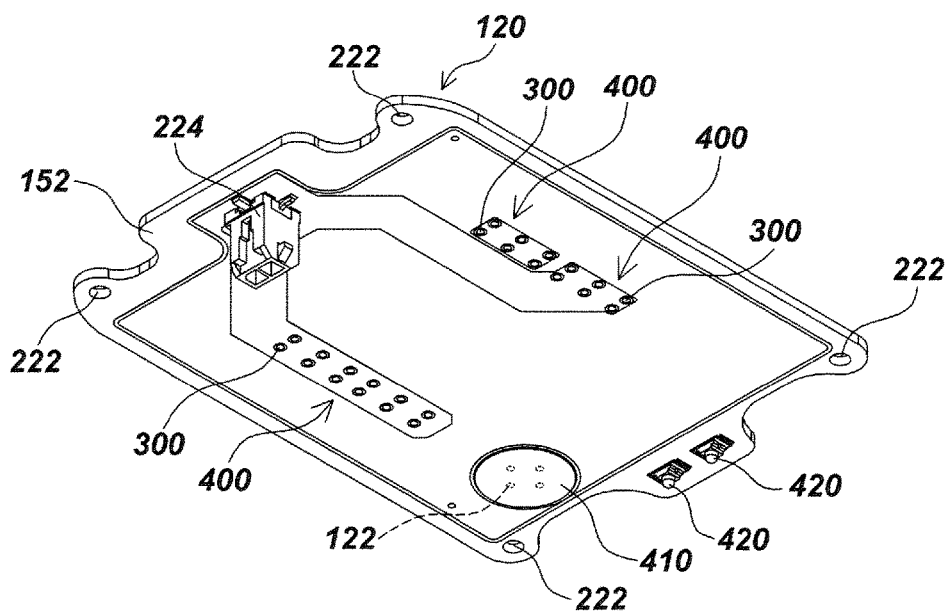
FIG. 4 is an enlarged detailed view of the PCB element embodiment of FIG. 3, taken from the underside thereof.

In addition, PCB element 152 may include a bottom or lower layer, which may be a metal or other structural material or configuration, and may be positioned in contact with the interior volume and adjacent to the battery assembly. In some embodiments, the lower layer may include circuit elements such as connectors, such as second connecting element 224, as well as circuit traces, LEDs, or other circuit components. In some embodiments, the lower layer may be all or mostly solid metal or structural material to strengthen the structural housing. For example, the lower layer of the lid element may include a small amount of non-structural area for circuit board traces, electrical connectors, small components, and/or ventilation or pressure relief assemblies, such as shown in FIG. 4. Other structural elements or configurations (now shown), such as ribs or other structural elements, may be added to strengthen the lid element. In addition, it is noted that other configurations of circuit elements disposed on the lid element, beyond those specifically shown in the example embodiments of FIG. 3 and FIG. 4, may also be used in various implementations.

Returning to FIG. 3, vias, such as plated through-hole vias 300, may be included to serve as an electrical conduit to carry electrical signals and/or electrical power between layers of the PCB element 152, as well as provide an electrical connection between conducting elements on opposite sides of PCB element 152. For example, conductive pads 230 as illustrated on the component side of PCB element 152 may electrically connect with a conducting element (not shown) on the opposite side of PCB element 152. Vias may be fabricated by drilling one or more holes through one or more layers of PCB element 152, and made conductive by plating the inner surface of the drilled holes with a conductive material, such as copper. Suitable plating methods may include, electroless plating, immersion plating, and/or electrolytic plating. Additional elements disposed on the component side of PCB element 152 may include a battery control element 142, which may be electrically connected to a battery non-volatile memory element (not shown).

FIG. 4 illustrates an enlarged detailed view of an embodiment of a battery or trace side of a PCB element 152. This side is normally positioned in contact with or adjacent to the interior volume and battery assembly. Plated through-hole vias 300 may be used to carry signals between conductive pads 230 on the component side of PCB element 152 with one or more conductive traces 400 disposed on the opposite surface of PCB element 152. Conductive traces may comprise of a physical strip of conductive metal, such as copper.

A vent membrane, such as hydrophobic gas-permeable membrane 410, which may be made from GORE-TEX® or other similar or equivalent materials, may be mounted on the underside of lid assembly 120 to provide selective permeability across PCB element 152 through vent holes 122. Examples of such materials are described in, for example, U.S. Pat. Nos. 3,953,566 and 4,194,041, the contents of which are incorporated by reference herein. In operation, the hydrophobic gas-permeable membrane 410 permits gas exchange, such that gases evolved from an electrochemical reaction may evacuate, but restricts water ingress, so that water and other aqueous solutions cannot penetrate the sealed battery enclosure. Thus, a water-tight seal for the sealed inner volume and battery assembly may be maintained even if the battery enclosure is exposed to water, while gases may still transfer into or out of the interior volume.

One or more status indicators 420, such as, for example, lighting elements, may be disposed on PCB element 152 to provide a user with a visual indication of the condition or state of battery element 202. For example, status indicators 420 or lighting elements, such as light-emitting diodes (LEDs), may illuminate based on the state of charge (SOC) of battery element 202 (FIG. 2). Status indicators 420 may be, for example, RGB LEDs, red LEDs and/or green LEDs. Status indicators 420 may be surface mounted to PCB element 152 and may be aligned with one or more apertures 218 (FIG. 2) when securing PCB element 152 to housing 110 (FIGS. 1 and 2).

Figure 5:
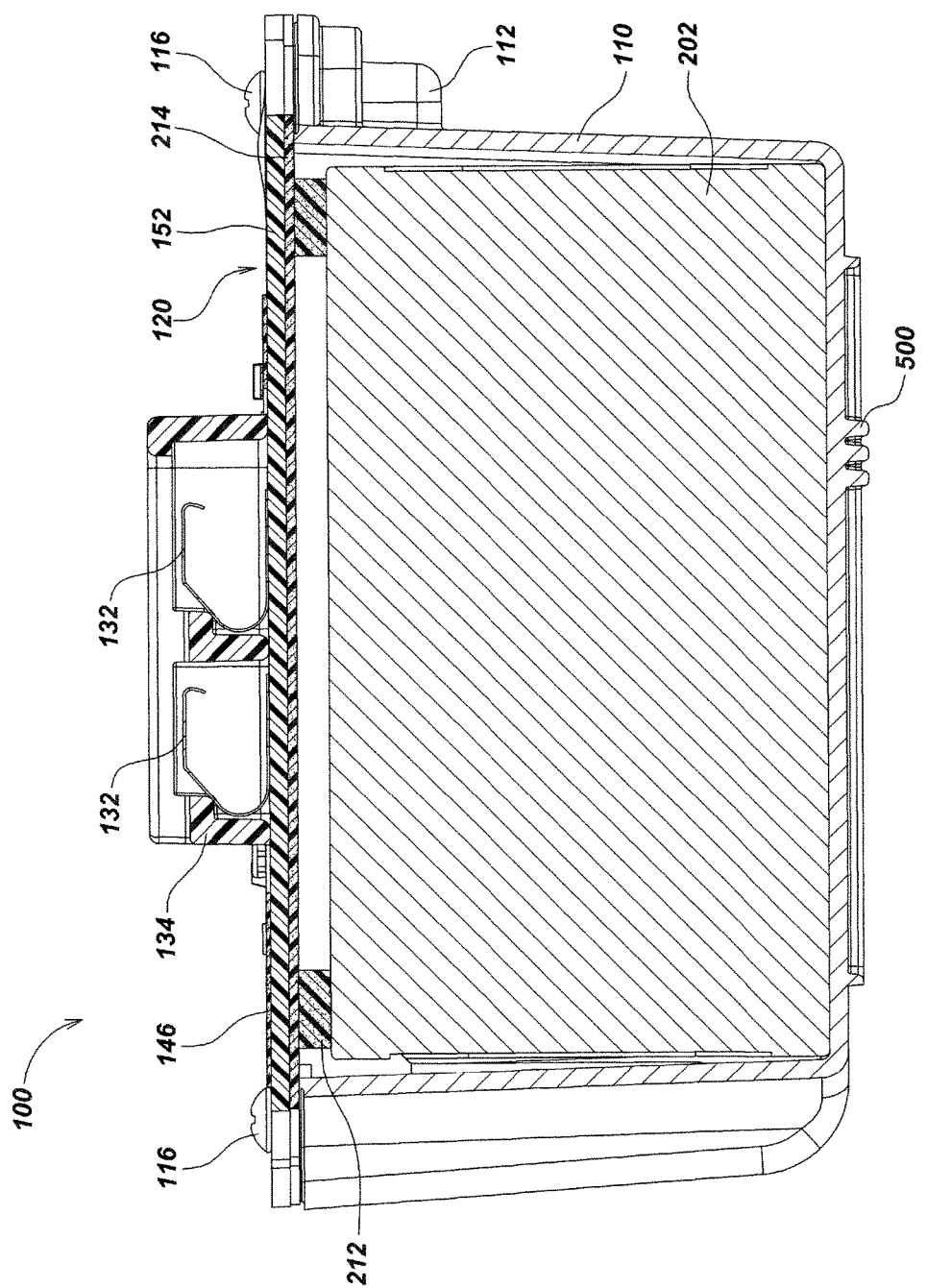
FIG. 5 is a vertical section view of the sealed battery enclosure embodiment of FIG. 1A, taken along line 5-5.

FIG. 5 illustrates a vertical section view of the embodiment 100 of FIG. 1A, taken along line 5-5, to illustrate the configuration and additional details of sealed battery enclosure 100. To minimize excess volume and movement, housing 110 may be formed to accommodate specific dimensions of battery assembly 200. As noted in FIG. 2, battery seating elements 212, which may be made from silicone foam or other flexible materials, may be fitted between battery element 202 and lid assembly 120 to provide cushion and reduce movement within sealed battery enclosure 100, and/or compensate for variation in battery thickness, and other component or manufacturing tolerances. Sealing element 214 may be sandwiched between housing 110 and the underside of lid assembly 120 to create a waterproof seal. Alternate elements and/or mechanisms may also be used to provide a waterproof seal. For example, an O-ring may be fitted between the housing 110 and the underside of the lid assembly 120 to provide a waterproof seal.

The vertical section view of contact elements 132 and contact preload plates 134 illustrates one way in which a receiver module may functionally connect with the battery contact elements 132. In addition to conducting an electrical current from the sealed battery enclosure to a circuit in the receiver module (not shown), the curved shape and flexibility of battery contact elements 132 may promote a wiping action to prevent and/or break down oxide buildup on the surface of the battery contact elements 132.

One or more fins or other cooling structures may be used to facilitate cooling of the battery pack. For example, one or more fins 500 may be integrally formed and extend perpendicularly along one or more outer surfaces of the housing 110 to increase the rate of heat transfer. In an exemplary embodiment, a plurality of fins 500 may be disposed on one or more surfaces of housing 110, with the fins formed integrally with the housing in a diecasting process. Fins 500 may further be processed to facilitate heat transfer, such as by coating, etching, blasting and/or anodizing to provide additional surface area.

FIG. 6 illustrates an isometric view of an embodiment of a battery pack module 600. Battery pack module 600 may include a sealed assembly, such as the sealed battery enclosure embodiment 100 as shown in FIG. 1A (sealed battery enclosure 100 is not shown in FIG. 6 but may be disposed internal to the module 600). The battery pack may further include an outer casing assembly, which may include one or more components or assemblies, which may be one or more shells or similar structures such as shown in FIG. 6. In a typical embodiment, the outer casing assembly may be configured as an open or non-sealed structure (as opposed to the structural housing element/lid element assembly which seals the interior volume and battery assembly from water ingress as described previously); however, some sealing, such as with respect to contacts, circuit board traces, and the like, may be used.

In an exemplary embodiment, the outer casing assembly may comprise complementary half shells, which may include upper-and-lower or side-by-side shell components or assemblies. For example, in one embodiment the outer casing assembly may include a capture shell (top case/half) 610 and a bottom case assembly (bottom half) 620 which may be connected during assembly of the battery pack to enclose the thermally conductive structural housing element and the lid element. The outer casing assembly may be used to provide further protection to users, such as by limiting heat transfer from the thermally conductive structural housing element and/or lid element to a user holding or in contact with the outer casing assembly. In addition, the outer casing assembly may be configured to provide additional thermal, explosive, and/or hazardous material release protection by further enclosing the battery assembly and interior volume in an additional protective layer.

Screws or other attachment hardware, such as thread forming tamper-resistant screws 616, which may be, for example, Plastite 48, may be used to join top capture shell (top half) 610 to the bottom case assembly (bottom half) 620. A plurality of cleats 612 may be overmolded along the top surface of the capture shell (top half) 610 to provide vibration dampening, cushion against impact, improved grip, comfort in handling, and/or other ergonomic considerations. Cleats 612 may be mechanically bonded and/or chemically bonded to the surface of capture shell (top case/half) 610, with an appropriate overmolding process, such as insert molding, with an appropriate copolymer and/or one or more polymers, such as a thermoplastic elastomer. Overmolded parts may optionally be glued on separately.

Bottom case assembly 620 may include a bottom case shell 622, sliding contact seals 624 such that, when mated, the overmold may form a watertight seal between the battery pack module 600 and a receiver module (not shown) which may shield against the entry of water, dirt and/or debris into the contact areas. In particular, it may be desirable to provide isolation between the contacts such as to prevent shorts, corrosion, and the like. Sliding contact seals 624 may be mechanically bonded and/or chemically bonded to the top surface of bottom case shell 622, with an appropriate overmolding process, such as insert molding, with an appropriate copolymer and/or one or more polymers, such as a thermoplastic elastomer, or may be separately molded and captured with bottom case assembly 620.

Bottom case assembly 620 may also include a release latch mechanism, such as release latch element 630, which may participate in various functions, such as mechanically releasing a battery pack module 600 from a shoe or receiver module (not shown) and/or actuating a switch element, such as dome switch 124 (FIG. 1A), disposed within battery pack module 600. For example, the current provided by actuating a switching element, such as dome switch 124, may be sensed by a receiver module or other circuit or module.

In some embodiments, actuation of the switch element may be sensed and used to provide an indication, such as via one or more LED elements, of the state of charge of the battery assembly and/or other battery states or conditions, such as predicted remaining charge (fuel gage) or remaining time till discharge, number of battery cycles, and/or other information. In an exemplary embodiment, in addition to connection and/or release of a battery using the latch mechanism, a user may push the latch release element and be provided, via the LED elements, with an indication of the state of charge of the battery assembly (or similarly a predicted remaining battery time to discharge, etc.). The latch release element may be configured with multiple stops or positions, such as a first stop to mechanically release a battery pack from a connected electronic device, as well as a second stop or position to actuate the switch.

The battery state or condition may be indicated by a visual display element such as an LCD or LED assembly, and/or by an audible or other indication. For example, an array of LEDs, LEDs of different colors or combinations of colors, and/or other visual or audio signaling mechanisms may be used to provide indications of battery state. The LEDs may be disposed on or in, for example, the lid assembly 120, such as on PCB element 152, or on or in other elements, such as the battery assembly, structural housing element, or outer casing assembly.

A release latch-initiated testing function may be done by, for example, initiating a battery test cycle upon actuation of the latch release, such as prior to connection of the battery to the portable electronic device. For example, in some embodiments, the latch release mechanism may include a first stop or position, at a lower pressure or deployment level, for releasing the battery pack from a connected portable device, and a second stop or position, at a higher pressure or deployment level, for actuating the switch. In this way, a release latch mechanism may provide an integral attachment/disconnection function and battery test function, allowing a user to actuate the latch to a first stage where the battery may be attached or released, or to a second stage, where battery condition may be indicated, such as via the LEDs.

In another aspect, a battery condition or status function may be implemented with a battery charger device (not shown) using the release latch mechanism and/or LEDs or other visual or audible indication mechanism. For example, LEDs in the battery pack may be used to provide charge state information when connected to a charger device. This may be particularly advantageous when the charger device lacks the capability of providing charge information and/or is located in a relatively inaccessible location, such as under a dash or under or behind a seat in a vehicle. If the charger device is configured to actuate the release latch mechanism or otherwise interface with the battery pack, LEDs or other indications mechanisms onboard the battery pack may then be used, such as described previously herein, to provide battery charge information and/or other battery state or condition information.

In another aspect, combinations of release latch mechanisms and switch elements may be used to provide addition functions, such as logging the number of connections of the battery pack to portable electronic devices, logging charge cycles or other cycles associated with connection of the battery pack to various devices, providing an indication of pending release of the battery pack to connected portable devices (such as, for example, signaling the connected portable device that a battery pack disconnection is about to occur so that the electronic device can stop or limit operation in a controllable fashion) and/or providing other similar functions.

In some embodiments, battery packs may implement security and anti-theft mechanisms, such as by controlling or disabling battery output as described subsequently herein based on device serial numbers or other identification information. In one aspect, battery packs may be disabled or unusable when used with unrecognized devices, such as by disabling the battery output when connected to an improper device. For example, if a user mates the battery pack with an unrecognized or unauthorized device, the battery packs may not provide power to the device.

Figure 7:
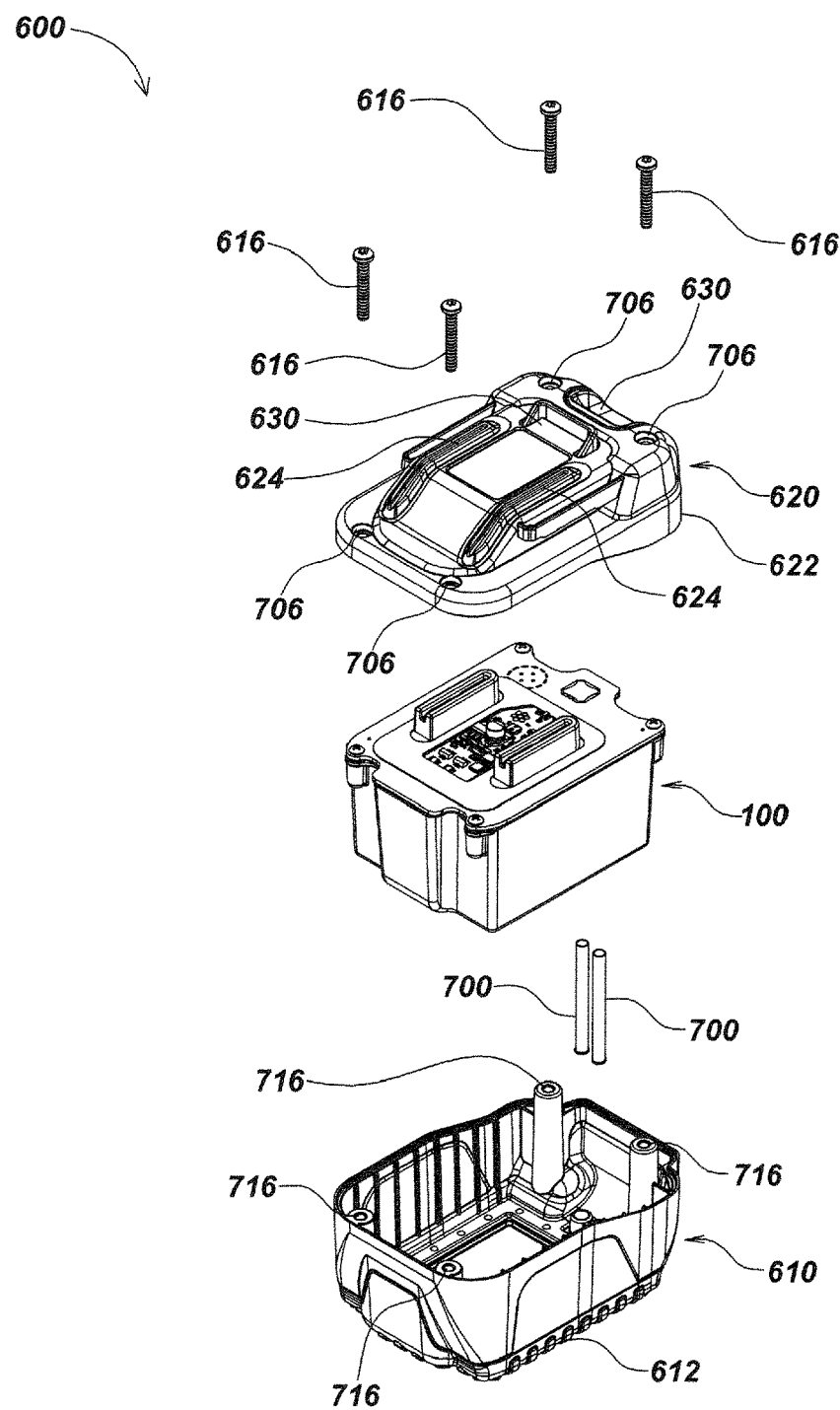
FIG. 7 is an exploded isometric view of the battery pack module embodiment of FIG. 6.

FIG. 7 illustrates an exploded isometric view of an embodiment of battery pack module 600. Inside the cavity of battery pack module 600, one or more light pipes 700 may be aligned with apertures 218 (as shown in FIG. 2) and status indicators 420 (as shown in FIG. 4), such as lighting elements, of sealed battery enclosure 100, for providing transport and/or distribution of light to the outside of battery pack module 600. Sealed battery enclosure 100 and light pipes 700 may be housed between capture shell (top case/half) 610 and bottom case assembly (bottom half) 620, by threading the plurality of thread forming tamper-resistant screws 616, such as Plastite 48, through bottom case screw holes 706, and into capture shell screw bosses 716 to form an external housing.

Figure 8A:
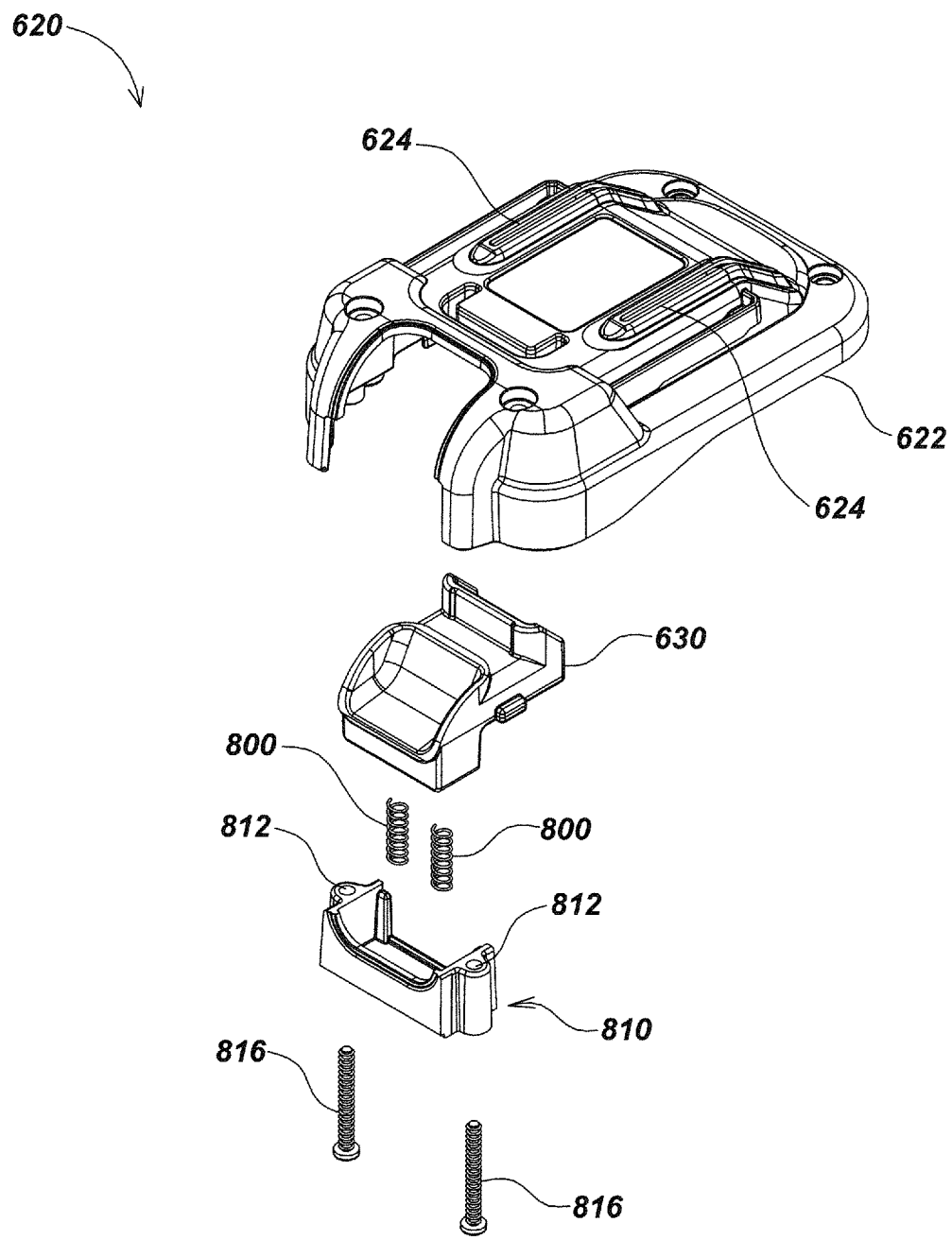
FIG. 8A is an exploded isometric view of an embodiment of a bottom case assembly.

FIG. 8A illustrates an exploded isometric view of details of an embodiment of the bottom case assembly 620 of FIGS. 6 and 7. Bottom case assembly 620 may include, for example, a release latch element 630 for providing a spring-loaded mechanism for releasing a battery pack module 600 (such as shown in FIG. 6) with a receiver module (not shown) and/or actuating dome switch 124 (such as shown in FIGS. 1A, 2, and 3) disposed within battery pack module 600.

Release latch element 630 may be configured with a bottom case 622 with one or more compression springs 800 seated within a carrier 810. In an exemplary embodiment, carrier 810 may be secured onto bottom case shell 622 with screws 816, which thread into bottom case release latch screw bosses (not shown) in the inside of 622.

Figure 8B:
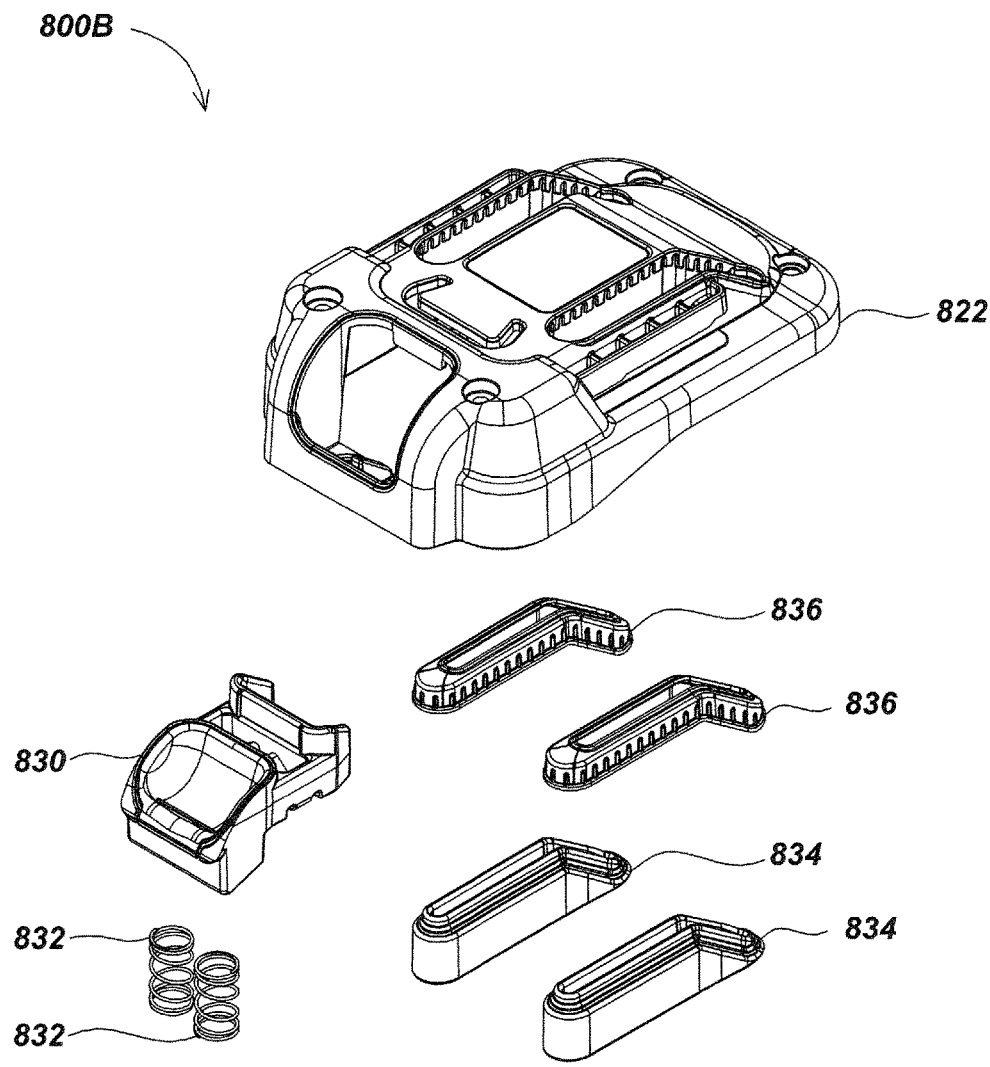
FIG. 8B is an exploded isometric view of an alternate embodiment bottom case assembly.

FIG. 8B illustrates an exploded isometric view of details of an alternate embodiment bottom case assembly 800B. Bottom case assembly 800B may include, for example, a release latch element 830 for providing a spring-loaded mechanism for releasing a battery pack module 600 (such as shown in FIG. 6) from a receiver module (not shown) and/or actuating dome switch 124 (such as shown in FIGS. 1A, 2, and 3) disposed within battery pack module 600 (FIG. 6).

Release latch element 830 may be configured with a bottom case 822 with one or more compression springs 832. In one aspect, a pair of contact assemblies 834 may be configured with bottom case 822. A molding, such as rubber molding 836 may be disposed on bottom case 822 to provide a weather resistant seal when a battery pack module is mated with a receiver module (not shown in FIG. 8B) or a charging module (not shown in FIG. 8B). A rubber overmolding may optionally be used in place of molding 836.

Figure 9:
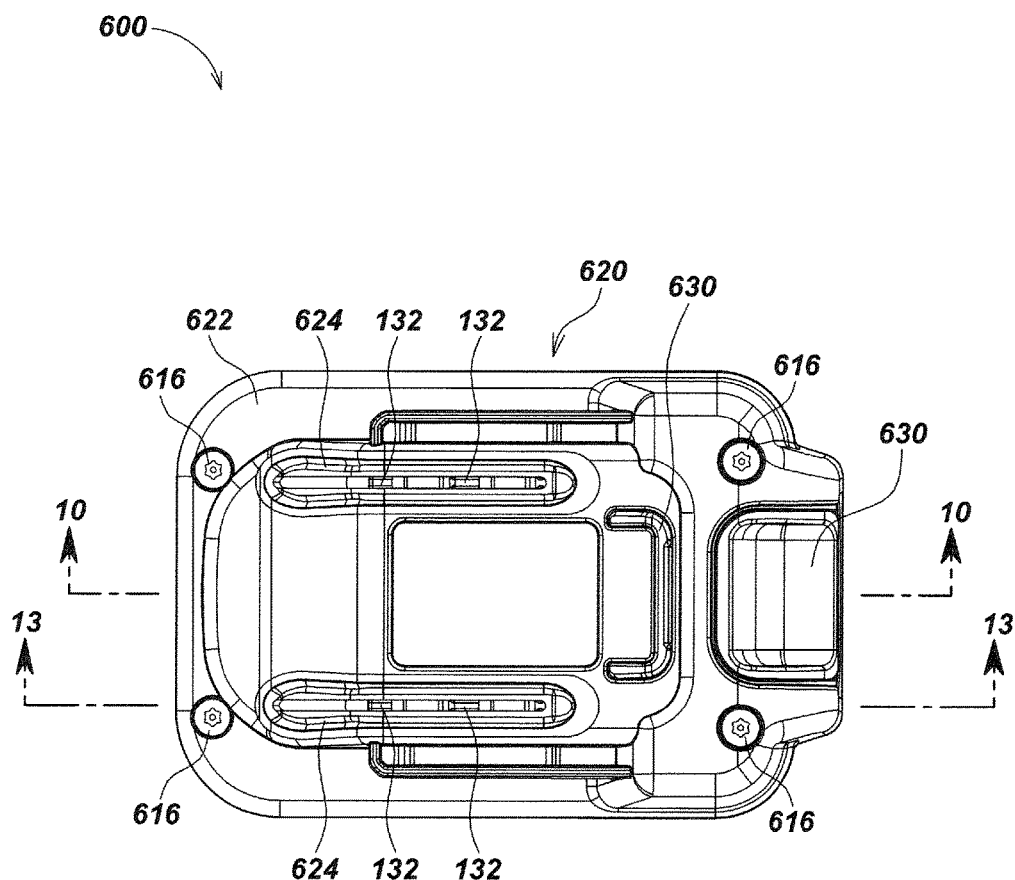
FIG. 9 illustrates details of the battery pack module embodiment of FIG. 6, showing alignment of the sliding contact seals above the sliding contact assemblies.

FIG. 9 illustrates a contact side view of details of an embodiment of the battery pack module 600 as shown in FIG. 6. Various additional aspects and details may be seen through vertical section views as illustrated in FIGS. 10 through 13.

Figure 10:
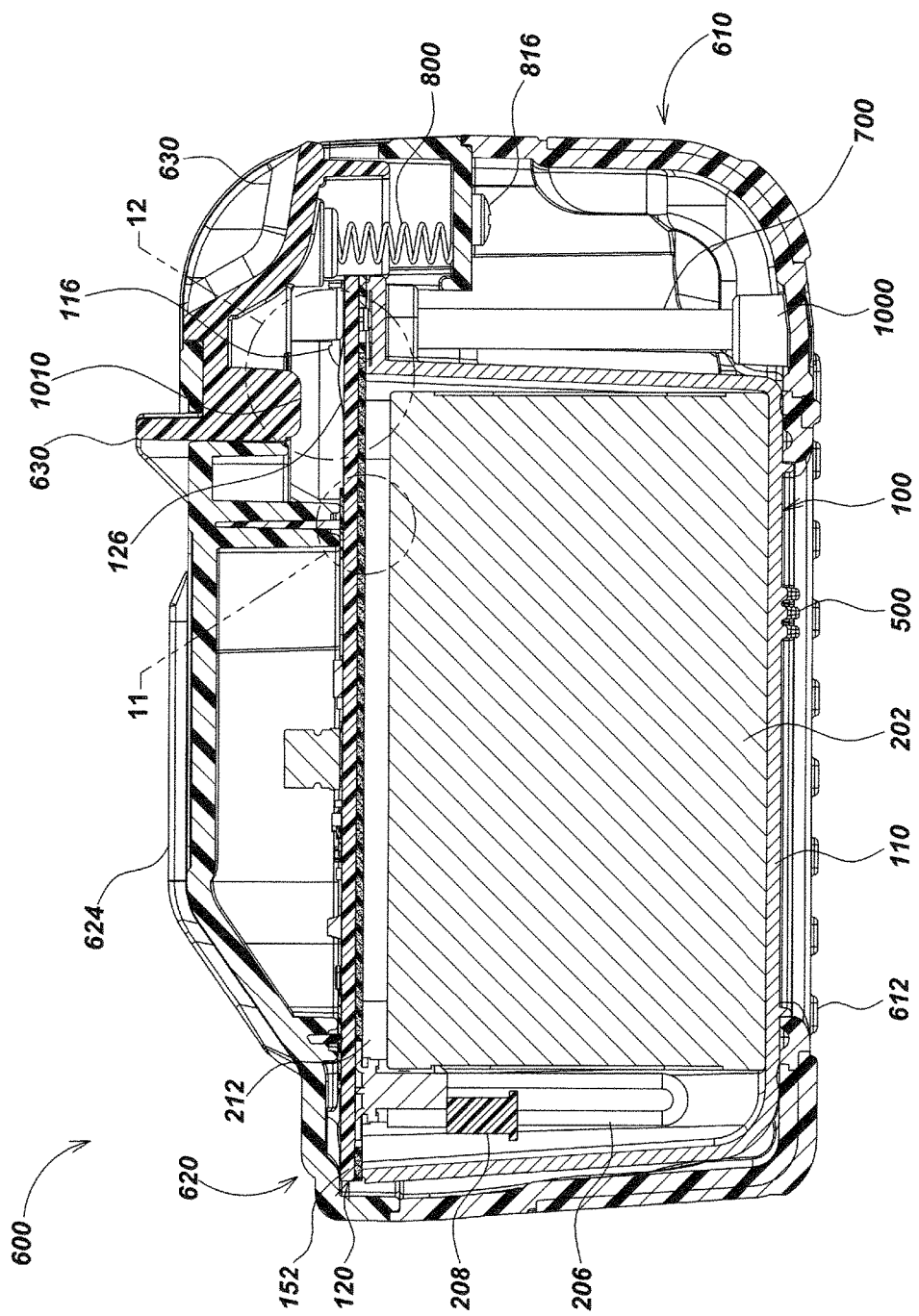
FIG. 10 is a vertical section view of the battery pack module embodiment of FIG. 9, taken along line 10-10.

Turning to FIG. 10, internal components of an embodiment of battery pack module 600 is illustrated in a vertical section view, taken through line 10-10 of FIG. 9, which traverses the midsection of battery pack module 600. For example, capture shell 610 and bottom case assembly 620 may be dimensioned and conjoined to provide a fitted outer housing around sealed battery enclosure 100 as shown.

One or more light pipe retainers 1000 may be used to secure light pipes 700, such that lighting elements or status indicators 420 (such as shown in FIG. 4) may transmit light through apertures 218 (such as shown in FIG. 2) to status indicator windows (not shown) on the outer surface of battery pack module 600 to indicate battery state or condition information.

Upon depressing release latch element 630, a dome switch trigger 1010 may be used to depress metal dome 126, which may then initiate a series of commands or other signals. Additional details of an embodiment of a release latch switch mechanism are illustrated in further detail in FIG. 12

Figure 11:
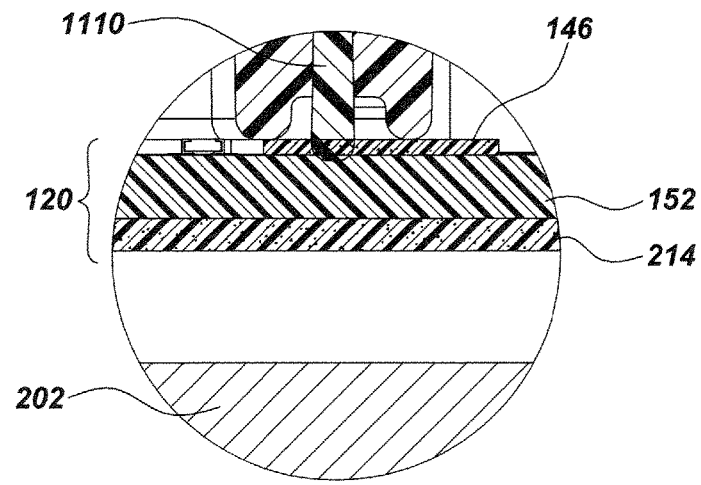
FIG. 11 is an enlarged detail view of an embodiment of a seal mechanism as shown in FIG. 10.

FIG. 11 illustrates details of a mechanism for sealing off conductors on PCB element 152 (FIGS. 1A, 2-5, and 10), such as shown in FIG. 6 and FIG. 9, to prevent ingress of dust, dirt, water or other liquids or contaminants to the contacts and/or associated circuit board traces or other conductors. For example, when capture shell (top half) 610 is joined to the bottom case assembly (bottom half) 620, an internal ridge element 1110 of bottom case 622 may be compressed into face sealing element 146 (as shown in FIGS. 1A and 2) on lid assembly 120 to provide separate watertight sealed compartments for electrical components, such as battery contact elements 132.

Figure 12:
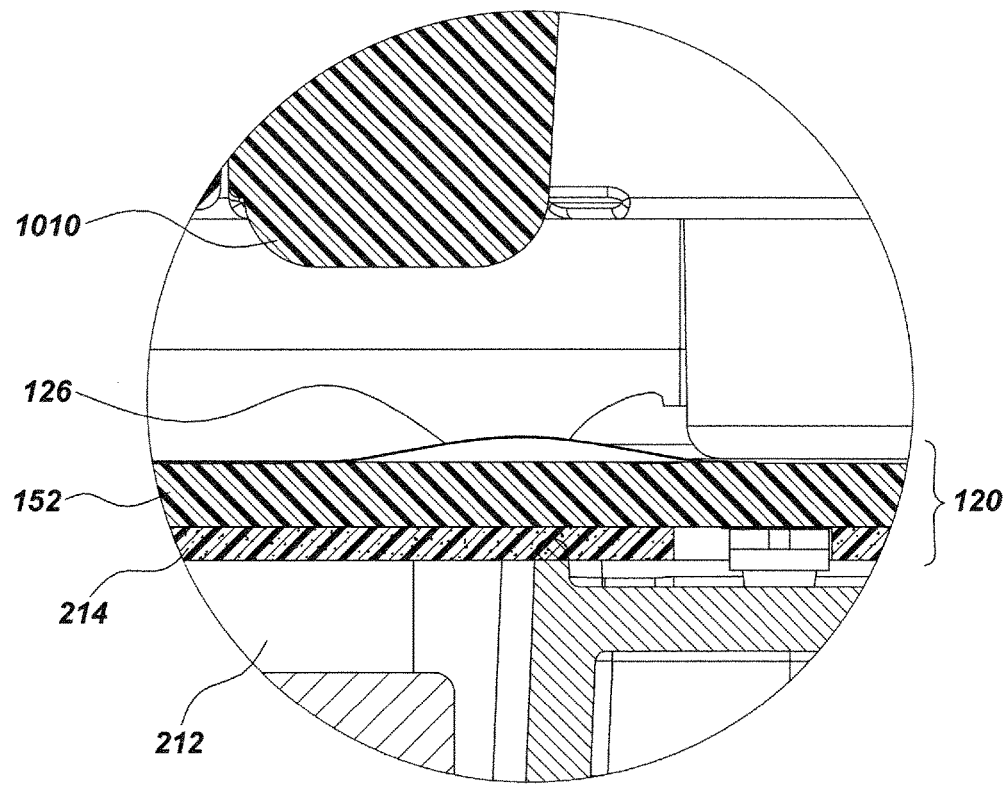
FIG. 12 is an enlarged detail view of an embodiment of the latch-switch mechanism as shown in FIG. 10.

FIG. 12 illustrates details of a latch switch mechanism of the embodiment of FIG. 10. Release latch element 630 (such as shown in FIGS. 6-10) may be configured to provide a mechanism for releasing battery pack 610 from a receiver module, as well as providing a mechanism for actuating a switching element, such as dome switch 124 (such as shown in FIGS. 1A, and 2-3) inside battery pack module 600. For example, when latch 630 (such as shown in FIGS. 6-10) is depressed, a dome switch trigger 1010 may activate dome switch 124 by depressing metal dome 126 as described previously. As described in FIGS. 1A and 3, the base of the metal dome 126 may rest on the outer rim of a primary circuit pathway 128 (such as shown in FIG. 1A and FIG. 3), such that, upon collapse, the metal dome 126 makes contact with the secondary pathway (not shown), thereby completing the circuit. Completion of the circuit may then trigger a progression of measurement readings and/or dialog, initiated by a receiver module. For example, the current provided by actuating dome switch 124 may be sensed by a receiver module (not shown).

Figure 13:
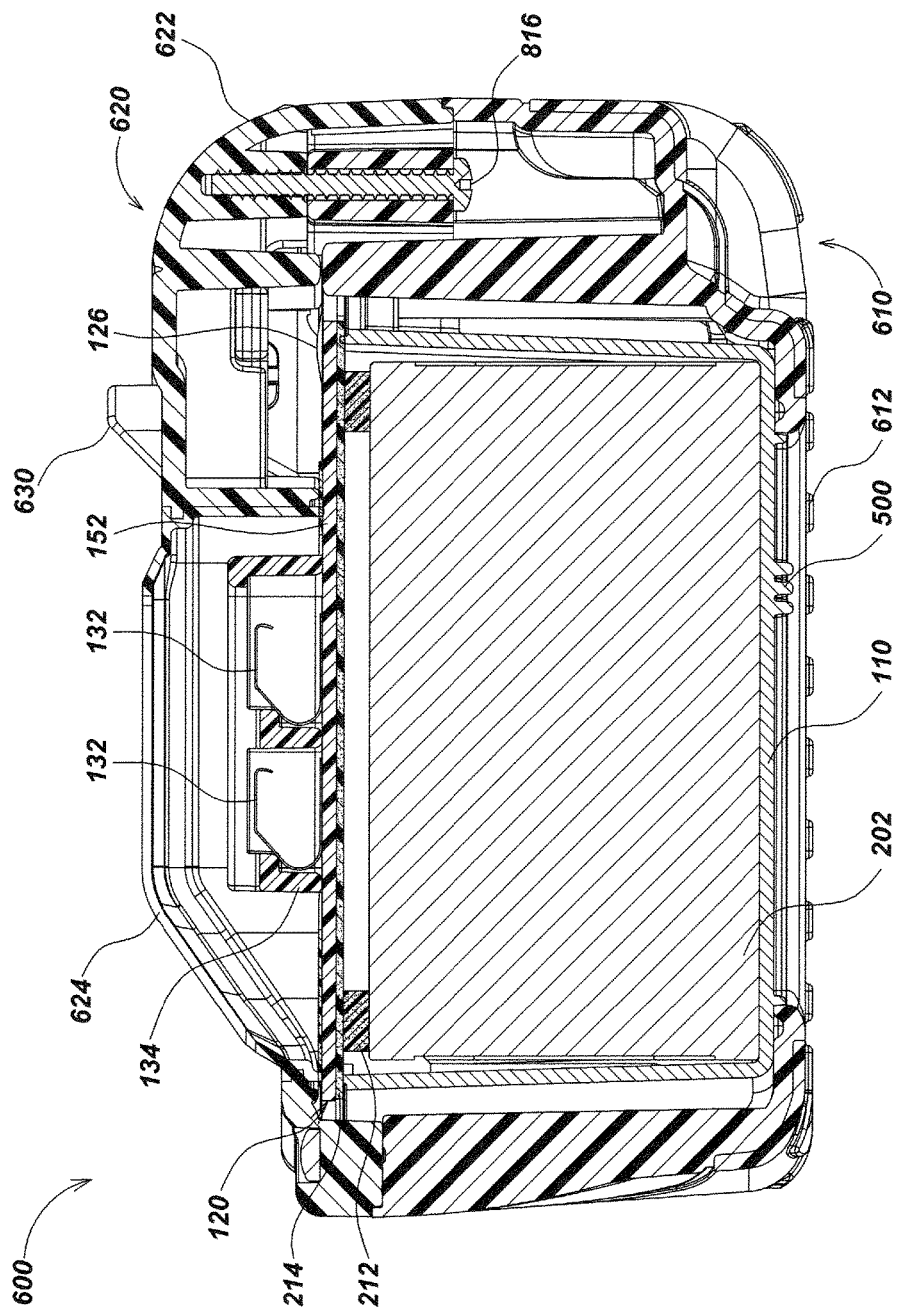
FIG. 13 is a vertical section view of the battery pack module embodiment of FIG. 9, taken along line 13-13.

Turning to FIG. 13, details of the battery pack module embodiment 600 of FIG. 9 are illustrated in a cross-section view, taken through line 13-13, which traverses the outer housing of battery pack module 600, such as capture shell 610 and bottom case assembly 620, as well as contact preload plates 134 and contact element 132.

Figure 14:
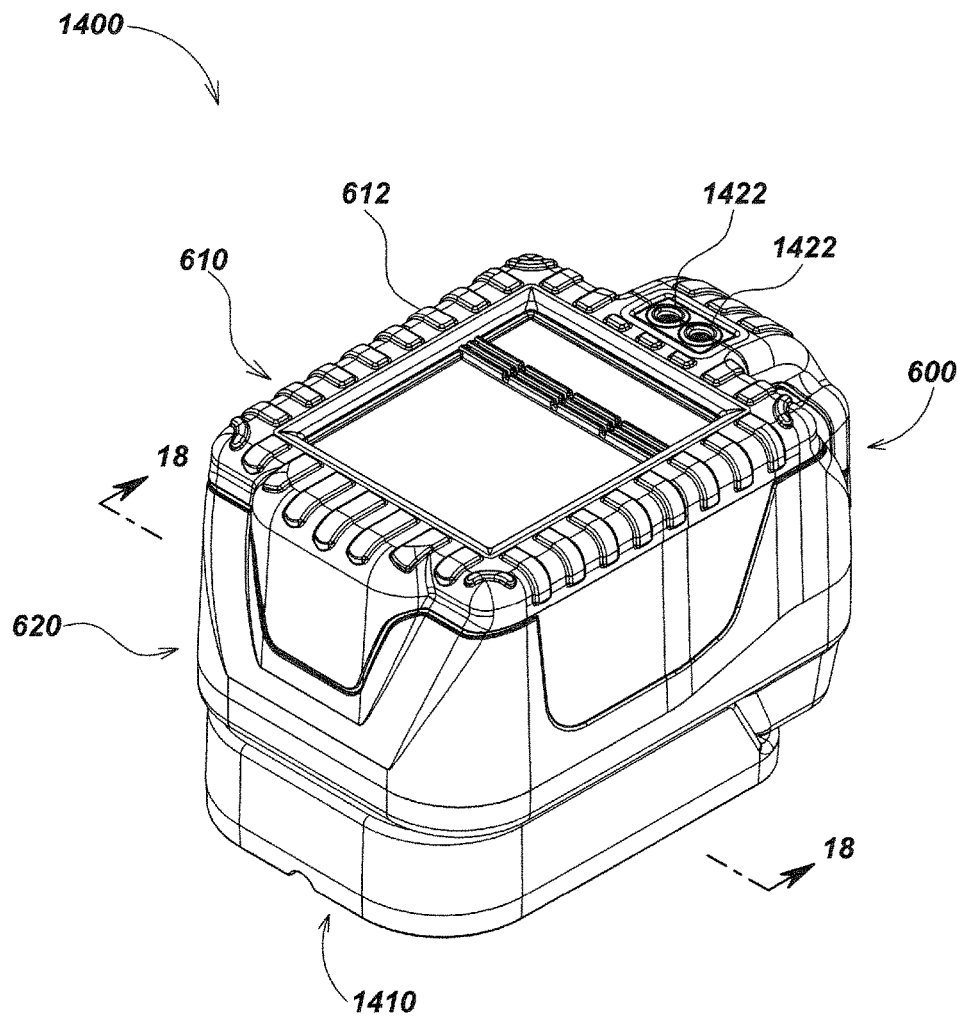
FIG. 14 is an isometric view of an embodiment of a battery pack system.

FIG. 14 illustrates details of an embodiment of a battery pack system 1400. Battery pack system 1400 may interface electrically to a portable device and/or power source, such as a charger. Battery pack system 1400 may include a battery pack module 600, which may be electrically, and detachably, coupled to a receiver module 1410 to discharge and/or charge battery element 202 (such as shown in FIG. 2). Receiver module 1410 may serve as a charging interface and/or device interface for battery module 600. For example, receiver module 1410 may be electrically connected, and optionally mounted, to a portable device, such that battery pack module 600 may provide such a portable device with power when coupled.

Receiver module 1410 may electrically connect to a power source (not shown), such as an AC power source and/or a DC power source. Receiver module 1410 may electrically connect to a converter module (not shown), such as an AC-to-DC converter module, to provide receiver module 1410 with a continuous delivery of a regulated DC output voltage.

One or more status indicator windows 1422 may be disposed on the surface of battery pack module 600 to convey visually to a user one or more conditions of the battery element 202. The information provided through status indicator windows 1422 may be derived from status indicators 420 (FIG. 4) surface mounted on PCB element 152 of lid assembly 120, which may be disposed inside battery pack module 600. Status indicator windows 1422 may convey conditions which may include, for example, the percentage of charge remaining on the battery, the amount of time (mAh) the battery element 202 may supply power to a particular device (based on power consumption rate), the time remaining before the battery may be fully charged, number of battery cycles, as well as other conditions or battery information which may be useful to a user. Status indicators 420 may include one- or two-color light emitting diodes (LEDs), such as such as RGB LEDs, red LEDs and/or green LEDs, or other display elements.

Figure 15:
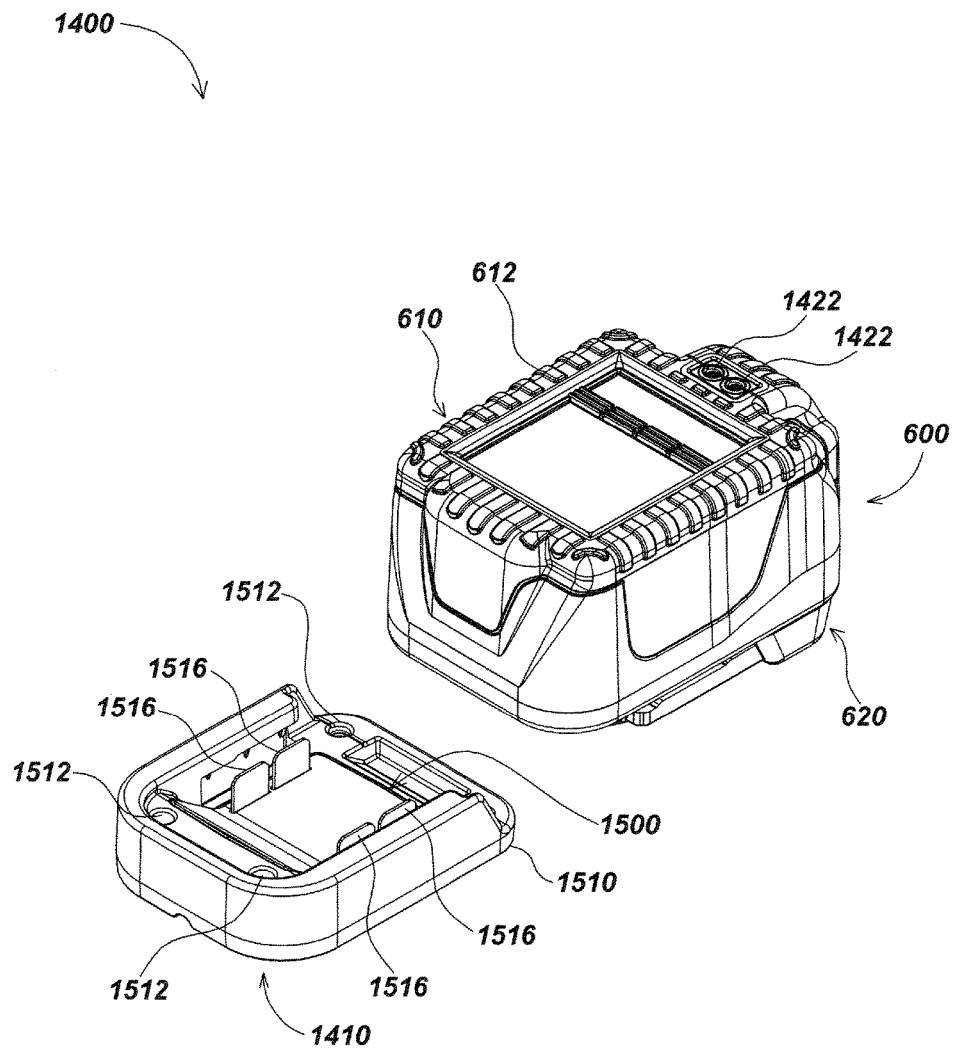
FIG. 15 is an exploded isometric view of details of the embodiment of FIG. 14.

FIG. 15 illustrates additional details of battery pack system embodiment 1400 of FIG. 14. Receiver module 1410 may include an interface module 1500, which may be seated in a cradle 1510, and may be optionally mounted to a portable device, such as a portable magnetic locator such as described in buried object locator patent applications owned by Seektech, Inc., assignee of the instant application, including, for example, U.S. patent application Ser. No. 13/041,320, filed Mar. 4, 2011, U.S. patent application Ser. No. 13/161,183, filed Jun. 15, 2011, and U.S. patent application Ser. No. 10/268,641, filed Oct. 9, 2002, the content of which are incorporated by reference herein, and/or on another device or surface, such as a wall or service vehicle, with receiver mounting holes 1512.

Battery pack module 600 may be mechanically coupled to receiver module 1410 through sliding contact seals 624 (FIG. 6) on the underside of battery pack module 600, as shown in FIGS. 6-10 and 13, to provide a waterproof seal between battery pack module 600 and receiver module 1410. When mechanically mated, one or more receiver contact elements 1516 may electrically connect with battery contact elements 132, such as shown in FIGS. 1, 5, and 13.

Figure 16:
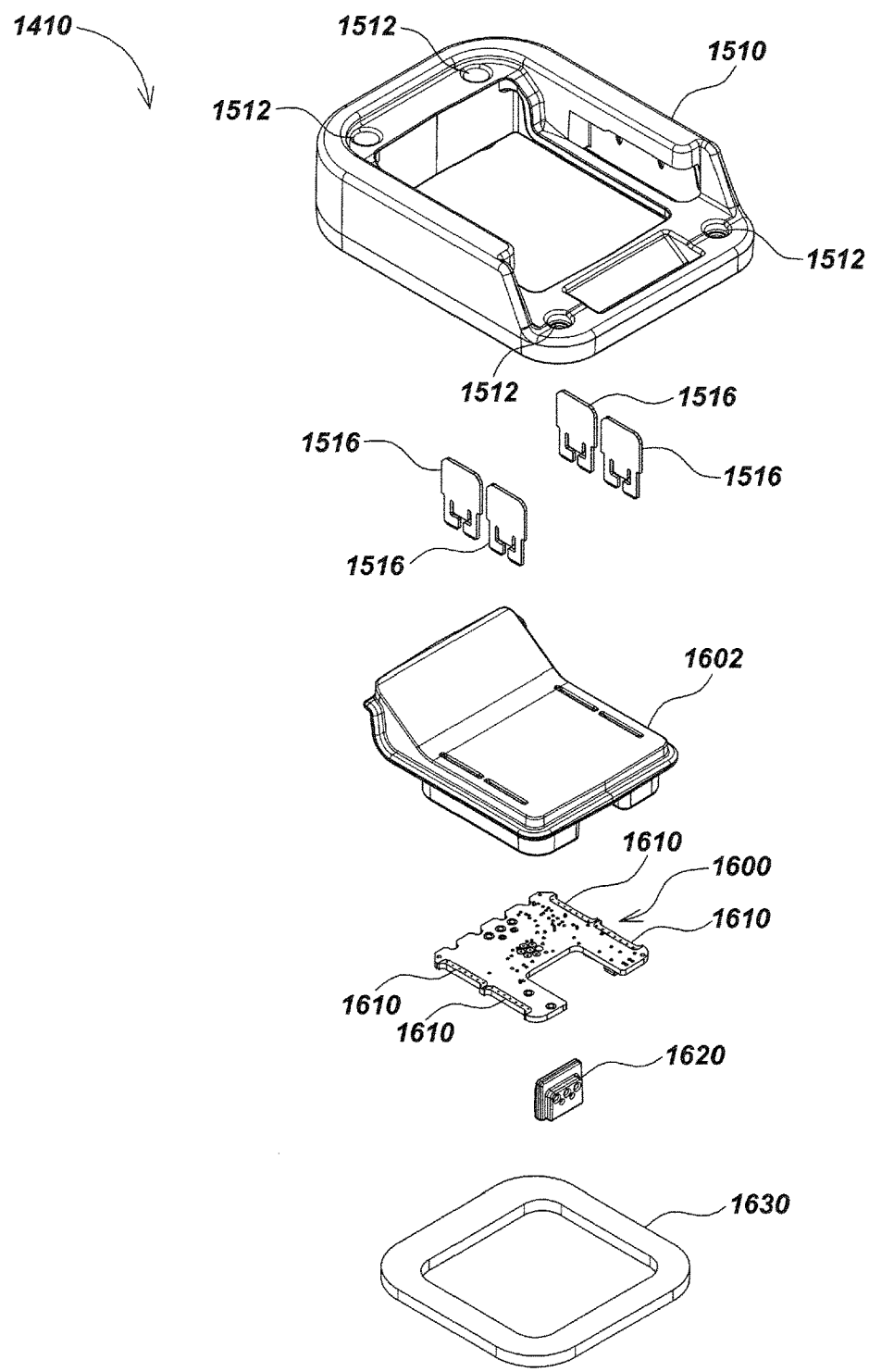
FIG. 16 is an exploded isometric view of details of the receiver module embodiment as shown in FIGS. 14 and 15.

FIG. 16 illustrates details of an embodiment of a receiver module 1410 of FIGS. 14 through 15. An interface circuit, such as PCB interface 1600, may be secured to the underside of receiver contact plate 1602 by directing one or more receiver contact elements 1516 through receiver contact plate 1602. Receiver contact elements 1516 may be bent and soldered to one or more receiver conductive pads 1610. A wire management element, such as rubber grommet 1620, may be disposed in the cavity of the receiver contact plate 1602 to protect and secure a plurality of wires (not shown) threaded through PCB interface 1600.

An sealing element 1630, which may be, for example, a layer of adhesive backed silicone foam, or other attachment mechanism, may be disposed between the bottom of contact plate 1602 and the inside of cradle 1510. Other elements and/or mechanisms for securing contact plate 1602 to cradle 1510 may also be used in various embodiments.

Figure 17A:
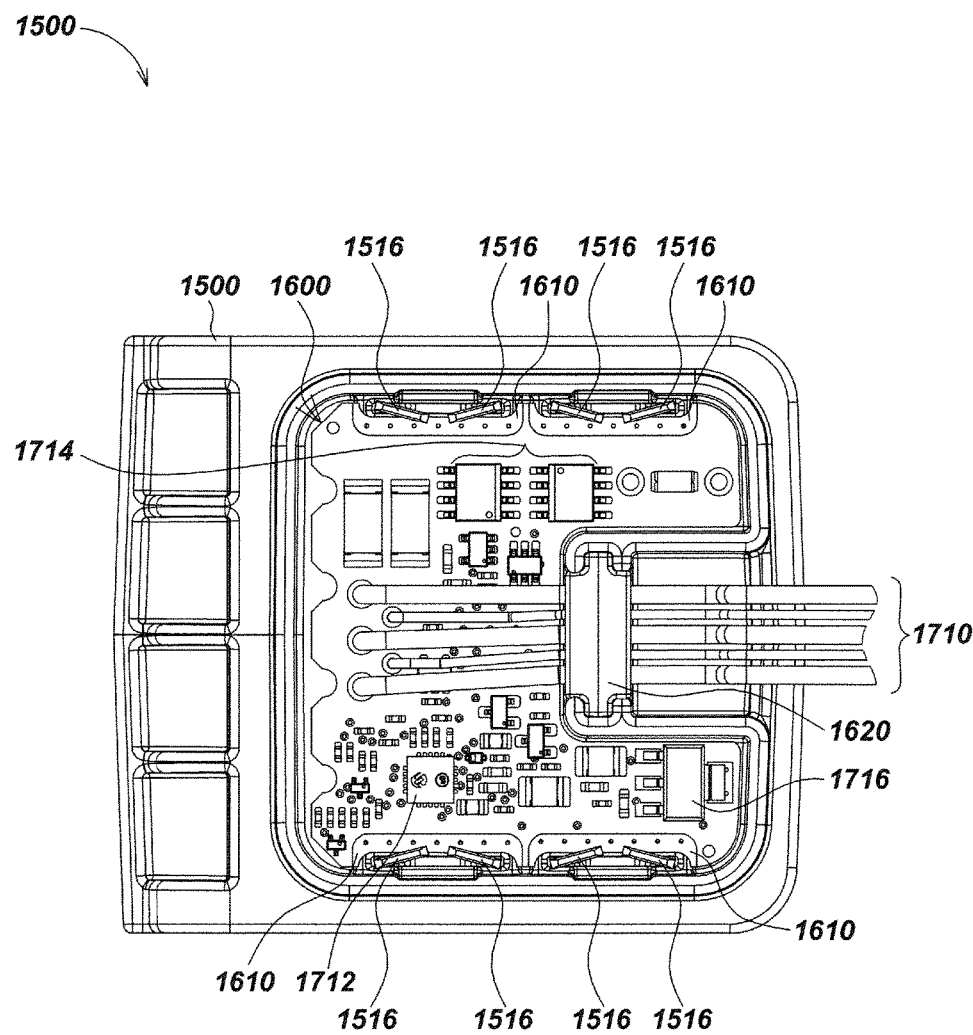
FIG. 17A is an enlarged detailed view of an embodiment of an interface circuit mounted to the underside of an alternate embodiment receiver module.
Figure 17B:
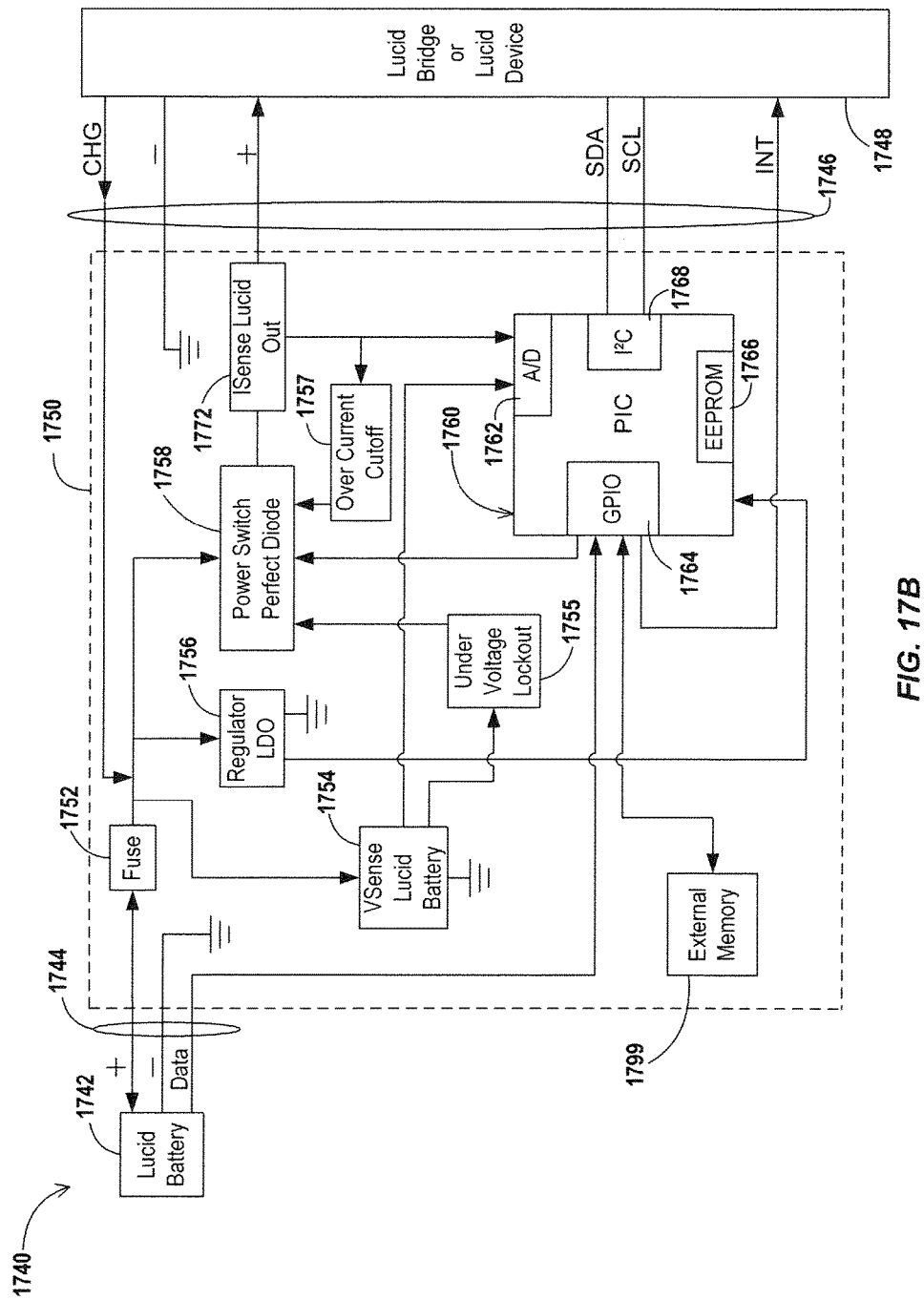
FIG. 17B is a block diagram illustrating details of an embodiment of an interface circuit in an intelligent battery system (also denoted as a Lucid Battery system)

FIG. 17A illustrates details of the underside of the interface module 1500 embodiment of FIG. 15. A PCB interface 1600 may be mounted to the underside of receiver contact plate 1602 (FIG. 16) of interface module 1500 (FIG. 15). PCB interface 1600 may be electrically connected to a battery circuit 160 (such as shown in FIG. 1B) to provide power to a device, such as a Lucid Bridge or Lucid Device 1748 (such as shown in FIG. 17B) through wire bundle 1710, which may include one or more wires for carrying current and/or data between various modules of a Lucid System.

Figure 24:
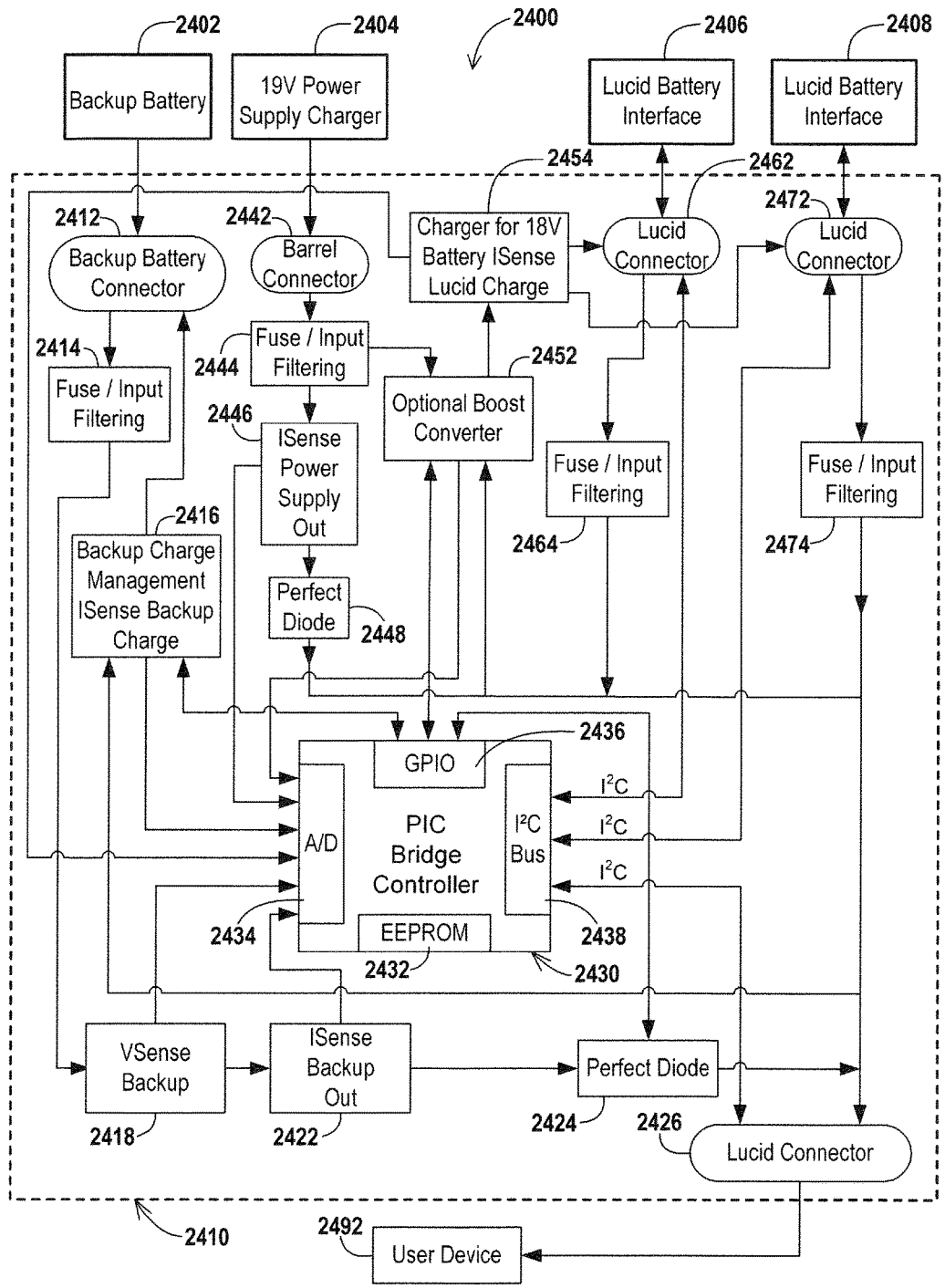
FIG. 24 is a diagram illustrating various modules and elements of an embodiment of a battery pack management system.

A "Lucid Bridge" may be referred to herein as a device, apparatus and/or system which may include one or more inputs for one or more power sources. The "Lucid Bridge" may be responsible for managing one or more power sources, and may direct power to a user device 2492, such as shown in FIG. 24, from the power source with the highest priority, which may depend on the sources connected. The "Lucid Bridge" may, for example, be used to manage input power from a plurality of lucid battery devices. The "Lucid Bridge" may also include a battery charging circuit and/or an AC power adapter or other power supply device or element. The "Lucid Bridge" may use one or more external batteries to charge an internal battery, which may optionally be a lower voltage battery. In addition, an AC adapter or other power supply element may charge external Lucid batteries and/or the internal battery or battery cells.

A "Lucid Bridge" can also support data collection and storage. "Lucid" enabled devices refer to intelligent devices and configurations of enabled devices to provide intra and inter-device connections to facilitate acquisition, collection, storage, and transfer of data and/or code between the devices.

PCB interface 1600 may include functional elements, which may be embodied in hardware, software, or combinations of both, such as control elements, processing elements, memory elements, logic gates, transistors, diodes, capacitors, and the like, interconnected to respond to input electrical signals and produce other electrical signals according to the desired electronic function. For example, a control element 1712 may include on-board elements, such as a processor or other programmable device, and a memory element to perform various signal condition and/or processing functions as described herein. For example, control element 1712 may include a Programmable Interface Controller (PIC®), such as PIC16F690-I/ML, manufactured by Microchip Technologies, or other microcontrollers, processors, DSPs, or other programmable devices, which may include on-board digital logic, such as a processing element, and a non-volatile memory element 1714, such as an electrically erasable programmable read-only memory (EEPROM), flash memory, or other digital memory device.

Control element 1712 may also include a communications interface, for supporting a bus and data transmission protocol, such as I2C, which may be used to communicate with other control elements. Other communications interfaces may alternately be used.

PCB interface 1600 may include elements such as a low-dropout (LDO) regulator 1716, such as a 3.3V LDO to provide reduced operating voltage, increased operation efficiency, and reduced heat dissipation.

An encapsulating material (not shown), such as injected epoxy, may be used to provide a seal for PCB interface 1600 and the inside compartment of receiver contact plate 1602.

Referring to FIG. 17B, an embodiment of a PCB interface schematic 1740 in a Lucid system is illustrated in accordance with certain aspects. PCB interface schematic 1740 may include a battery module, such as a lucid battery module 1742, an interface circuit 1750, and a lucid device 1748. Interface circuit 1750 may correspond with PCB interface 1600 (such as shown FIGS. 16 and 17A). Interface circuit 1750 may be electrically connected to lucid battery module 1742 and lucid device 1748. For example, lucid battery module 1742 may be electrically connected to the interface circuit 1750 with a first battery and interface contacts 1744, which may include one or more wires, such as, a power wire (+) and a ground wire (−) for carrying current, and a data wire for carrying information between lucid battery module 1742 and interface circuit 1750.

Interface circuit 1750 may be electrically connected to a Lucid device 1748 with a second wire bundle 1746, which may include one or more wires such as, for example, a power wire (+) and a ground wire (−) for carrying current; a charge (CHG) wire for providing a battery module with charge; a power interrupt (NT) line, which may optionally be used for functions such as controlling current flow from battery contact elements to powered devices and/or for other power or control functions. For example, the power NT line may be used to prevent electrical operation of a device in response to battery incompatibility, overvoltage, undervoltage, or other power or compatibility constraints or parameters. In some implementations, a battery may send an interrupt signal to an attached device to signal the device that power is about to be lost (e.g., power is at a low level, such as 5 percent or at another predefined threshold). By receiving such a signal, the device may then save any important files and/or perform other power loss functions in advance of power termination. A lower battery indication or warning such as this may also be indicated by a buzzer, lighting elements (e.g., flashing LEDs or other visual indications), or other indications.

A second wire bundle 1746 may additionally include a bidirectional bus, such as an I2C bus, which includes a serial clock (SCL) line for transmitting a clock signal and a serial data (SDA) line for transmitting a data signal.

Interface circuit 1750 may include functional elements for providing battery pack management for a Lucid system. Such elements may be embodied in hardware and/or software. A control element 1712 (FIG. 17A) may include on-board elements, such as a processor or other programmable device and a memory element to perform various signal condition and/or processing functions as described herein. For example, control element 1712 (FIG. 17A) may be a Programmable Interface Controller (PIC®) 1760, such as PIC16F690-I/ML, manufactured by Microchip Technologies, or other microcontrollers, processors, DSPs, or other programmable devices, which may include on-board digital logic, such as a processing element, and a non-volatile memory element, such as an electrically erasable programmable read-only memory (EEPROM) 1766, flash memory, or other digital memory device. PIC® 1760 may also include functional blocks, such as analog-to-digital (A/D) converter 1762, a General Purpose Input/Output (GPIO) 1764, and a bidirectional bus, such as an I2C bus 1768, transmitting a clock signal and data.

Battery control element, such as PIC® 1760, may include a GPIO element 1764 may receive instructions from, and supply data to, one or more control elements between lucid battery module 1742, interface circuit 1750, and a lucid device 1748. Such data may be provided to the lucid device 1748 via a bus and data transmission protocol. GPIO element 1764 may be configured to monitor the status of a lucid battery 1742 and drive external devices, such as communicate status information by illuminating one or more status indicators, which may be a red LED 184 and a green LED 186 (such as LED 1 and LED 2, as shown in FIG. 1B, which may alternately be other colors or color combinations, etc.). GPIO element 1764 may also be configured to provide an interrupt output.

The PIC® 1760 may be electrically connected to and/or include various analog circuitry, such as an analog-to-digital (A/D) converter 1762, which may provide an output based on measurements provided by a voltage sense 1754 for measuring the voltage across one or more battery cells (not shown) of Lucid battery module 1742, and/or other sensors or other devices for use in monitoring battery pack conditions or operation. A current sense 1772 may optionally be used for measuring the current provided to a Lucid bridge or Lucid device 1748. Optional current sense 1772 may also provide an estimate of gas gauge for non-Lucid batteries or other non-intelligent or non-compatible devices.

In one aspect of an exemplary embodiment, interface circuit 1750 may include one or more fuses 1752, such as a slow blow fuse, which may interrupt excessive current. One or more voltage regulators, such as an LDO regulator 1756 for stepping down the input voltage provided by Lucid module battery 1742.

In one aspect of an exemplary embodiment, interface circuit 1750 may include a power switch (perfect diode) 1758, which minimizes the voltage drop when forward biased, and prevents reverse power flow into a battery. Interface circuit 1750 may include one or more analog comparator circuits, such as an under voltage lockout 1755 and an over current cutoff 1757. For example, if the voltage is too low, under voltage lockout 1755 may disable switch 1758. Likewise, if current is too high, over current cutoff 1757 shuts down or disables power via switch 1758.

An external memory element 1799 may be used such that executable code and/or data may reside on one or more Lucid devices. Thus, data and other information may be shared across multiple Lucid devices. The PIC® 1760 may use GPIO 1764 to read/write from and/or to the external memory element 1799. The external memory element may be a non-volatile memory element, such as an EEPROM.

Figure 18:
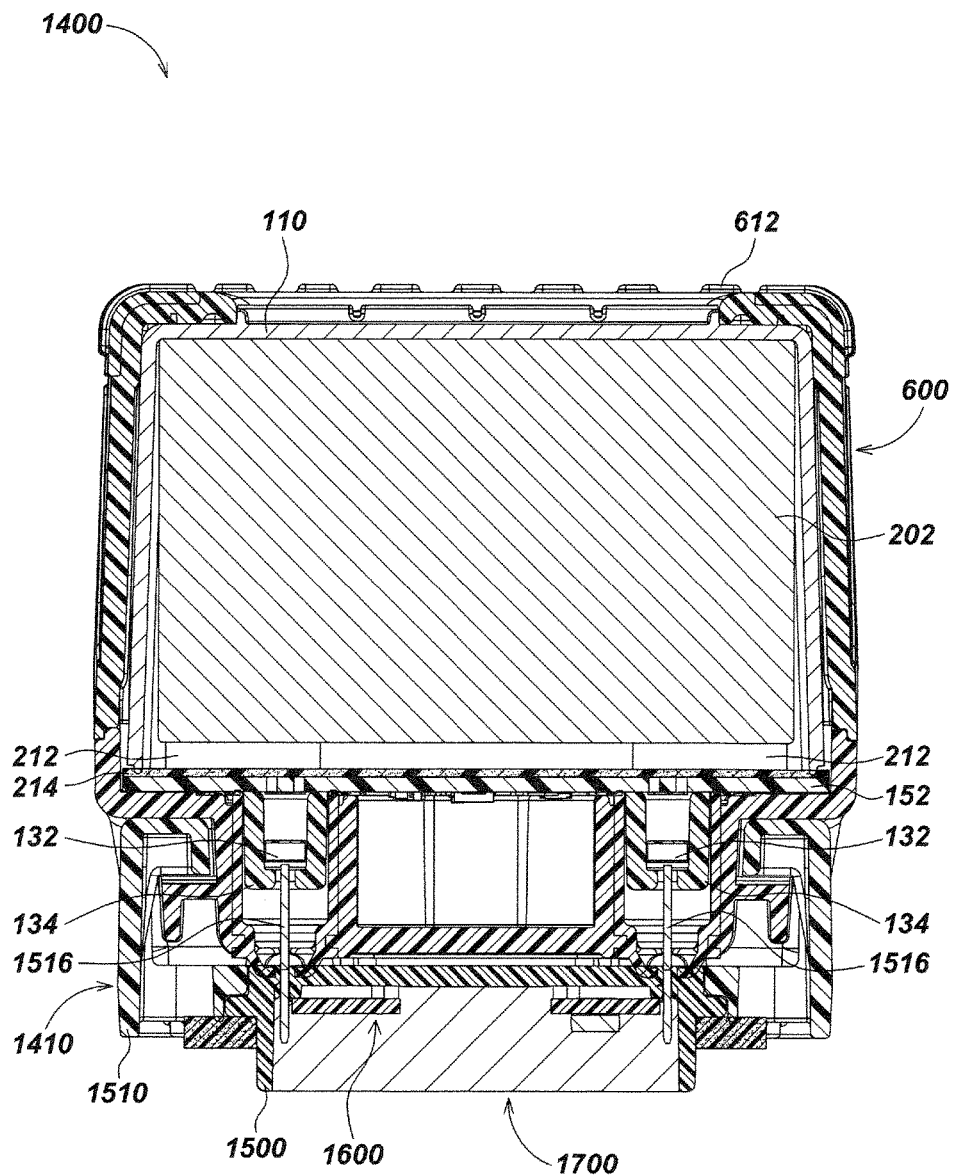
FIG. 18 is a vertical sectional view of the battery pack system embodiment of FIG. 14, taken along line 18-18.

FIG. 18 illustrates a vertical cross-section of the battery pack system embodiment 1400 as shown in FIG. 14, taken along line 18-18, illustrating various element configurations and an example mating of battery pack module 600 to receiver module 1410.

Figure 19:
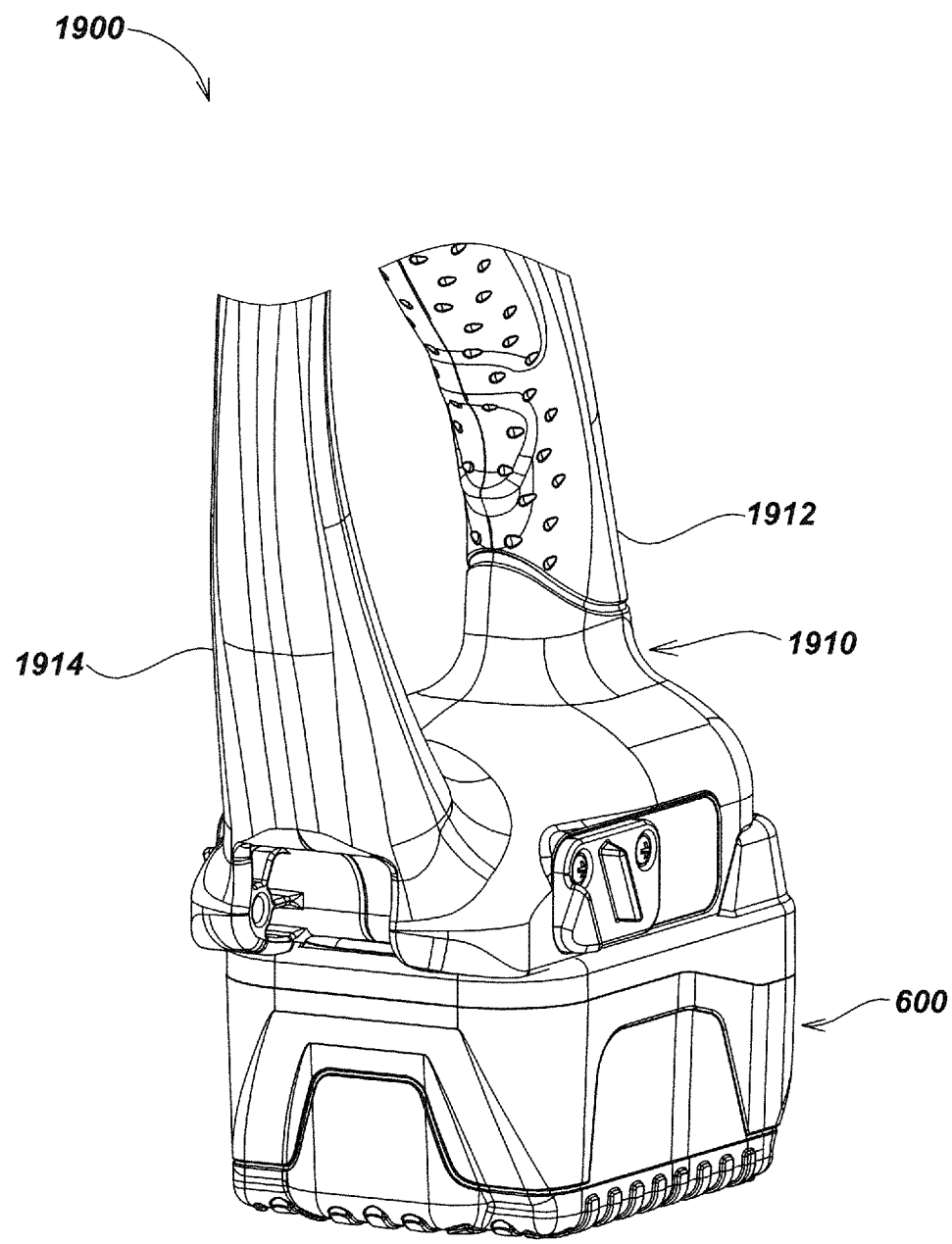
FIG. 19 is an isometric view of an alternative embodiment of a battery pack system.

FIG. 19 illustrates an isometric view of an alternative embodiment of a battery pack system 1900 with an embodiment of an attachment or handle structure including elements 1910, 1912, and 1914. For example, a receiver module, such as the alternative embodiment receiver module 1700 illustrated in FIG. 17A, may be housed in an attachment or handle structure, such as handle 1910 formed by conjoining a right half housing 1912 and a left half housing 1914. Other configurations for housing or mounting a receiver module may also be used in various embodiments.

Figure 20:
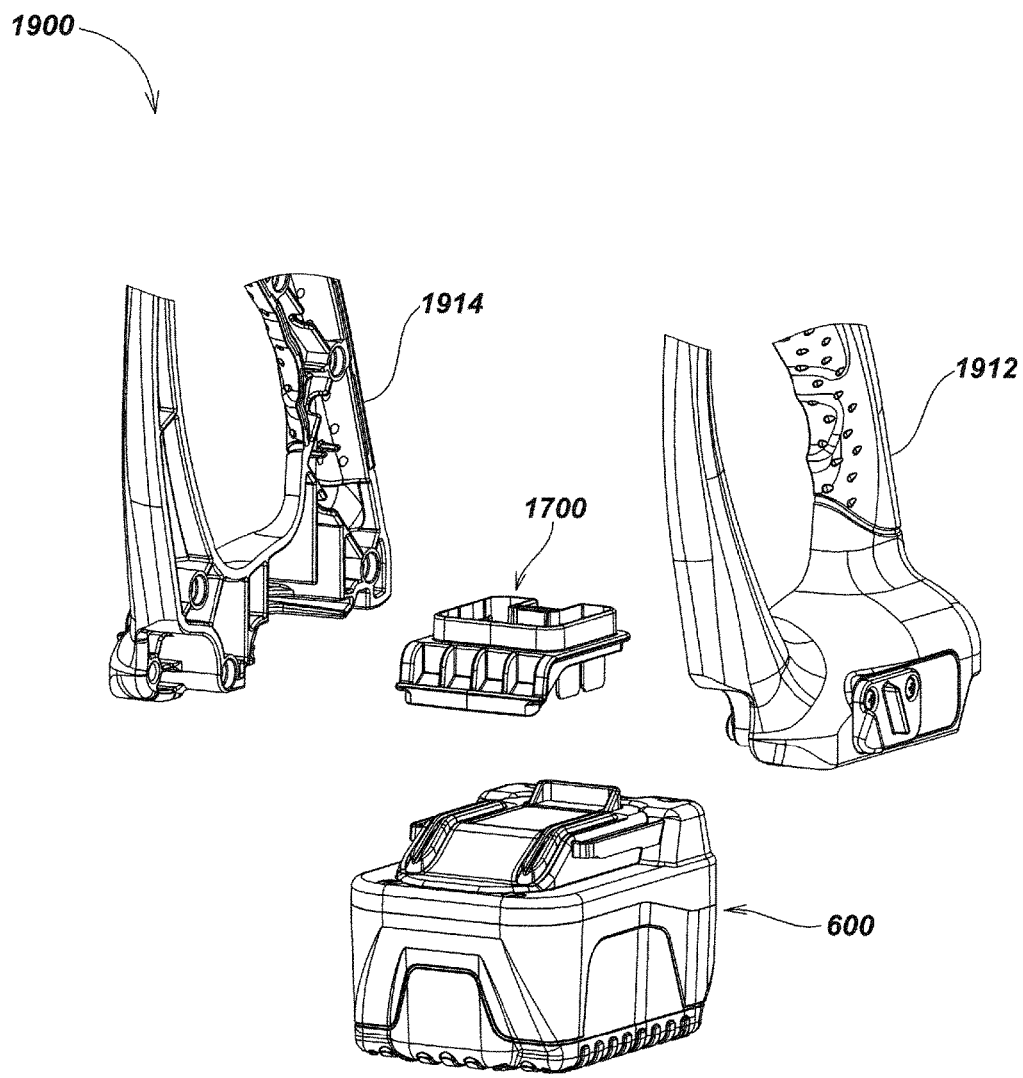
FIG. 20 is an exploded view of the alternative embodiment of FIG. 19.

FIG. 20 is an exploded view illustrating additional details of the alternative embodiment of FIG. 19.

Figure 21:
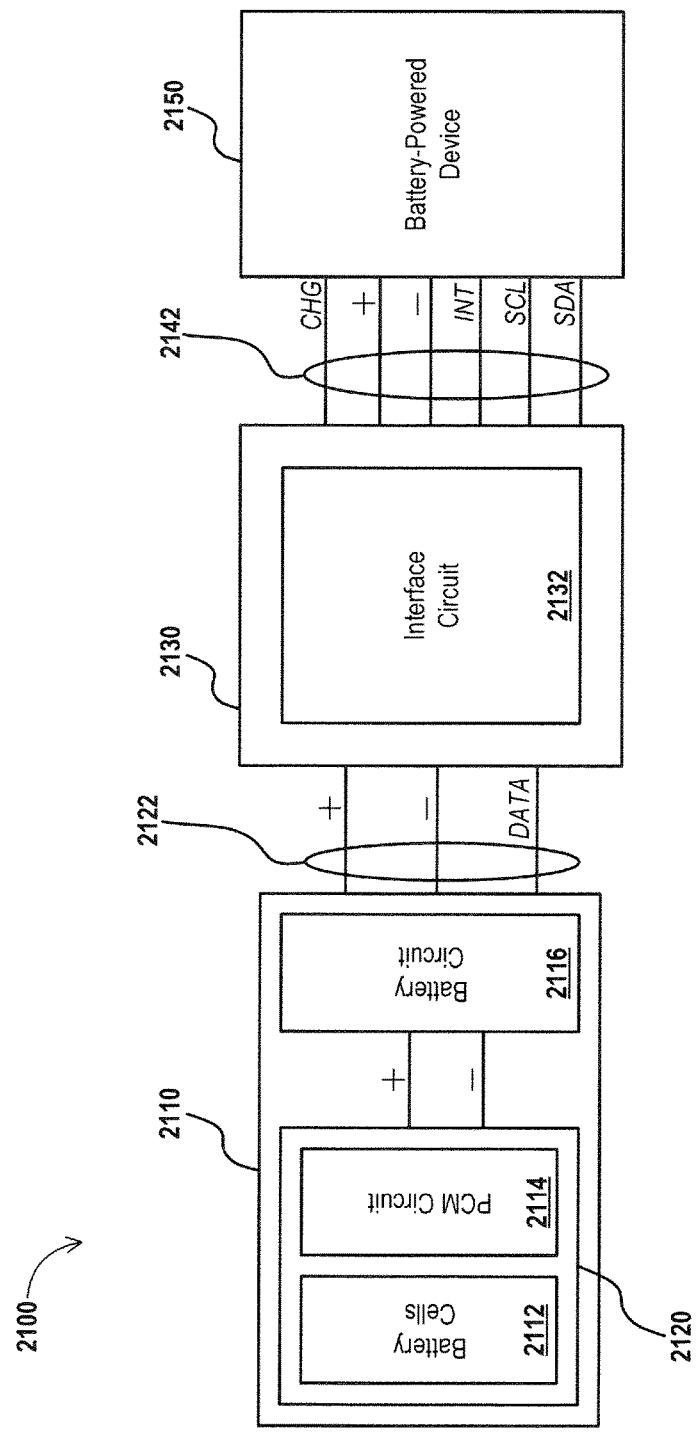
FIG. 21 is a block diagram illustrating details of a battery pack system.

FIG. 21 is a block diagram illustrating details of an embodiment of a battery system 2100. In one aspect of an exemplary embodiment, a battery module 2110 may provide power to a battery-powered device 2150 across an interface module 2130 as shown. Battery module 2110 may include, for example, a battery assembly 2120 and a battery circuit 2116. Battery assembly 2120, which may include one or more battery cells 2112 and a PCM circuit 2114, may electrically connect to a battery circuit 2116.

Battery module 2110 may be electrically connected to an interface module 2130 with a first connection, such as first battery contacts/connections 2122, which may include a power wire, a ground wire, and a data wire to carry current and information between the battery module 2110 and interface module 2130. The interface module 2130, which may include an interface circuit 2132, may be electrically connected to a battery-powered device 2150 with a second connection, such as second wire bundle 2142, which may include a power wire and a ground wire to carry current, as well as a bidirectional bus, such as an I2C bus, which includes a serial clock (SCL) line for transmitting a clock signal and a serial data (SDA) line for transmitting a data signal. Second wire bundle 2142 may additionally include a power interrupt (NT) wire for signaling, and a charge (CHG) wire for providing a battery module with charge. A PCM circuit 2114 may be included and may be bundled with battery cells to protect cells against events such as overcharging, overdischarging, short circuits or other problem conditions. PCM circuit 2114 may also be configured to perform battery charge management, in whole or in part.

A battery circuit 2116 may be included to provide functions such as displaying state of charge to a user (such as via LEDs as described previously herein, such as RGB LEDs, red LEDs and/or green LEDs). In addition, battery circuit 2116 may provide functionality such as interfacing the battery pack to a receiver or shoe element, providing charge state displays and/or information, and/or may provide voltage or other battery or battery pack parameters or other information to the receiver or shoe. Other components, such as switching elements, receiver and/or transmitter circuits, clocks, other sensors (e.g., temperature, pressure, etc.), processors, memory, or other circuit components may also be included.

An interface circuit 2132 may be included to provide functions such as measuring current provided to an attached electronic device from the battery pack, provide OR-ing diode functions or power source selection so multiple interface devices may be used on one device. In addition, it may be used to provide an electrical interface between a receiver/shoe and the battery powered device, as well as providing information such as battery state of charge, voltage, current, and/or other battery parameters to the battery powered device. First connection, such as first wire bundle 2122 illustrates DC Power, and second connection, such as second wire bundle 2142 illustrates a data connection, such as a 1-wire or other data connection.

Figure 22:
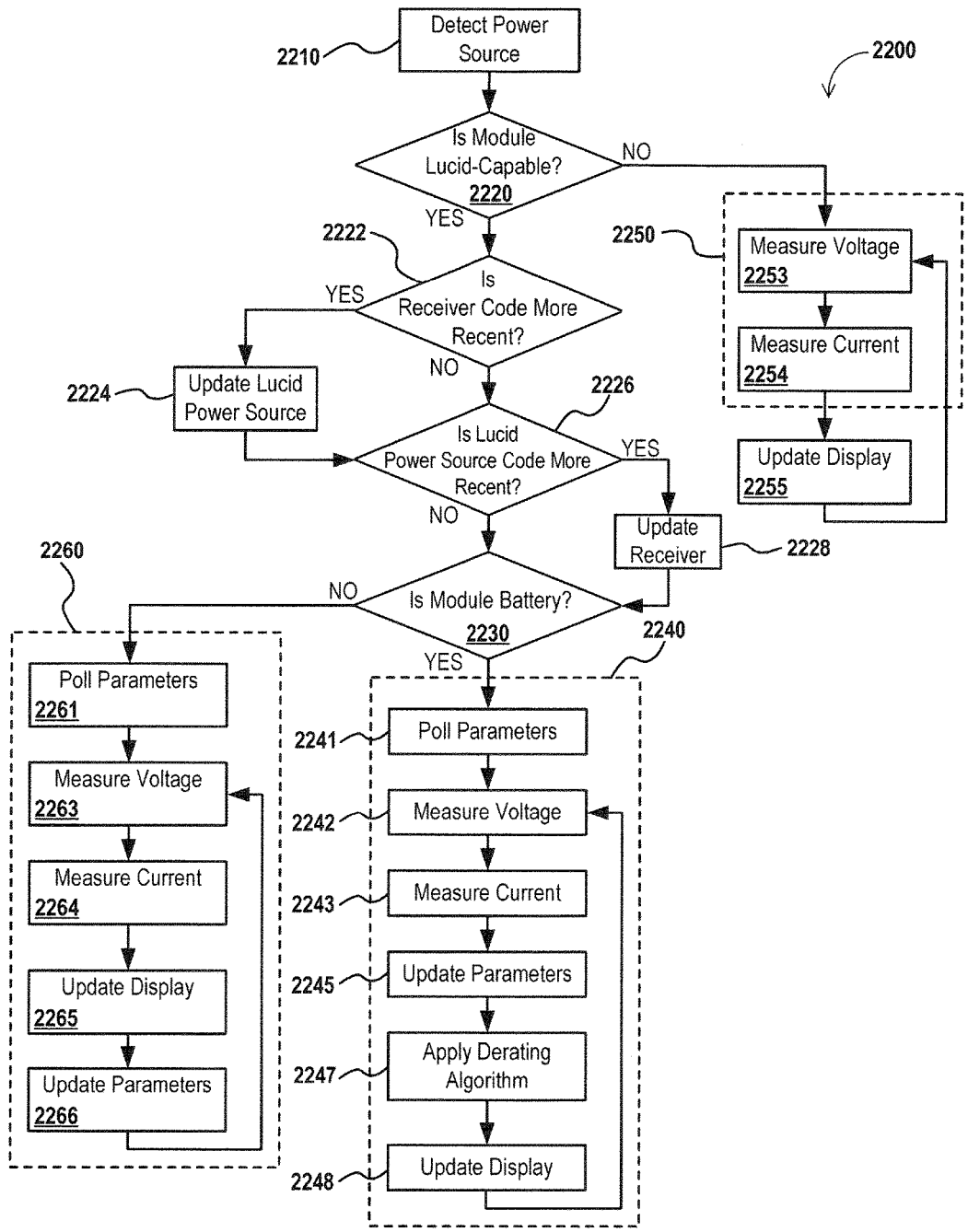
FIG. 22 is a flow diagram illustrating an embodiment of a battery pack management system and method.

FIG. 22 illustrates details of an embodiment of a process 2200 for battery pack management in a system using various intelligent (also denoted as "Lucid" based on an embodiment developed by the assignee of the instant application) and non-intelligent modules. In one aspect, process 2200 provides processing from the perspective of an interface circuit, such as, for example, interface PCB 1600 (such as shown in FIGS. 16 and 17) or interface circuit 2132 (such as shown in FIG. 21), which may be included in a shoe module, such as receiver module 1410 (such as shown in FIGS. 14-16), alternate embodiment receiver module 1700 (such as shown in FIGS. 17-18, and 20), interface module 2130 (such as shown in FIG. 21), and the like.

In one aspect, process 2200 may be used to provide one or more processing stages to determine if a module supplying power is Lucid-capable, and if the Lucid-capable module is a battery or a non-battery module. For example, an interface circuit may detect a power source at stage 2210, such as an AC or DC power supply, or a battery. Once power is detected, a determination may be made at stage 2220 as to whether a module is Lucid-capable or not. This may be based on analyzing parameters of the detected power source and/or data or information provided from the attached source.

If the source is determined to be non-Lucid capable at stage 2220, processing may continue to processing stages 2250. For example, the receiver module or interface circuit may measure a voltage at stage 2253 and a current at stage 2254, and a corresponding visual or audible display element, may be updated at stage 2255 accordingly to provide indications of voltage and/or current measurements. In some embodiments, the process may repeat voltage measurement stage 2253 and current measurement stage 2254, and update display stage 2255 periodically, such as, for example, every 10 seconds.

If the source is determined to be Lucid-capable at stage 2220, processing may proceed to a stage 2222, where a determination may be made as to whether the receiver code is more recent. If the receiver code is determined to be more recent, the lucid power source may receive an update at a stage 2224, and proceed to the stage 2226 where a determination may be made as to whether the Lucid code/instructions are more recent or should otherwise be updated.

If the receiver code is not determined to be more recent, processing may proceed to a stage 2226, where a determination may be made as to whether the Lucid power source is more recent. If at stage 2226 the Lucid power source code is determined to be more recent, an update may be sent to the receiver at a stage 2228, and may proceed to a stage 2230, where a determination may be made as to whether the Lucid-capable source is a battery or non-battery device. This may be done by, for example, receiving data or information from the device associated with the device's type and/or condition. If Lucid code is not more recent, transfer and/or updating may be omitted.

If the device is determined to be a battery at stage 2230, a processing sequence 2240 may then be executed. This may include stages of polling 2241 for one or more parameters, such as original capacity, number of charge cycles, last state of charge and/or other data or information; measuring a voltage at stage 2242; measuring a current at stage 2243; updating parameters at stage 2245, such as remaining capacity, temperature inside the battery pack module, and the like; applying a derating algorithm at stage 2247 to reflect aging, and updating a display 2248. In some embodiments, processing stages 2241, 2242, 2243, 2245, 2247, and 2248 may be repeated periodically, such as at a periodic interval such as 10 seconds.

If the source is determined to be a non-battery at stage 2230, processing may proceed to a processing sequence 2260 for a non-battery, which may include a stage 2261 for polling parameters, a stage 2263 for measuring voltage, a stage 2264 for measuring current, a stage 2265 for updating a display, and a stage 2266 for updating parameters. Processing stages 2261, 2263, 2264, 2265, and 2266 may be repeated periodically, such as at a periodic interval such as 10 seconds.

Figure 23:
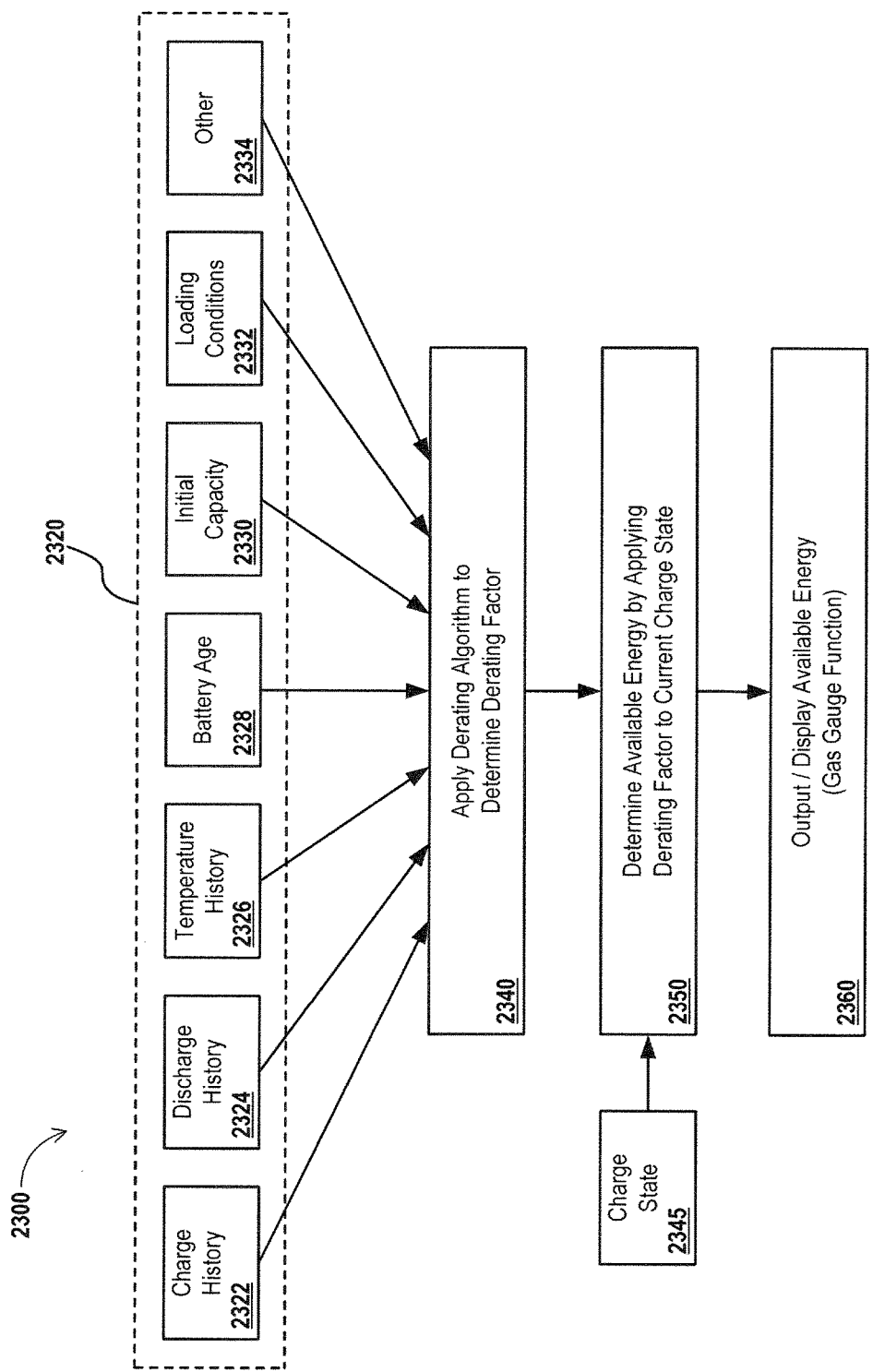
FIG. 23 is a diagram illustrating details of an embodiment of a method for providing battery charge state information.

FIG. 23 illustrates details of an embodiment of a process 2300 for determining a state of charge (SOC) for a battery. A derating algorithm process 2340 may be configured to determine a derating factor for an intelligent or Lucid battery, which may be an intelligent or Lucid battery embodiment as described previously herein. One or more battery parameter inputs 2320, such as charge history data 2322, discharge history data 2324, temperature history 2326, battery age (temporal and/or use-based) 2328, initial capacity 2330, loading history conditions 2332, and/or other data or information 2334 may be provided to a derating module where a derating algorithm process stage 2340 may be applied to determine a derating factor. Once a derating factor is determined at stage 2340, current charge state information 2345 may be provided to an energy determination module where an energy determination process stage 2350 may be applied to determine, based on a function of the current charge state and the derating factor, an available energy metric. The available energy metric may then be displayed and/or output at a stage 2360, such as in the form of a "gas gauge" display or other display of available energy in the battery pack. Other information, such as the received parameters inputs or other functions of the received inputs may also be displayed in some embodiments.

Referring to FIG. 24, details of an embodiment of a Lucid system 2400 are illustrated in accordance with certain aspects. In one aspect, one or more power supplies may provide power, data, and other information, to a user device 2492 across a Lucid bridge circuit 2410. One or more power supplies may include a backup battery 2402 and/or a 19V power supply charger 2404. One or more power supplies may also include one or more Lucid battery modules (not shown), which may be electrically interfaced with one or more interface circuits, such as Lucid interface circuits 2406 and 2408.

Fuse/input filtering blocks 2414, 2444, 2464, and 2474 may be used to fuse and filter current provided by one or more power supplies, such as backup battery 2402, 19V power supply charger 2404, and/or one or more Lucid battery modules (not shown), which may provide overcurrent protection, charge management, noise reduction, and the like.

In one aspect of an exemplary embodiment, the 19V power supply charger 2404 may provide power to the Lucid bridge circuit 2410 via a barrel connector 2442. Perfect diode 2448, which minimizes the voltage drop when forward biased, may be used to prevent reverse power flow into a battery. The 19V power supply charger 2404 may provide charge to one or more Lucid batteries (not shown) through an optional boost converter 2452 and charger 2454. A control element, such as a PIC bridge controller 2430, may be used to monitor the charge current from charger 2454, and update the state of charge of one or more Lucid batteries (not shown). For example, if the 19V power supply charger 2404 may provide power to the user device 2492, the A/D 2434 may read the current supplied from a current sense 2446, and use such value to determine whether the 19V power supply charger 2404 is able to charge the backup battery and/or Lucid batteries (not shown).

For example, backup battery 2402 may provide power to the Lucid bridge circuit 2410 via a backup battery connector 2412. The 19V power supply charger 2404 and/or one or more Lucid batteries (not shown) may be used to charge the backup battery 2402 by implementing a backup battery charge management mechanism 2416. Backup battery charge management mechanism 2416 may also include a current measurement, which may be read by an A/D 2434, such that PIC bridge controller 2430, may keep track of the state of charge (SOC) of the backup battery 2402.

In an exemplary embodiment, PIC bridge controller 2430 may use a current sense 2422 to monitor the SOC of the backup battery 2402 while supplying power to user device 2492. A voltage sense 2418, which may provide information to A/D 2434, may be used to allow the PIC bridge controller 2430 to monitor the voltage of the backup battery. An undervoltage-lockout (UVLO) circuit may be used to protect the backup battery 2402, and monitor charge. For example, the UVLO circuit may turn off the circuit if the battery voltage drops below a specific threshold.

The PIC bridge controller 2430 may store data, such as the SOC of backup battery 2402, the number of charge and/or discharge cycles, the serial numbers of Lucid batteries which may be attached, and the like, on a non-volatile memory element, which may be an internal EEPROM 2432 or other memory device.

A GPIO 2436 may be used to control the backup battery charger, such as enabling and/or disabling. A perfect diode 2424 may be used to prevent reverse power flow into a battery when current is supplied to the user device 2492.

One or more Lucid battery modules (not shown), may provide power to the user device 2492 via a plurality of Lucid connectors 2426, 2462, and 2472, which may be electrically interfaced with one or more interface circuits, such as Lucid interface circuits 2406 and 2408, through perfect diode 1758 (such as shown in FIG. 17B), to prevent reverse power flow.

In one aspect of an exemplary embodiment, the PIC bridge controller 2430 may communicate via I2C with one or more control elements, such as PIC 1760 (FIG. 17B), which may be implemented on one or more Lucid interface circuits 2406 and 2408, from an I2C bus 2438. This communication may include receiving and/or updating parameters of a Lucid battery (not shown). The User Device 2492, which may include a control element, such as a microcontroller, may communicate via I2C to the PIC bridge controller 2430 to receive data. Such data may include, for example, power supplies connected, power supply selected, and/or SOC of one or more batteries, such as backup battery 2402 and one or more Lucid batteries (not shown), which may be electrically interfaced with Lucid interface circuits 2406 and 2408.

Figure 25:
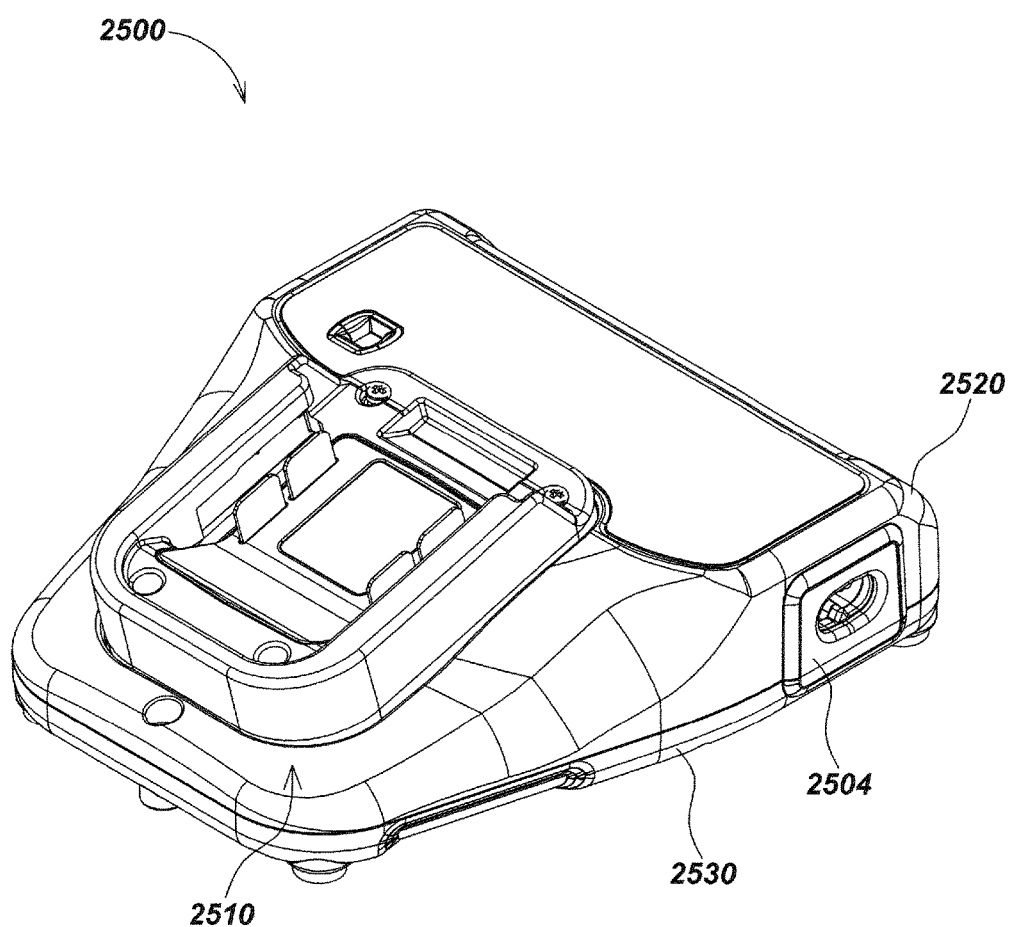
FIG. 25 is an isometric view of an embodiment of a battery charging module.

Referring to FIG. 25, details of an embodiment of a battery charging module 2500 are illustrated in accordance with certain aspects. In one aspect, battery charging module may include a housing, which may be formed by mating an upper housing 2520 and a lower housing 2530. A power supply (not shown), such as a 21V power supply 2708 may be enclosed within the housing. A plug insert 2504 may be formed by housing halves 2520 and 2530. Battery charging module may further include a charger receiver module 2510 mounted to the surface of the upper housing 2520.

Figure 26:
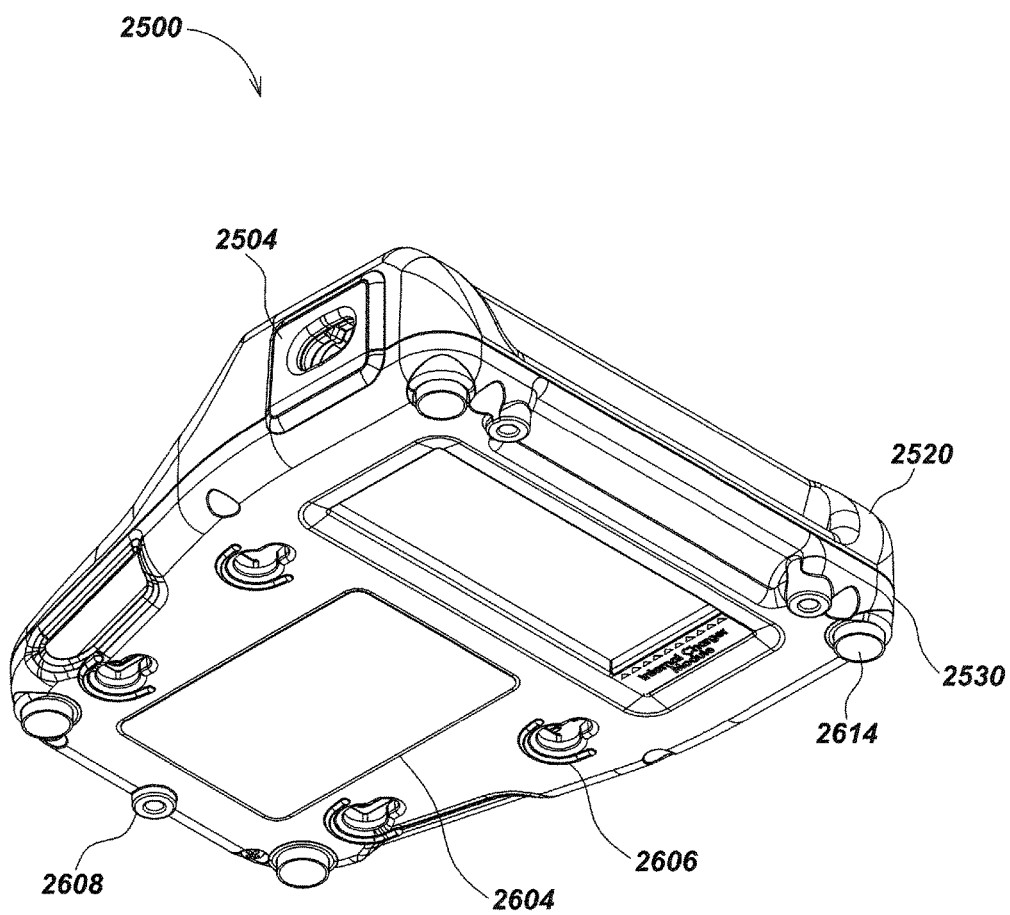
FIG. 26 illustrates the battery charging module embodiment of FIG. 25, taken from the bottom side thereof.

Referring to FIG. 26, details of an embodiment of a battery charging module 2500 are illustrated from the bottom side thereof. For example, battery charging module may be optionally mounted to the wall with a brow element 2604 and wall mount holes 2606, or may be mounted to another surface with screw holes 2608. A plurality of feet, such as non-skid rubber feet 2614 may be disposed on the bottom surface of lower housing 2530 to provide stability and traction on a slick surface.

Figure 27:
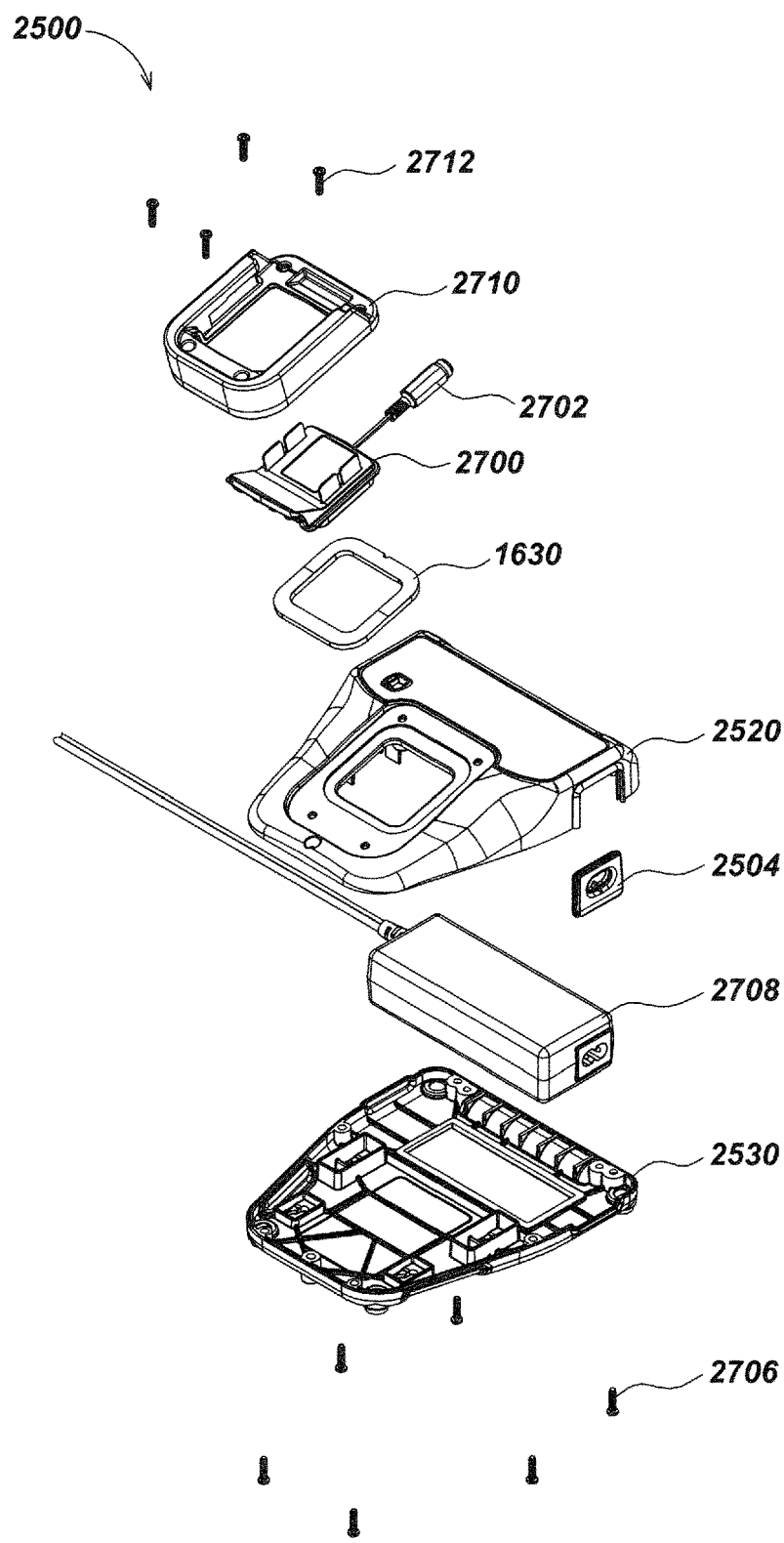
FIG. 27 is an exploded view of the battery charging module embodiment of FIG. 25.

FIG. 27 is an exploded view of the battery charging module 2500 of FIG. 25, illustrating details thereof. For example, a power supply 2708 may be disposed with a housing formed by upper housing 2520 and lower housing 2530 mated together and secured by one or more fasteners, such as screws 2706. An AC power cable (not shown) may electrically connect to power supply 2708 through a port or plug insert 2504 formed between upper housing 2520 and lower housing 2530. In an exemplary embodiment, the receiver module 2510 (FIG. 25) may include a charger contact receiver assembly 2700 secured in a cradle 2710, which may be mounted to the top surface of the upper housing 2520 with one or more fasteners, such as screws 2712. An adhesive element 1630 (FIG. 16), which may be, for example, a layer of adhesive backed silicone foam, or other attachment mechanism, may be disposed between the bottom of charger contact receiver assembly 2700 and the inside of cradle 2710. Other elements and/or mechanisms for securing charger contact receiver assembly 2700 to cradle 2710 may also be used in various embodiments. The charger contact receiver assembly 2700 may include a DC power cable assembly 2702, which may include one or more hook up wires coupled to a DC power receptacle, to provide power and regulate voltage to the battery pack module 600 (FIG. 6).

Figure 28:
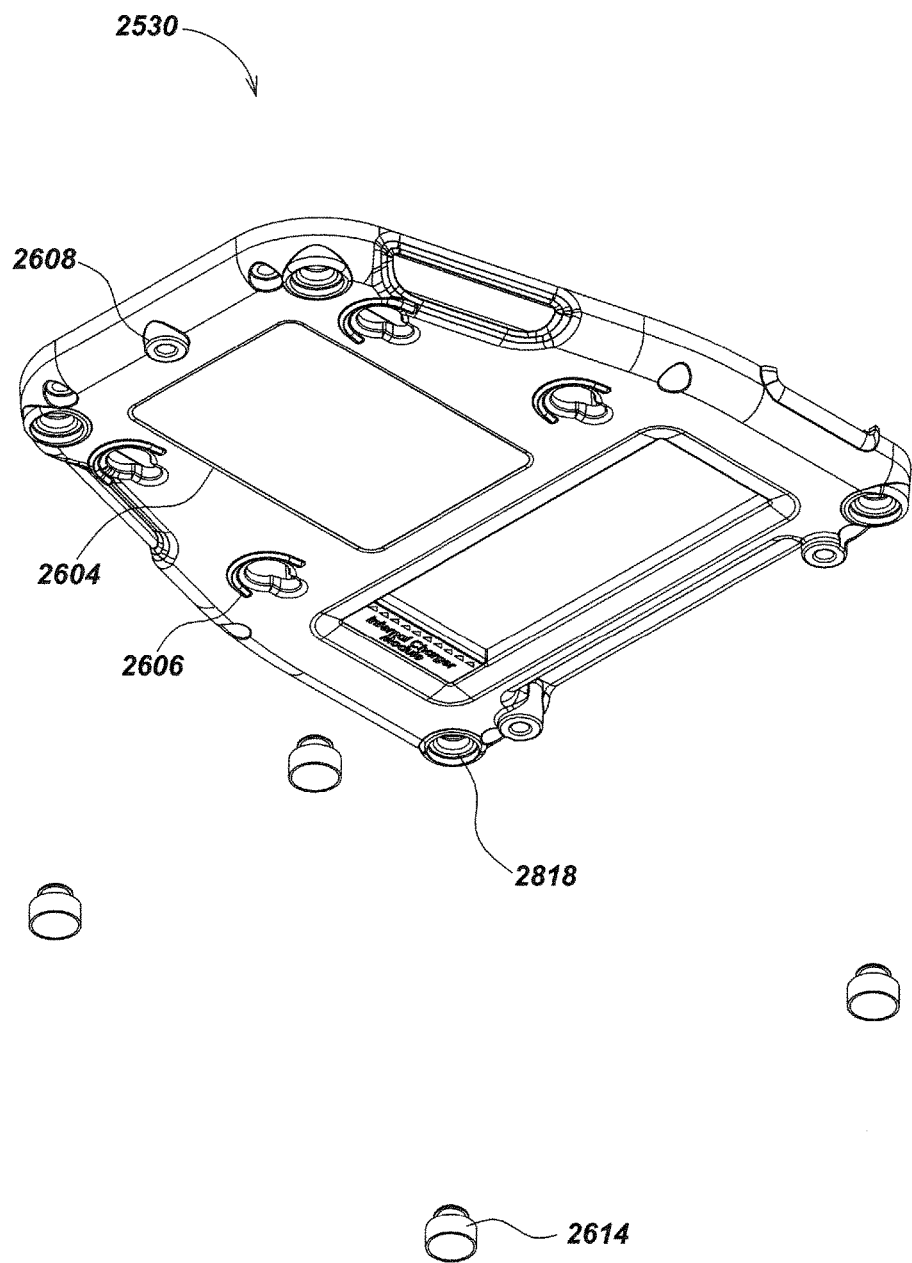
FIG. 28 is an exploded view of the lower housing half of FIG. 25.

FIG. 28 is an exploded view of the lower housing half of FIG. 25, illustrating details. For example, one or more non-skid rubber feet 2614 may be fitted into foot holes 2818 on the bottom surface of lower housing 2530 to provide stability and traction on a slick surface. The battery charging module may be optionally wall mounted with wall mount holes 2606 or screw holes 2608.

Figure 29:
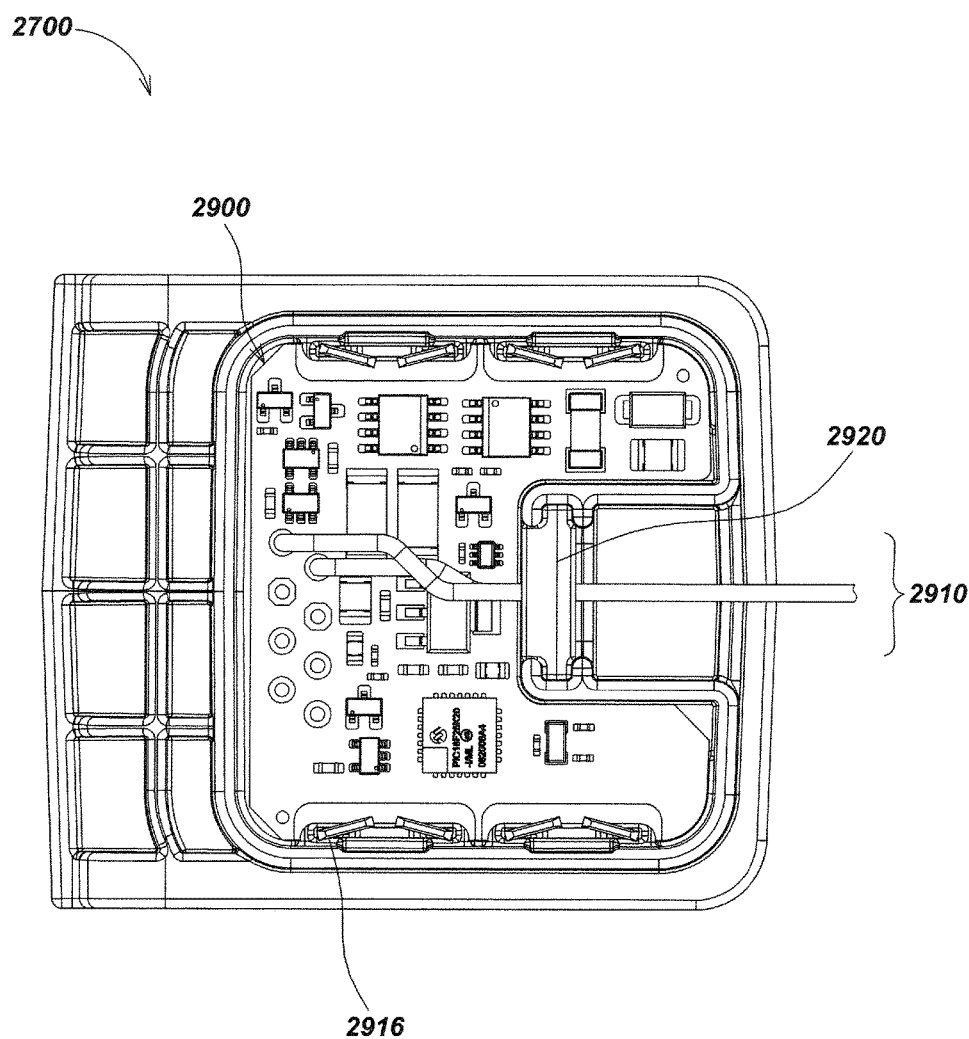
FIG. 29 is an enlarged detailed view of an embodiment of the receiver module of FIG. 27, taken from the bottom side thereof.

FIG. 29 illustrates details of an embodiment of the charger contact receiver assembly embodiment 2700 of FIG. 27. In one aspect, an interface circuit, such as a charger PCB 2900, may be disposed on the underside of charger contact receiver assembly 2700. Charger PCB 2900 may be electrically connected to a battery circuit 3016 (FIG. 30) to provide power to a battery module 3010 (FIG. 30), through wire bundle 2910. One or more charger contact elements 2916 may be bent and soldered to charger PCB 2900. Wire bundle 2910 may be secured through a grommet 2920.

Figure 30:
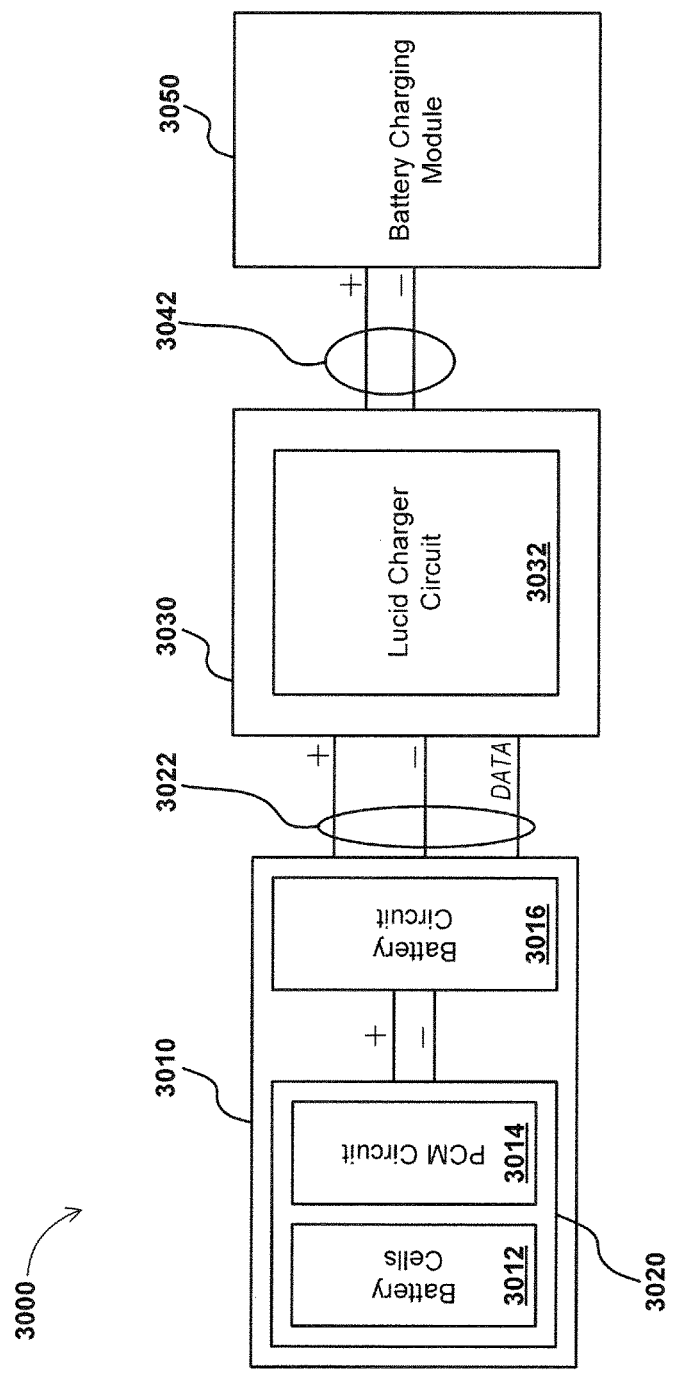
FIG. 30 is a block diagram illustrating details of a battery pack charging system.

FIG. 30 is a block diagram illustrating details of a battery pack charging system 3000. In one aspect of an exemplary embodiment, a battery module 3010 may receive power from a battery charging module 3050 across a charger board/module 3030, as shown. Battery module 3010 may include, for example, a battery assembly 3020 and a battery circuit 3016, and/or other circuitry not shown, such as control and/or monitoring circuitry, communications circuitry, sensor circuitry, and the like. Battery assembly 3020, which may include one or more battery cells 3012 and additional circuitry, such as a PCM circuit 3014, may electrically connect to a battery circuit 3016.

Battery module 3010 may be electrically connected to an interface module 3030 with a first connection 3022, which may include a power wire, a ground wire, and a data wire to carry current and information between the battery module 3010 and interface module 3030. The interface module 3030, which may include an interface circuit 3032, may be electrically connected to a battery charging module 3050 with a connection 3042, such as a cable, which may include a power wire and a ground wire to carry current. A PCM circuit 3014 may be included and may be bundled with battery cells to protect cells against events such as overcharging, overdischarging, short circuits and/or other problem conditions. PCM circuit 3014 may also be configured to perform battery charge management, monitoring, and/or control, in whole or in part.

A battery circuit 3016 may be included to provide functions such as displaying state of charge to a user (such as via LEDs as described previously herein, such as RGB LEDs, red LEDs and/or green LEDs). In addition, battery circuit 3016 may provide functionality such as interfacing the battery pack to a receiver or shoe element, providing charge state displays and/or information, and/or may provide voltage or other battery or battery pack parameters or other information to the receiver or shoe. Other components, such as switching elements, receiver and/or transmitter circuits, clocks, other sensors (e.g., temperature, pressure, etc.), processing elements, memory, and/or other circuit components may also be included.

A charger circuit 3032 may be included to provide functions such as measuring battery parameters and providing power to the battery module 3010. In addition, it may be used to provide an electrical interface between a charger board/module 3030 and the battery charging module 3050, as well as providing power to the battery module 3010 and regulating the voltage provided to the battery module 3010. Connections 3022 and 3042 may be DC Power connections.

Figure 31A:
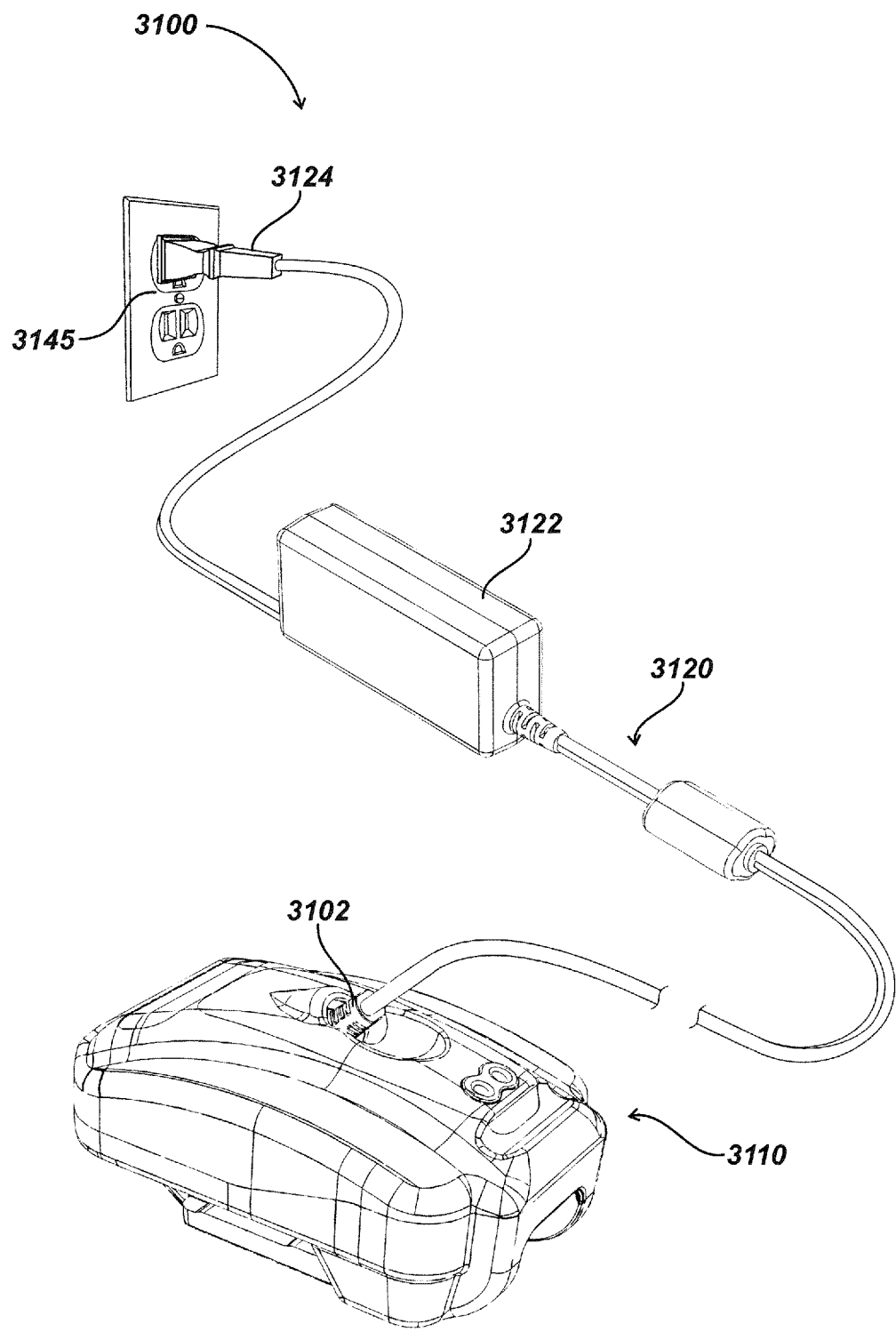
FIG. 31A illustrates details of an embodiment of a battery pack charging system.

Referring to FIG. 31A, details of an alternate embodiment power supply or Lucid compatible power supply system 3100 are illustrated. In one aspect, an AC adapter 3120, which may include a transformer 3122, may be used to electrically connect a module 3110 via a port 3102 to a power source such as, for example, an electrical outlet 3145 via a plug 3125. Gas or solar panels, or other power generation devices may optionally be used as a power source to provide power to the module 3110.

Figure 31B:
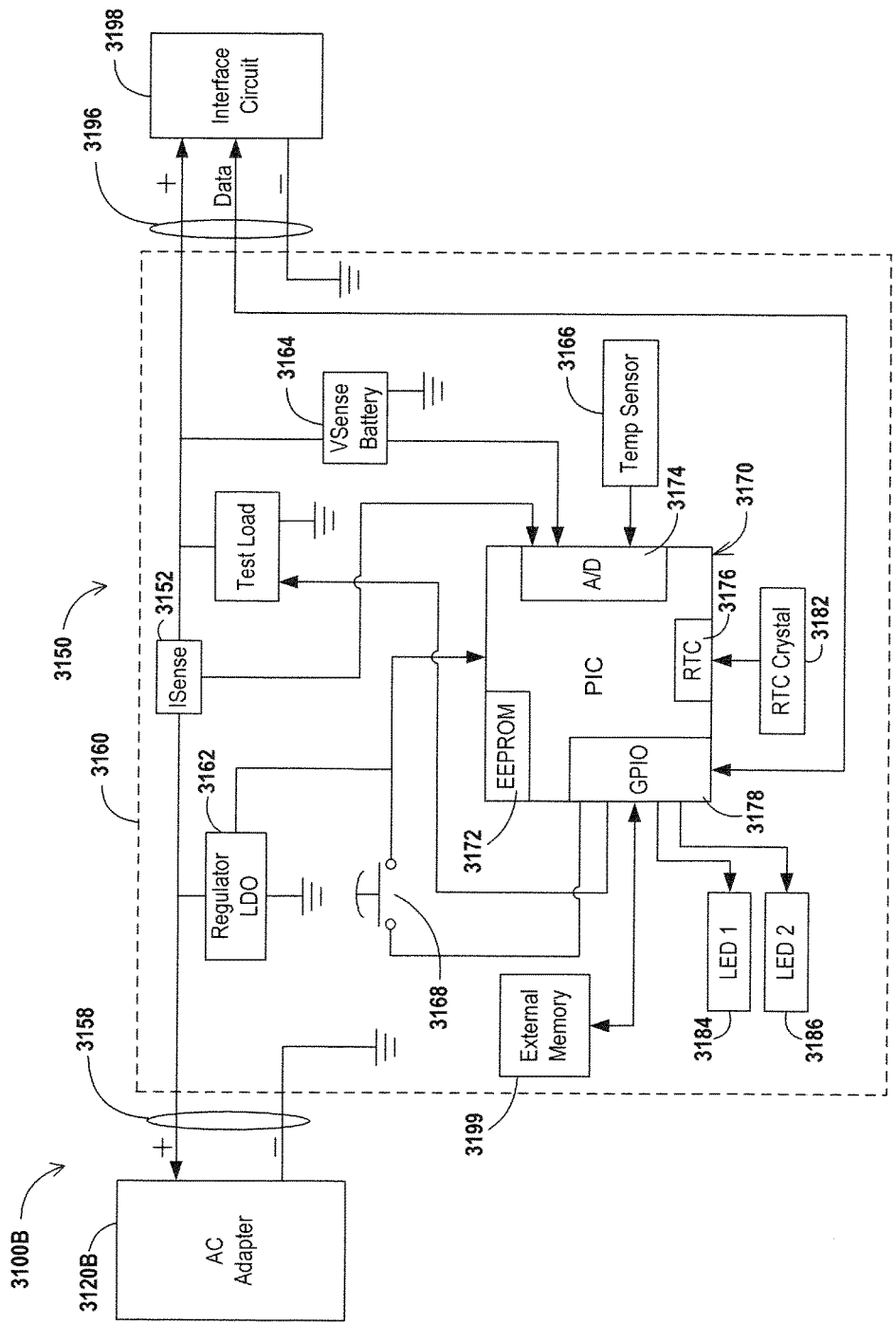
FIG. 31B illustrates details of an alternate embodiment battery pack charging system.

Referring to FIG. 31B, details of an alternate embodiment power supply system 3100B are illustrated. In one aspect, a circuit element 3150 may be incorporated into a battery element such as lid element 120 (as shown in FIGS. 1A, and 2-5), as illustrated in the schematic of FIG. 31B. Such a circuit may be used as a part of an intelligent battery system (also denoted herein as a "Lucid" or "Lucid Battery" system in accordance with an embodiment provided by Seektech, Inc., assignee of this application). Circuit element 3150 may include a battery circuit 3160, and/or an interface circuit 3198, such as a Lucid Battery interface circuit to implement functionality as described herein. Battery circuit 3160 may be on or incorporated in lid assembly 120 (FIGS. 1A, and 2-5), such as in the form of an integral PCB lid. An AC adapter 3120B, may be electrically connected to the battery circuit 3160 with a first wire bundle 3158, which may include one or more wires, such as, a power wire (+) and a ground wire (−), for carrying current between the AC adapter and battery circuit 3160.

Battery circuit 3160 may be electrically connected to an interface circuit 3198, such as a Lucid Battery interface, with a second wire bundle 3196, which may include one or more wires such as, for example, a power wire (+), a data wire (DATA), and a ground wire (−) for carrying current and information between battery circuit 3160 and interface circuit 3198.

Battery circuit 3160 may include functional elements for providing battery pack and battery system management. Such elements may be embodied in hardware and/or software. A battery control element, such as a PIC® element 3170, manufactured by Microchip Technologies, may include an on-board processing element, such as a microprocessor, microcontroller, or other programmable device, along with one or more memory elements, to perform various signal condition and/or processing functions as described herein. For example, a PIC® 3170 may include on-board digital logic, such as a processing element, as well as a non-volatile memory element, such as an electrically erasable programmable read-only memory (EEPROM) 3172, flash memory, and/or other digital memory devices. These may be collectively referred to as a battery control element or module. The processor element, such as the PIC® 3170, may also include integrated functional blocks, such as analog-to-digital (A/D) converter 3174, digital to analog (D/A) converter (not shown) a real time-clock 3176, a General Purpose Input/Output (GPIO) 3178, and/or other peripheral blocks.

The GPIO element 3178 may be configured to receive instructions from, and supply data to, one or more control elements between battery circuit 3160 and interface circuit 3198. Such data may be conveyed to the interface circuit 3198 via a bus and data transmission protocol. GPIO element 3178 may monitor the status of a power supply, and communicate status information by illuminating one or more status indicators, such as a red LED 3184 and a green LED 3186 (e.g., LED 1 and LED 2).

The processing element may be electrically connected to and/or include various front-end analog circuitry, such as an analog-to-digital (A/D) converter 3174, sensors, such as a current sense 3152, a voltage sense 3164, a temperature sensor 3166, pressure sensors, moisture sensors, serial number/device identification information, and/or other sensors, components or other elements for use in measuring, monitoring, and/or controlling AC adapter or power supply conditions or operation. A current sensor 3152, a voltage sensor 3164 and a temperature sensor 3166 may measure the respective current, voltage, and temperature of the power supply and such current, voltage, and temperature data may be conveyed to interface circuit 3198.

The processing element may additionally include or be connected to wired and/or wireless communication element to provide one or more communications interfaces to provide communication between connected devices. The communication elements may be used to provide a bus and data transmission protocol, which may be used to communicate with other control elements. For example, various parameters saved in EEPROM 3172, such as state of charge (SOC), temperature data, voltage data, time data, and the like may be polled by the interface circuit 3198.

In one aspect of an exemplary embodiment, battery circuit 3160 may include one or more voltage regulators, such as LDO regulator 3162 for stepping down the input voltage provided from AC adapter 3120B.

In one aspect of an exemplary embodiment, one or more clock elements, such as a real-time clock (RTC) crystal 3182 (and associated components such as electronics, processors, memories, and the like (not shown)), may be used to establish a reference time base, which may be useful for estimating battery self-discharge, or other battery conditions or states. Collected data may be time stamped or otherwise marked with time information.

For example, nonvolatile memory element, such as EEPROM 3172 may store information, such as battery condition, battery state, and/or real time clock 3176 data. Based on one or more battery parameter inputs stored in EEPROM 3172, such as charge history, discharge history, temperature, battery age, initial capacity, current battery capacity, estimated life remaining, device cycling, and the like, the processing element may provide an indication of battery conditions, such as charge or discharge state, battery cycling information, remaining battery life, and/or other similar or related information.

AC adapter 3120B may supply a test load 3188 with electrical current, and may monitor various parameters in order to determine the ampere-hours of energy delivered by the battery while it is connected to test load 3188. In addition, battery circuit 3160 may be configured to adjust a battery charge state based on a particular condition. For example, if a battery has not had a predefined event (e.g., such as a charge/discharge cycle) within a predefined time interval (which may be based on a real-time clock element, such as RTC 3176, the test load 3188 may be used to discharge the battery from its correct state of charge to a more suitable long term storage state of charge. For example, for lithium batteries, it may be desirable that the battery is stored at 40-60 percent of full charge.

Figure 32:
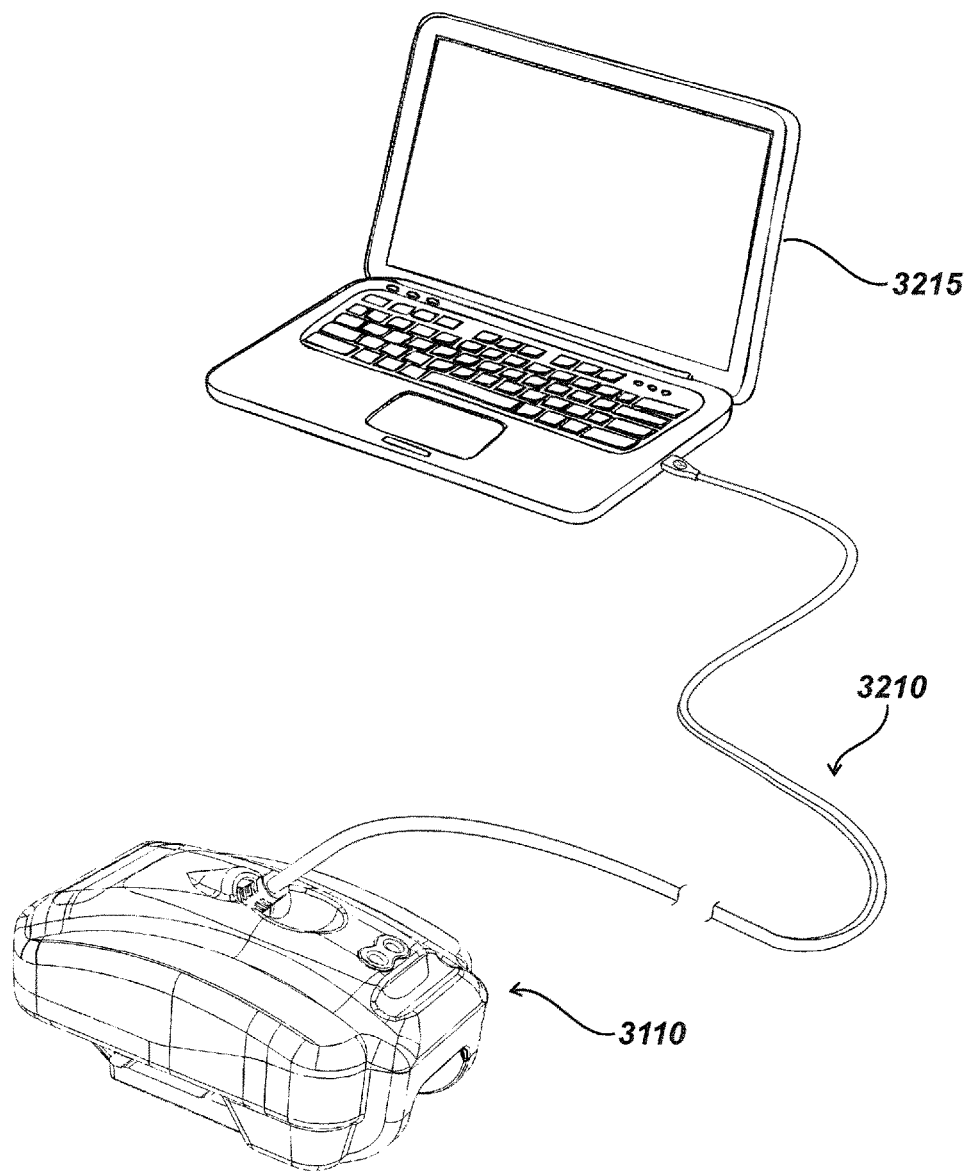
FIG. 32 illustrates details of an embodiment of the battery pack of 31A receiving an update from a PC.

FIG. 32 illustrates details of an embodiment of a battery pack 3110 of (FIG. 31A) receiving a data transfer from a computer, such as a personal computer (PC) 3215. For example, the data transfer may include a code or instruction update (e.g., update firmware or other software for use in the battery or other devices coupled to the battery such as tools or instruments) and/or data. A battery code update may be downloaded on PC 3215 and provided to Lucid interface battery 3110 via a USB cord 3210 or other wired or wireless interface as known or developed in the art for communicating data and information. Additional example details are described subsequently herein with respect to FIGS. 33-41.

In some embodiments, an asynchronous mechanism (denoted herein as a "viral" mechanism) may be used to transfer data and/or code/instructions between various Lucid battery systems devices. The transfers may include, for example, updated code/instructions such as firmware or software for execution in intelligent batteries and/or other coupled devices. This may be done to facilitate firmware or other software updates to various system components during normal operations use or through specific update/synchronization operations.

Figure 33:
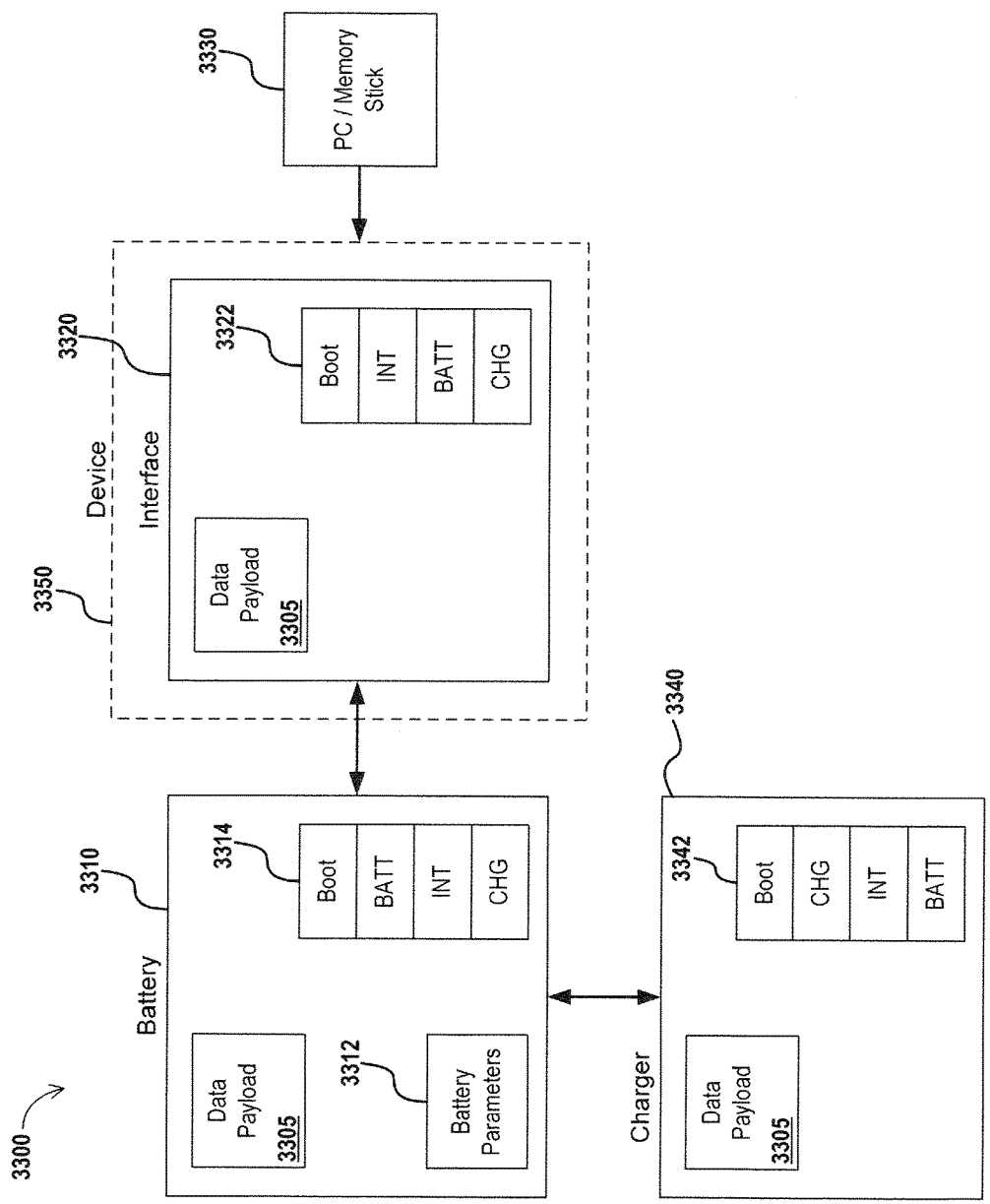
FIG. 33 illustrates details of an embodiment of a battery update system.

For example, FIG. 33 illustrates details of an embodiment of a battery update mechanism 3300 for updating firmware (or other software or data). In an exemplary embodiment, updates may be communicated from a PC or memory stick 3330 to an interface module 3320 via, for example, executable code, which may be written to a memory element 3322.

When the battery module 3310 is connected to the interface module 3320, such executable code may be written to a memory element 3314 on the battery module 3310, when the battery module 3310 is mated with the interface module 3320. Similarly, code may be written to a memory element 3342 on the charging module 3340 when the battery module 3310 (with newly updated code) is mated with charging element 3340. Memory elements 3314, 3322, and 3342 may be non-volatile memory, such as an EEPROM. One or more battery parameters 3312, such as capacity, charge/discharge cycles, cycle count, battery chemistry, serial number, and voltage may be stored on a memory element, such as a flash memory element or other data storage element, in battery module 3310.

Figure 34:
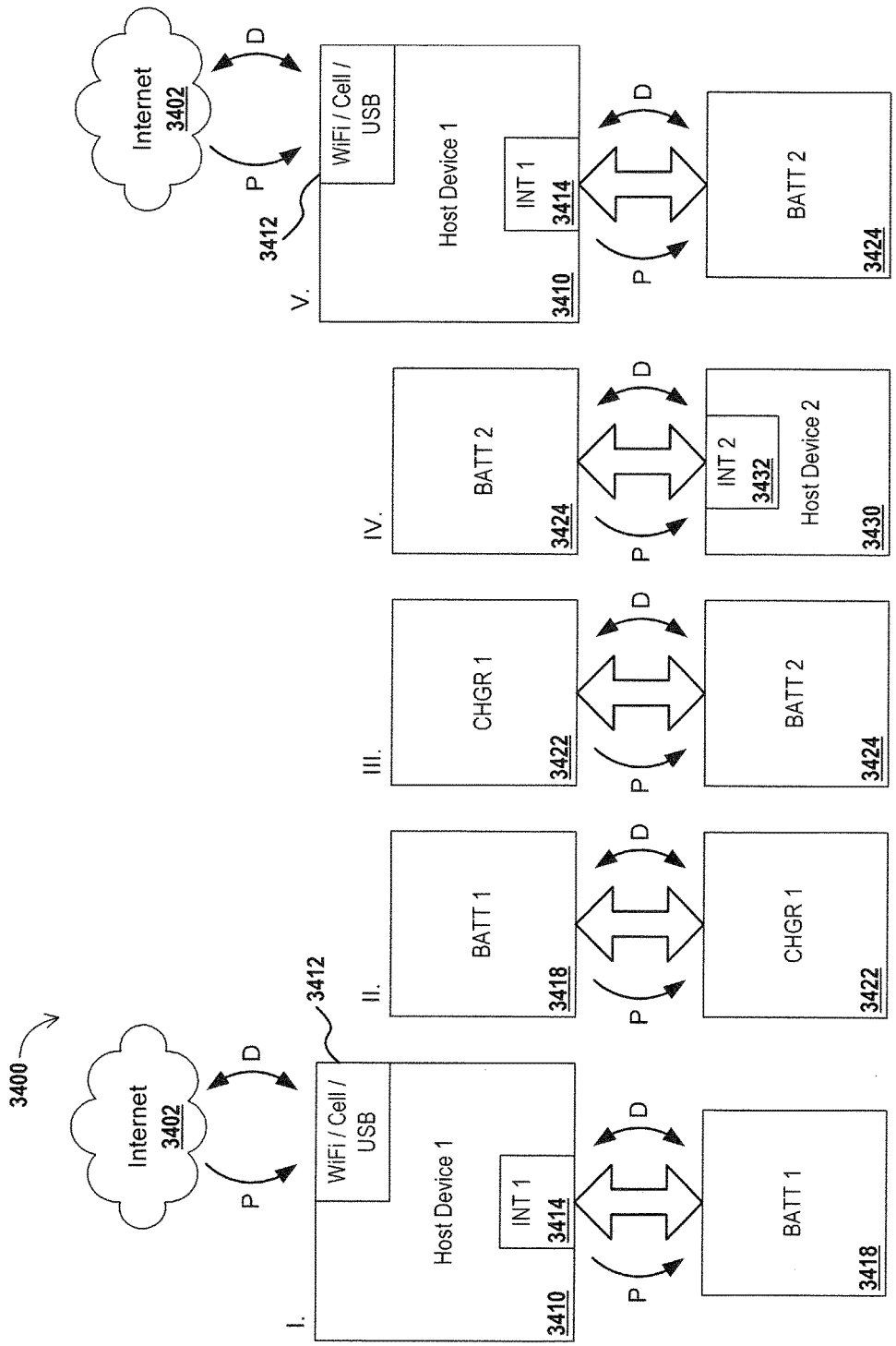
FIG. 34 illustrates details of an embodiment of a viral programming system.

FIG. 34 illustrates an example embodiment 3400 of a viral or viral-like scheme for transferring code, data, or other information, such as executable code or other instructions, operation device and/or battery data, and/or other information across one or more modules and devices. Element I through Element V of FIG. 34 illustrate embodiments of exemplary data transfer stages related to both the viral distribution of updated code/program data and the viral recovery of data on devices, such as on a connected tool or instrument, a Lucid battery, a Lucid charger and/or a Lucid interface device to computer system such as a remote server or database, such as a cloud-based server or database or other computer system or device.

At stage 34I, a first host device 3410 may include a module for providing a network or Internet connection, such as to provide a connection to the Internet 3402 using a wireless WiFi 3412 or cellular modem connection (or other network connection, such as a wired connection via USB, Ethernet, etc.). Host device 3410 may have a firmware/software update available for a first lucid interface 3414.

For example, the first host device 3410 may download the firmware update, and provide the update to the first Lucid interface. A first Lucid battery 3418 may be connected to first host device 3410, e.g., by mating the adapted with a battery connector on the host device 3410, via a first Lucid interface 3414. When first Lucid battery 3418 is connected to first Lucid interface 3414, a software version check may be performed to determine whether first Lucid battery 3418 or first Lucid interface 3414 holds preferential executable code (typically, a later version number), as shown in FIG. 22. As both first Lucid interface 3414 and first Lucid battery 3418 may independently hold in their respective memory elements executable code for the Lucid Battery, Lucid Charger and/or Lucid Interface, the Software Version Check may be applied to each executable code individually. Lucid Interface 3414 may have preferential executable code, and may transfer that executable code "P" to first Lucid battery 3418. Alternately, or in addition, Lucid battery 3418 and Lucid interface 3414 may exchange data "D," such as data collected from battery operation and/or operation of devices connected to the battery, such as tools, instruments, etc.

At stage 34II, first Lucid Battery 3418 may be connected to a first Lucid charger 3422, which may be the case if first Lucid battery 3418 has been used to depletion or partial depletion and requires recharge. In some embodiments, the first Lucid charger 3422 may not be configured to provide a network or internet connection, and is thus an "unreachable device" to the outside world. When first Lucid battery 3418 is connected to first Lucid charger 3422, a software version check and/or data check may be performed. As first Lucid Battery 3418 may have been recently updated by first Lucid interface 3414, first Lucid battery 3418 may be found to have preferential executable code, and first Lucid charger 3422 may receive updated executable code "P" from first Lucid battery 3418. Alternately, or in addition, first Lucid battery 3418 and first Lucid charger 3422 may exchange data "D."

At stage 34III, a second Lucid Battery 3424 may be connected to first Lucid charger 3422, such as for example, if Lucid Battery 2 has been used to depletion or partial depletion and requires recharge. When second Lucid battery 3424 is connected to first Lucid charger 3422, a software version check and/or data check may be performed. As first Lucid charger 3422 may be recently updated by first Lucid battery 3418, first Lucid charger 3422 may be found to have preferential executable code, and second Lucid battery 3424 may receive updated executable code "P" from a first Lucid charger 3422. Alternately, or in addition, second Lucid battery 3424 and first Lucid charger 3422 may exchange data "D."

At stage 34IV, second Lucid battery 3424 may be connected to a second Host Device 3430 via a second Lucid interface 3432. In this particular example, second host Device 3430 may not be configured with an internet connection and is thus an "unreachable device" to the outside world. When a second Lucid battery 3424 is connected to second host device 3430, a software version check may be performed. As second Lucid battery 3424 was recently updated by first Lucid charger 3422, second Lucid battery 3424 may be found to have preferential executable code, and second Lucid interface 3432 may receive updated executable code "P" from second Lucid battery 3424. Alternately, or in addition, first Lucid battery 3424 and second Lucid interface 3432 may exchange data "D."

At stage 34V, the second Lucid battery 3424 may be again connected to Host Device 1 by means of first Lucid Interface 3414. When second Lucid battery 3424 is connected to first Lucid interface 3414, a software version check may be performed. If first Lucid interface 3414 has received an update in the intervening time, it may be found to have preferential executable code, and second Lucid battery 3424 may receive updated executable code from first Lucid interface 3414. Alternately, or in addition, second Lucid battery 3424 and first Lucid interface 3414 may exchange data "D."

Still referring to stage V, the data "D", which may be received by first Lucid interface 3414 may include data "D" from first Lucid charger 1, data "D" from Lucid Interface 2, and/or data "D" from Lucid Battery 2. Although Lucid charger 3422, second Lucid interface 3432, and second Lucid battery 3424 are not configured with an internet connection 3402, the Viral Distribution and Viral Recovery mechanisms herein described have provided a path to the internet 3402 via first host device 3410 through first Lucid interface 3414. Data "D" are exchanged with a remote server or database such as a cloud-based server or database through the internet 3402.

As shown in FIG. 34 at stages I-V, various types of data may be shared across one or more modules or devices in the above described examples. For example, one or more data payload parameters, such as those described in the example Data Payload Table (Table I) below may be exchanged across a battery interface (on a host device), one or more batteries, one or more charging modules, and a computer system or cloud-based server or database, which may be provided through the internet 3402.

TABLE I

Example Data Payloads
Data Payload

| | | | | |
|---|---|---|---|---|
| Real Time Voltage | Battery Born-on Date | Interface Born-on Date | Charger Duration of Attempts to Charge Non-Lucid Battery | Instrument Stress History |
| Real Time Current | Battery Firmware Version | Interface Firmware Version | Instrument Serial No. | Instrument Total Run Time |
| Real Time Temperature | Current Battery State-of-Charge | Interface Idle Time | Instrument Born-on Date | Instrument Idle Time |
| Real Time State-of-Charge | Last Known Battery State-of-Charge | Interface Hardware Version | Instrument Hardware Version | Instrument Image/Video/Audio Data |
| Battery Serial No. | Number of Battery Charge and Discharge Cycles | Charger Serial No. | Instrument Firmware Version | Instrument Operator Generated Data |
| Battery Chemistry | Battery Charge and Discharge history | Charger Born-on date | Instrument Software Version | Instrument to Instrument Communications |
| Battery Nominal Voltage | Number of Times Lucid Battery Used on Non-lucid Device | Charger Hardware Version | Instrument Software Crash Information | Instrument Number of Uses While Powered by a Non-lucid Battery |
| Battery Rated Capacity | Duration of Time Lucid Battery Used on Non-lucid Device | Charger Firmware Version | Instrument Location History | Instrument Duration of Uses While Powered by a Non-lucid Battery |
| Battery Hardware Version | Battery Temperature History | Charger Idle Time | Instrument Operator | Instrument Temperature History |
| Battery Idle Time | Interface Serial number | Charger Number of Attempts to Charge Non-lucid Battery | Instrument Odometer | Data Time Stamps |

In the example of FIG. 34, various host, charger, and battery device connections are shown for purposes of illustration. It is noted, however, that many other permutations of devices and connections may be done in various embodiments. For example, a battery may be connected to multiple chargers and/or host devices (along with associated data transfers) before being able to transfer data for Internet or other network provisioning to computer systems or remote servers. In addition, the functionality described herein with respect to the host device 1 may similarly be implemented in charger devices, tools, instruments, or other electronic devices in various configurations.

Figure 35:
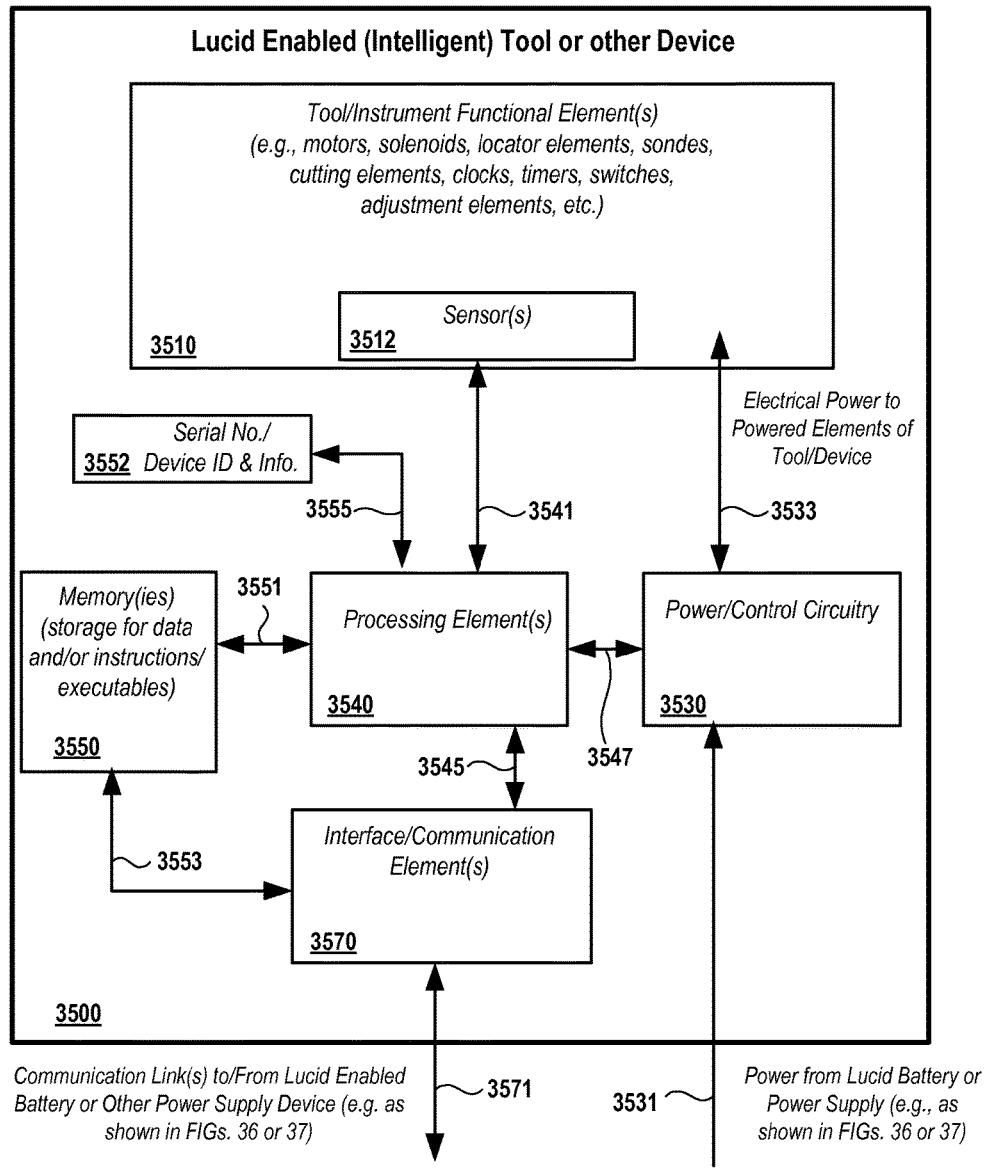
FIG. 35 illustrates details of an embodiment of an intelligent (Lucid) device such as a tool, instrument, or other electronic device.

FIG. 35 illustrates details of an example embodiment 3500 of an intelligent (Lucid) tool, instrument, or other device (e.g., a portable computer system, buried object locator, cutting or sawing tool, drilling tool, pressing tool, video inspection system, lighting device, etc.). Device 3500 provides some form of utility such as cutting or other mechanical operations, lighting or imaging, signal processing, measurement, analysis, and the like. This may be done through functional element(s) 3510 which may include one or more sensors 3512 and may be powered by a power source such as a Lucid battery as described herein.

Device 3500 may include one or more processing elements 3540 along with one or more memories 3550 coupled to the processing element and to other elements (e.g., to interface/communication element 3570 or other elements (not shown)). Device 3500 may include a power and control circuit element 3530 which may be coupled to the processor 3540 via an analog or digital connection 3547 to facilitate provision of power and/or control to the device's functional element 3510 via connection 3533. Processing element 3540 may have a dedicated 3547 connection to power/control circuit 3530 or may used a shared connection such as a bus.

Data from sensor 3512 may be provided via a sensor connection 3541, such as a serial or parallel digital interface or analog interface, and sensed data or information may be stored in memory 3550. Device 3500 may have a unique serial number/device ID 3552 which may be stored in fixed or rewritable memory 3552. Memory 3552 may have a separate connection 3555 to processing element 3540 (and/or to other elements, not shown) or may used a shared connection such as a data bus, serial connection, etc. Memory 3552 may also include other data or information about the device and may be either a separate memory space or part of memory 3550.

One or more interface/communication element 3570 may be used to transfer data, code, or other information between device 3500 and a coupled device, such as a Lucid battery as described previously herein and/or as shown in FIGS. 36 and 37. Data may be transferred between processing element 3540 via a communications interface 3545, and communication element 3570 may be further coupled to other elements, such as memories 3550, 3552, to allow for direct access to stored data or code, such as via interface 3553. Communication element 3570 may be coupled to a communication link or links 3571 to transfer and receive data from a connected device such as a Lucid battery as described herein. Power from a Lucid battery or other power supply device may be provided to device 3500 via connection 3531. In some embodiments, device 3500 may include a network connection element (not shown), such as a wired or wireless Internet connection, and may function as a host device as described previously in FIG. 34.

Figure 36:
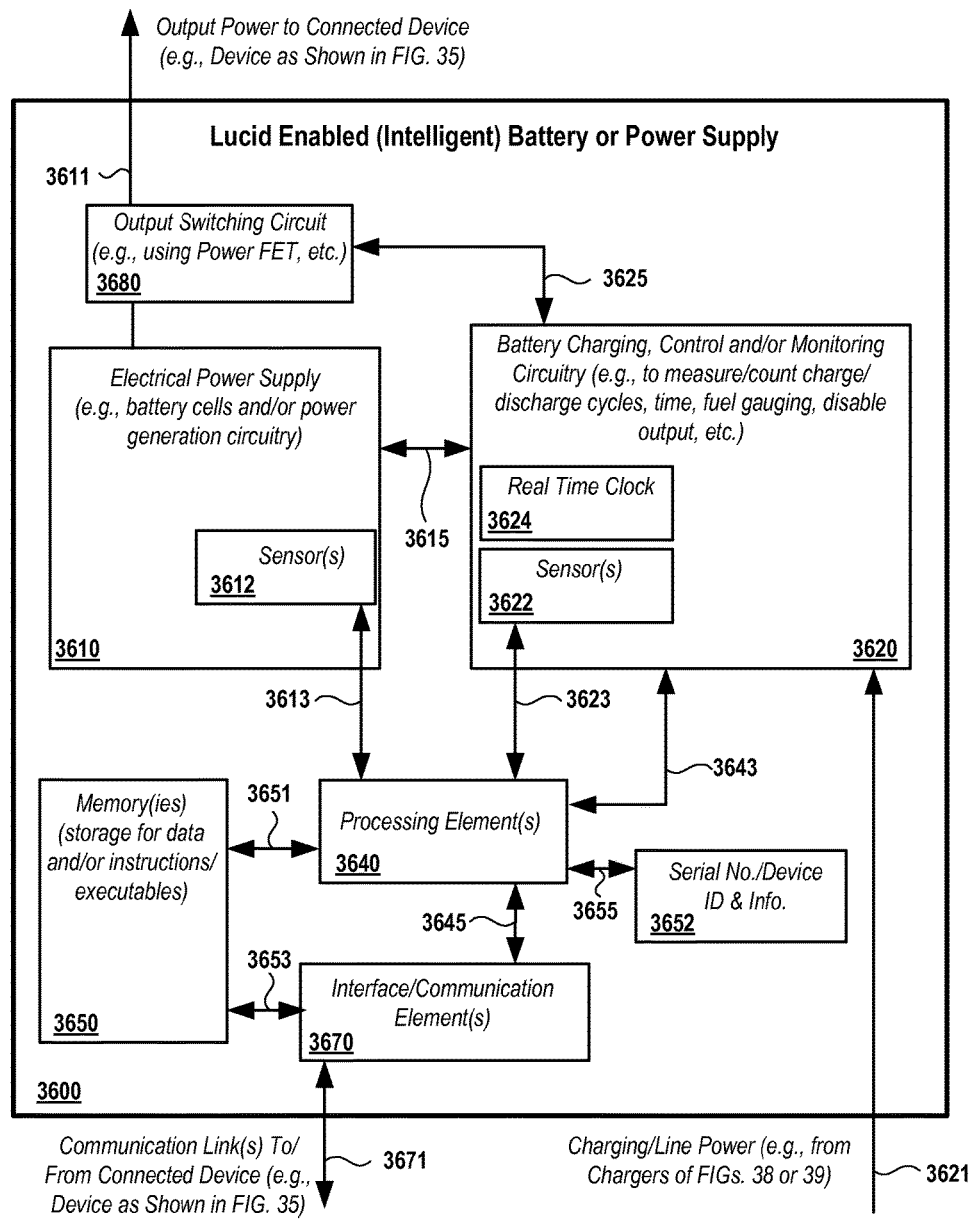
FIG. 36 illustrates details of an embodiment of an intelligent (Lucid) battery pack for powering a device such as shown in FIG. 35.

FIG. 36 illustrates details of one embodiment 3600 of a Lucid battery. Battery 3600 may be used to power various devices, such as, for example, a tool, instrument, portable computer system, buried object locator, cutting or sawing tool, drilling tool, pressing tool, video inspection system, lighting device, or other powered devices. Battery 3600 provides electrical power through a power supply element, typically one or more battery cells 3610. One or more sensors 3612 may be coupled to the cells or other battery components, such as conductors, switches or other circuit element, cases or housing, and the like to sense battery pack conditions.

The power supply/cells 3610 may be coupled directly to power output conductors 3611 or, in some embodiments, may include an output switching circuit 3680, such as a power FET circuit for turning the output on or off (or, in some embodiments, controlling output power such as by limiting voltage or current, etc.). Output control using switching circuit 3680 may be done based on conditions such as internal over-temperature, excessive current or power consumption, duty cycle limitations, mismatch between battery and connected device serial numbers or other information, time parameters (e.g., based on real time clock information), and the like. Output circuit 3680 may be controlled by a battery charging, control and/or monitoring circuit 3620 via connection 3625 and/or by a processing element 3640.

Control circuit 3620 may include additional elements such as one or more sensors 3622, a real time clock 3624, and related circuit elements (not shown). Control/monitoring circuit 3620 may include hardware, software, analog and/or digital electronics, and/or other circuit and/or mechanical elements to provide battery measurement, monitoring, and control functionality as described herein such as to measure/count charging/discharging rates, cycles, timing, fuel gauging, enabling, disabling power output, and the like. Power may be provided from a power source such as line power, a battery charger, etc., via connection 3621 which may be coupled to control circuit 3620 and/or directly to power supply 3610.

Battery operation may be controlled, in whole or in part, by one or more processing elements 3640, which may be coupled to one or more memories 3650, such as via connection 3651. Processing element 3640 may also be coupled to sensors 3612 and 3622, such as via connections 3613 and 3623, respectively, to receive sensory data. The sensor connections 3613, 3623 may be, for example, serial or parallel digital interfaces or analog interfaces, and sensed data or information may be stored in memory 3650 via connection 3651. Device 3600 may have a unique serial number/device ID 3652 which may be stored in fixed or rewritable memory 3652. Memory 3652 may have a separate connection 3655 to processing element 3640 (and/or to other elements, not shown) or may used a shared connection such as a data bus, serial connection, etc. Memory 3652 may also include other data or information about the device and may be either a separate memory space or part of memory 3650.

One or more interface/communication elements 3670 may be used to transfer data, code, or other information between battery 3600 and a coupled device, such as a host device, tool, charger, etc. as described herein and/or as shown in FIGS. 34, 35, 38 and 39. Data may be transferred between processing element 3640 via a communications interface 3645, and communication element 3670 may be further coupled to other elements, such as memories 3650, 3652, to allow for direct access to stored data or code, such as via interface 3653.

Communication element 3670 may be coupled to a communication link or links 3671 to transfer and receive data from a connected device such as a host device, tool, charger, etc. as described herein.

Figure 37:
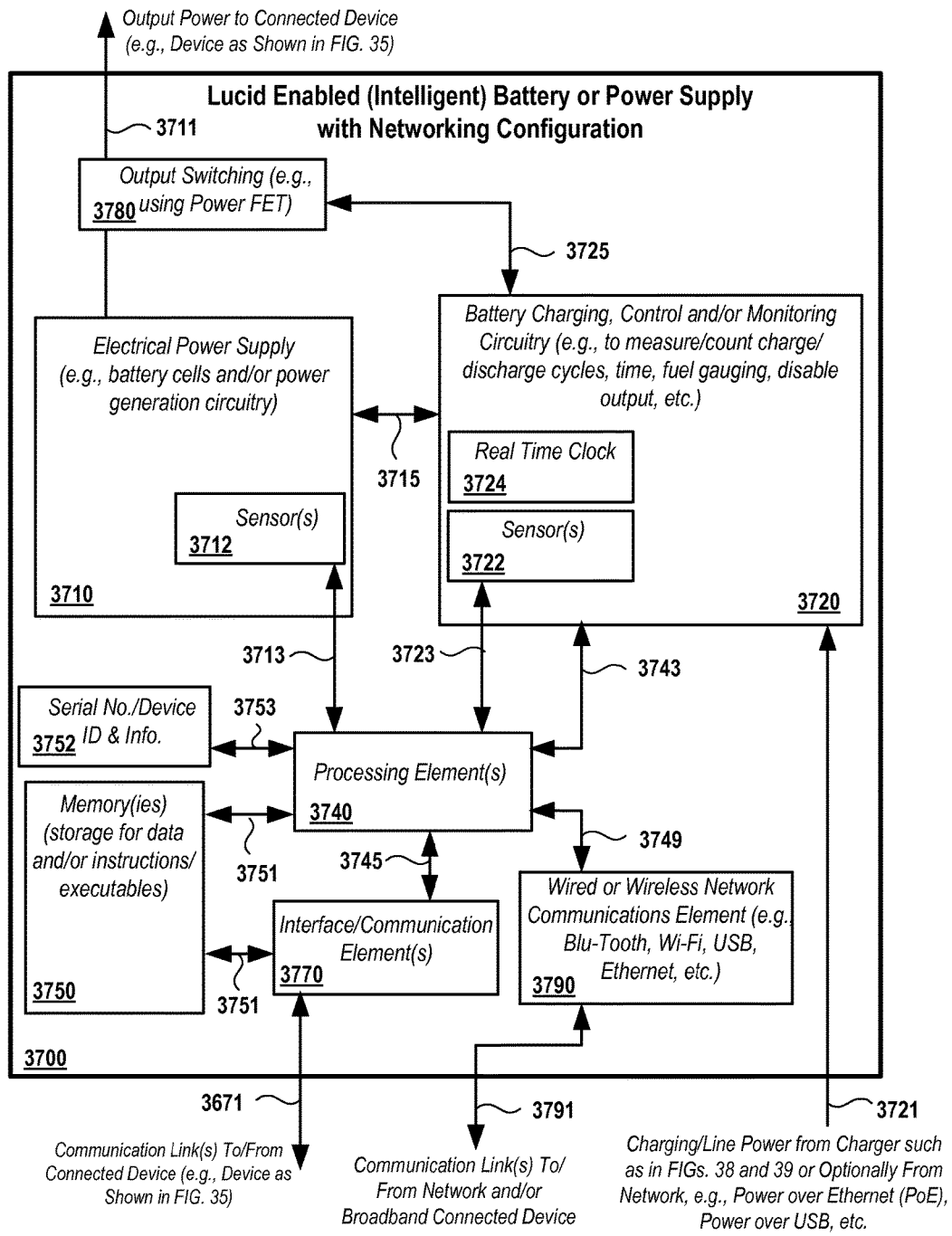
FIG. 37 illustrates details of another embodiment of an intelligent (Lucid) battery pack for powering a device such as shown in FIG. 35.

FIG. 37 illustrates details of another embodiment 3700 of a Lucid battery which is similar to embodiment 3600 but further includes one or more network communication elements 3790 to facilitate network communications via connection 3791.

Battery 3700 may be used to power various devices, such as, for example, a tool, instrument, portable computer system, buried object locator, cutting or sawing tool, drilling tool, pressing tool, video inspection system, lighting device, or other powered devices. Battery 3700 provides electrical power through a power supply element, typically one or more battery cells 3710. One or more sensors 3712 may be coupled to the cells or other battery components, such as conductors, switches or other circuit element, cases or housing, and the like to sense battery pack conditions.

The power supply/cells 3710 may be coupled directly to power output conductors 3711 or, in some embodiments, may include an output switching circuit 3780, such as a power FET circuit for turning the output on or off (or, in some embodiments, controlling output power such as by limiting voltage or current, etc.). Output control using switching circuit 3780 may be done based on conditions such as internal over-temperature, excessive current or power consumption, duty cycle limitations, mismatch between battery and connected device serial numbers or other information, time parameters (e.g., based on real time clock information), and the like. Output circuit 3780 may be controlled by a battery charging, control and/or monitoring circuit 3720 via connection 3725 and/or by a processing element 3740.

Control circuit 3720 may include additional elements such as one or more sensors 3722, a real time clock 3724, and related circuit elements (not shown). Control/monitoring circuit 3720 may include hardware, software, analog and/or digital electronics, and/or other circuit and/or mechanical elements to provide battery measurement, monitoring, and control functionality as described herein such as to measure/count charging/discharging rates, cycles, timing, fuel gauging, enabling, disabling power output, and the like. Power may be provided from a power source such as line power, a battery charger, etc., via connection 3721 which may be coupled to control circuit 3720 and/or directly to power supply 3710.

Battery operation may be controlled, in whole or in part, by one or more processing elements 3740, which may be coupled to one or more memories 3750, such as via connection 3751. Processing element 3740 may also be coupled to sensors 3712 and 3722, such as via connections 3713 and 3723, respectively, to receive sensory data. The sensor connections 3713, 3723 may be, for example, serial or parallel digital interfaces or analog interfaces, and sensed data or information may be stored in memory 3750 via connection 3751. Device 3700 may have a unique serial number/device ID 3752 which may be stored in fixed or rewritable memory 3752. Memory 3752 may have a separate connection 3755 to processing element 3740 (and/or to other elements, not shown) or may used a shared connection such as a data bus, serial connection, etc. Memory 3752 may also include other data or information about the device and may be either a separate memory space or part of memory 3750.

One or more interface/communication elements 3770 may be used to transfer data, code, or other information between battery 3600 and a coupled device, such as a host device, tool, charger, etc. as described herein and/or as shown in FIGS. 34, 35, 38 and 39. Data may be transferred between processing element 3640 via a communications interface 3745, and communication element 3770 may be further coupled to other elements, such as memories 3750, 3752, to allow for direct access to stored data or code, such as via interface 3753. Communication element 3770 may be coupled to a communication link or links 3671 to transfer and receive data from a connected device such as a host device, tool, charger, etc. as described herein.

Battery embodiment 3700 may also include a wired or wireless network communication element 3790, such as a wireless module (e.g., Blu-Tooth, Wi-Fi, Cellular, etc.) and/or wired module (e.g., USB, Ethernet, etc.) and may further include additional elements such as a web server module (not shown) and the like. Module 3790 may be connected to process 3740 via connection 3749 and may send and receive data or other information, such as code or instructions, via one or more communication links 3791, which may be wired or wireless links.

Figure 38:
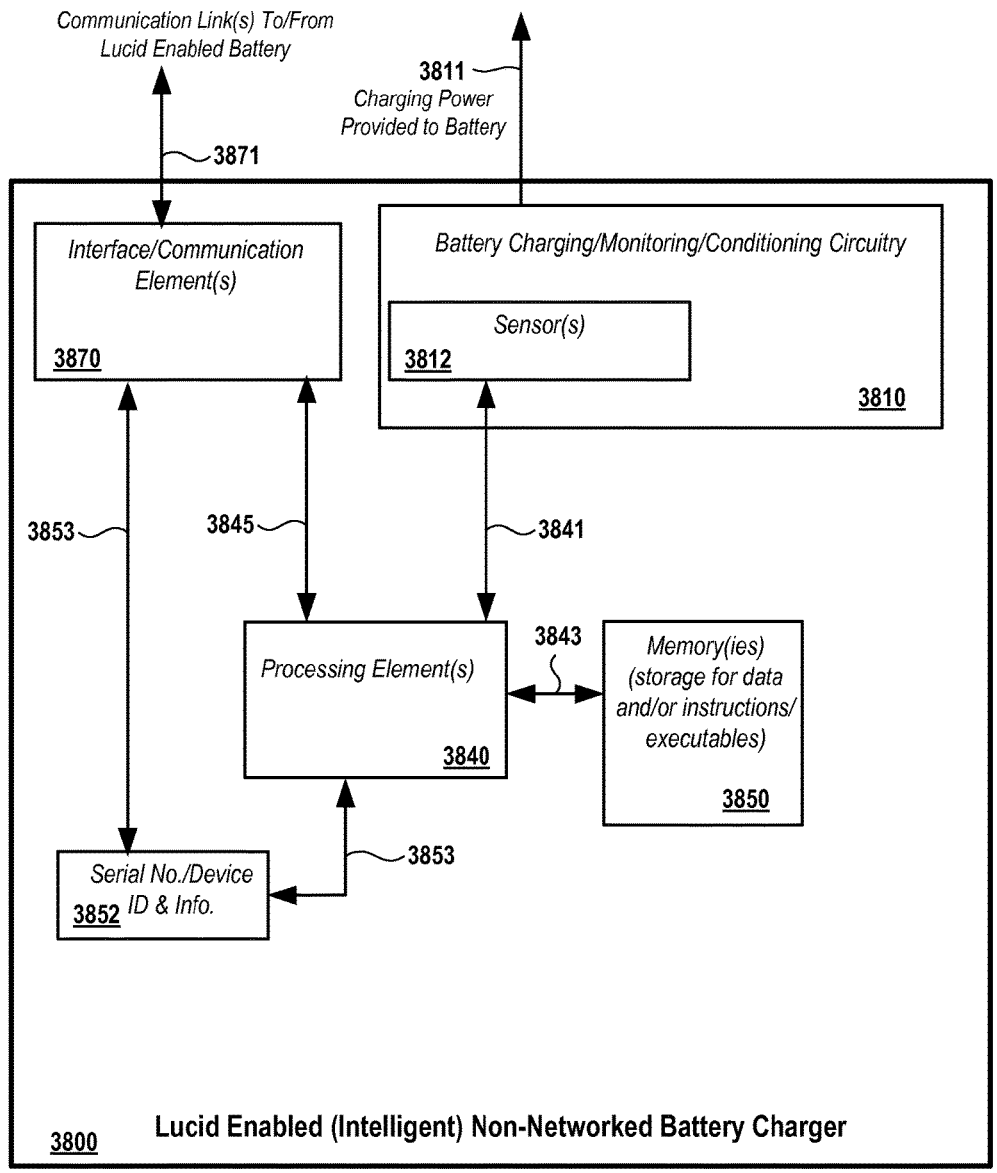
FIG. 38 illustrates details of an intelligent (Lucid) non-networked battery charger.

FIG. 38 illustrates details of an example embodiment 3800 of an intelligent (Lucid) non-networked battery charger device. Charger 3800 provides charging and data transfer functionality to enabled batteries such as the Lucid battery embodiments described herein. Power may be provided via charging power connection 3811 which may be controlled by a battery charging/monitoring/conditioning circuit 3810.

Charger 3800 may include one or more processing elements 3840 along with one or more memories 3850 coupled to the processing element and to other elements (e.g., to interface/communication element 3870 or other elements (not shown)). Charging circuit 3810 may including electronics, hardware, and/or software to measure battery information for a coupled battery and provide controlled charging power to the battery. Charge circuit 3810 may include one or more sensors 3812 to sense charging and/or related conditions and provide information via connection 3843 to processing element 3840. Processing element 3840 may be coupled to battery charging circuitry 3810 to control provision of power and/or to control signaling to the battery being charged. Processing element 3540 may have a dedicated connection to circuit 3810 or may use a shared connection such as a bus.

Data from sensor 3812 may be provided via a sensor connection 3841, such as a serial or parallel digital interface or analog interface, and sensed data or information may be stored in memory 3850. Charger 3800 may have a unique serial number/device ID which may be stored in fixed or rewritable memory 3852. Memory 3852 may have a separate connection 3855 to processing element 3840 (and/or to other elements, not shown) or may used a shared connection such as a data bus, serial connection, etc. Memory 3852 may also include other data or information about the device and may be either a separate memory space or part of memory 3850.

One or more interface/communication elements 3870 may be used to transfer data, code, or other information between charger 3800 and a coupled device, such as a Lucid battery as described previously herein and/or as shown in FIGS. 36 and 37. Data may be transferred between processing element 3840 via a communications interface 3845, and communication element 3870 may be further coupled to other elements, such as memories 3850, 3852, to allow for direct access to stored data or code, such as via interface 3853. Communication element 3870 may be coupled to a communication link or links 3871 to transfer and receive data from a connected device such as a Lucid battery as described herein. In some embodiments, charger 3800 may include a network connection element (not shown), such as a wired or wireless Internet connection, and may function as a host device as described previously in FIG. 34.

Figure 39:
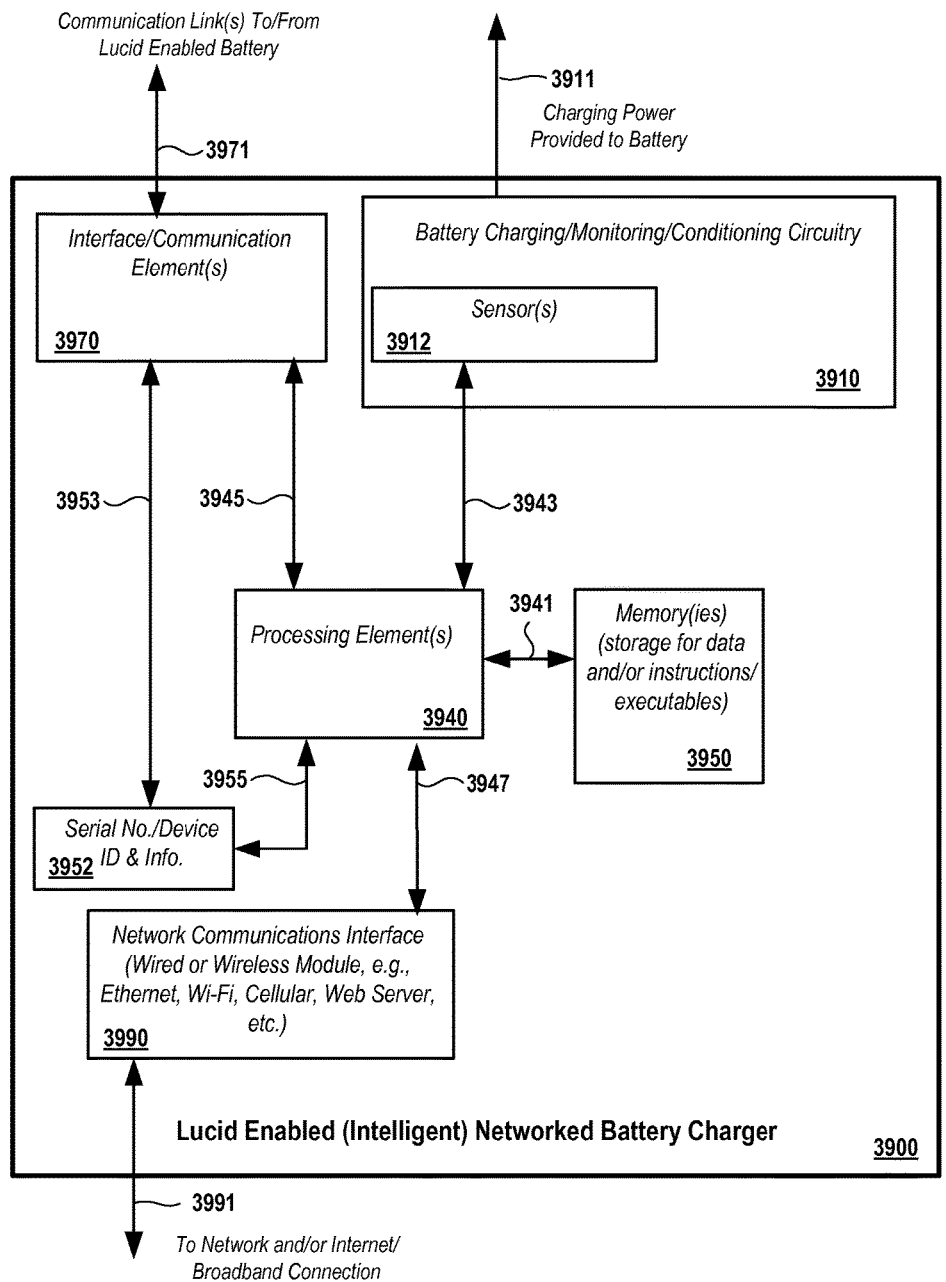
FIG. 39 illustrates details of another intelligent (Lucid) battery charger that is network enabled.

FIG. 39 illustrates details of another embodiment 3900 of an intelligent (Lucid) battery charger device. Charger 3900 may be similar to charger 3800 with the addition of networking capability including communications interface 3970 which allows networked data transfer via communication link 3971. In operation, charger 3900 provides charging and data transfer functionality to enabled batteries such as the Lucid battery embodiments described herein. Power may be provided via charging power connection 3911 which may be controlled by a battery charging/monitoring/conditioning circuit 3910.

Charger 3900 may include one or more processing elements 3940 along with one or more memories 3950 coupled to the processing element and to other elements (e.g., to interface/communication element 3970 or other elements (not shown)). Charging circuit 3910 may including electronics, hardware, and/or software to measure battery information for a coupled battery and provide controlled charging power to the battery. Charge circuit 3810 may include one or more sensors 3912 to sense charging and/or related conditions and provide information via connection 3943 to processing element 3940. Processing element 3940 may be coupled to battery charging circuitry 3910 to control provision of power and/or to control signaling to the battery being charged. Processing element 3940 may have a dedicated connection to circuit 3910 or may use a shared connection such as a bus.

Data from sensor 3912 may be provided via a sensor connection 3943, such as a serial or parallel digital interface or analog interface, and sensed data or information may be stored in memory 3950. Charger 3900 may have a unique serial number/device ID which may be stored in fixed or rewritable memory 3952. Memory 3952 may have a separate connection 3955 to processing element 3940 (and/or to other elements, not shown) or may used a shared connection such as a data bus, serial connection, etc. Memory 3952 may also include other data or information about the device and may be either a separate memory space or part of memory 3950.

One or more interface/communication elements 3970 may be used to transfer data, code, or other information between charger 3900 and a coupled device, such as a Lucid battery as described previously herein and/or as shown in FIGS. 36 and 37. Data may be transferred between processing element 3940 via a communications interface 3945, and communication element 3970 may be further coupled to other elements, such as memories 3950, 3952, to allow for direct access to stored data or code, such as via interface 3953. Communication element 3970 may be coupled to a communication link or links 3971 to transfer and receive data from a connected device such as a Lucid battery as described herein.

Charger embodiment 3900 may also include a wired or wireless network communication element 3990, such as a wireless module (e.g., Blu-Tooth, Wi-Fi, Cellular, etc.) and/or wired module (e.g., USB, Ethernet, etc.) and may further include additional elements such as a web server module (not shown) and the like. Module 3990 may be connected to processor 3940 via connection 3947 and may send and receive data or other information, such as code or instructions, via one or more communication links 3991, which may be wired or wireless links.

Figure 40:
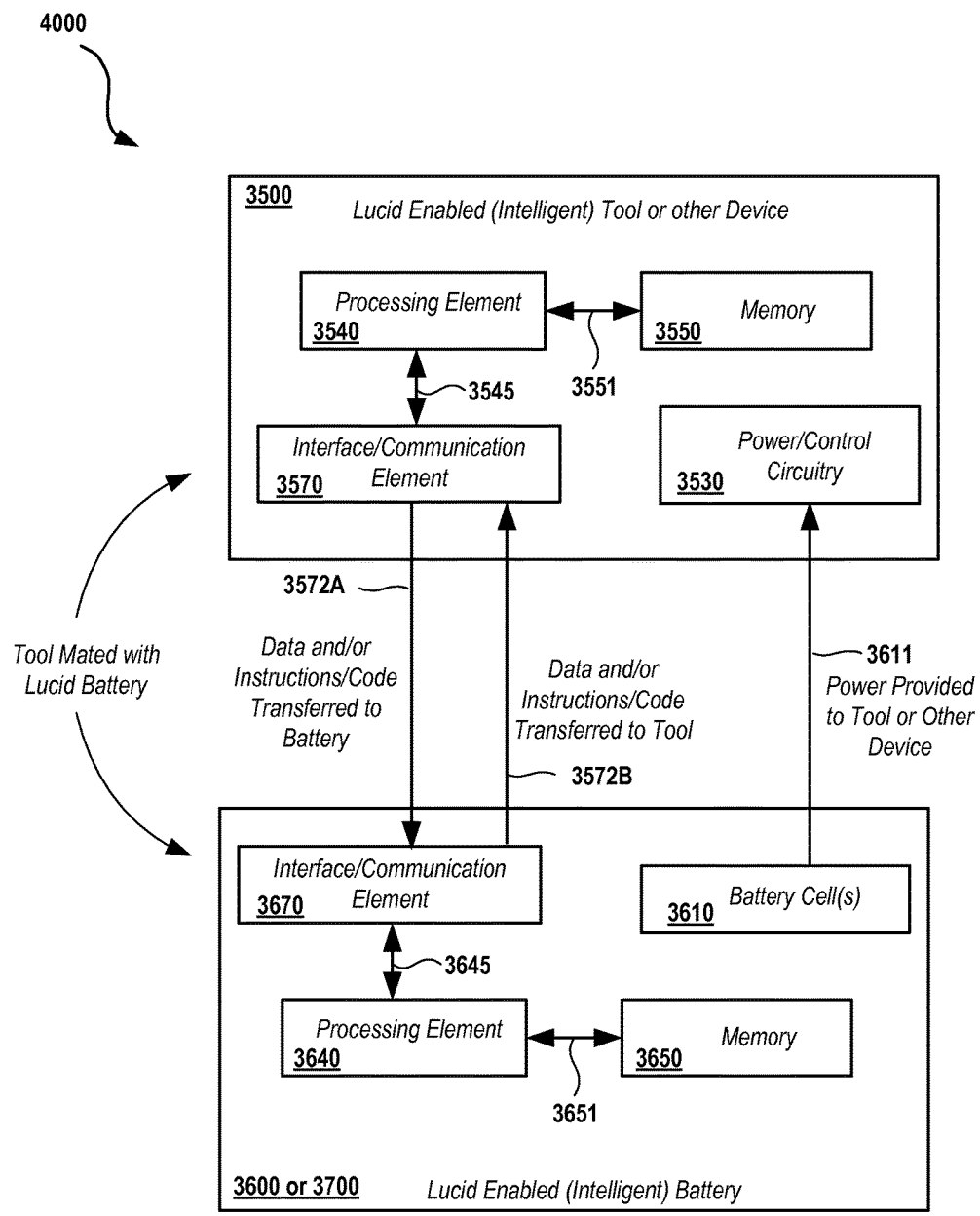
FIG. 40 illustrates details of an example connection mechanism for providing power and transferring code and/or data.

FIG. 40 illustrates details of an example connection 4000 between a Lucid enabled tool or other device, such as device embodiment 3500 as described previously herein, and a Lucid battery, such as battery embodiments 3600 or 3700 as described previously herein. As shown in FIG. 40, when a battery is coupled to an enabled device, power may be provided from the battery 3600 to the device 3500 via a power cable or other conductor 3611 and associated contacts or other connectors. In addition, data and/or instructions, such as firmware or software updates may be transferred from the tool or other device via wired communication connection 3572A, and likewise data and/or instructions may be transferred from the battery 3600 to the device 3500 via communication connection 3572B. For example, the latest operational code may be transferred between the devices and/or operational or other data may likewise be transferred. Data and/or code transfer may be done in this fashion to implement viral operations as described previously with respect to FIG. 34.

Figure 41:
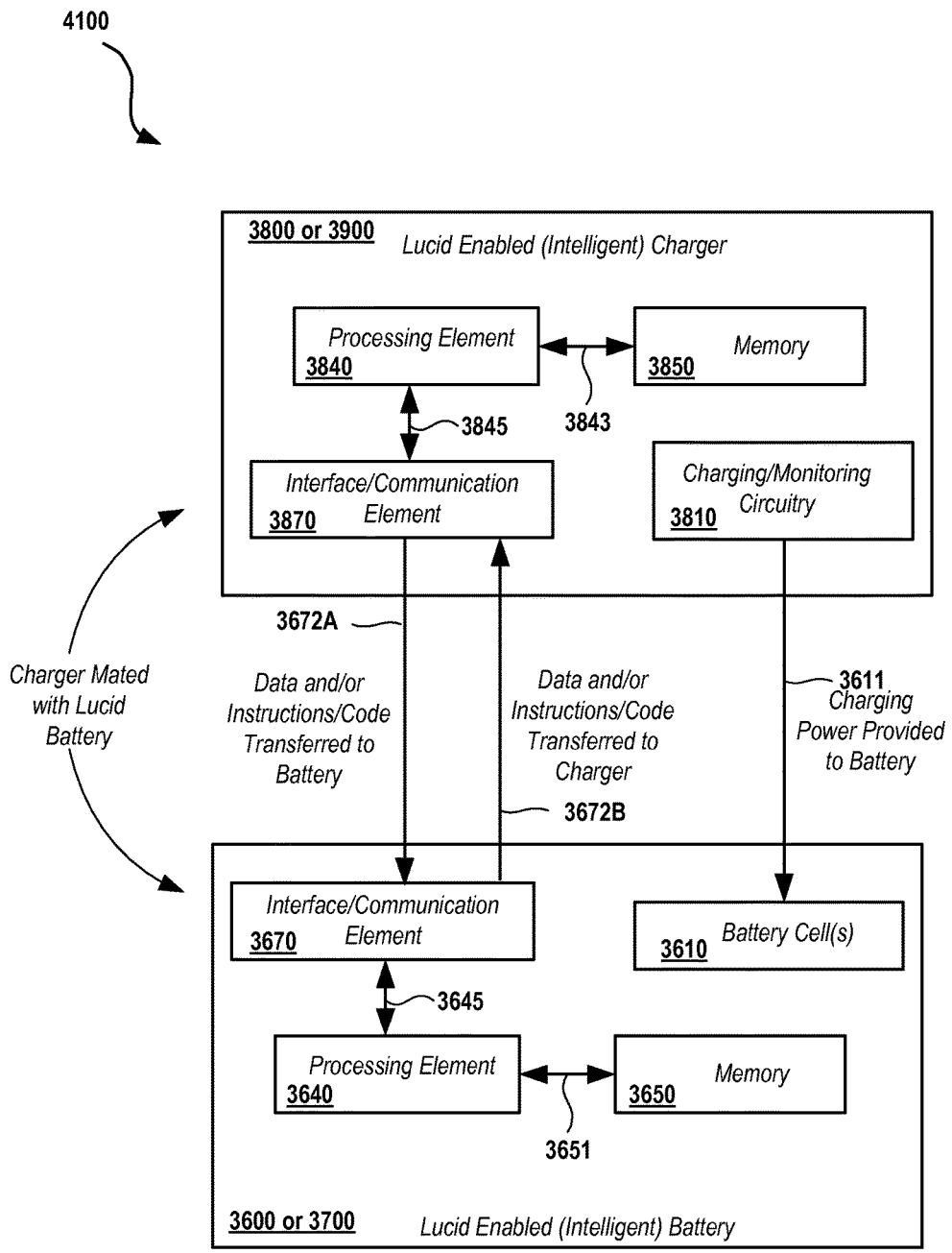
FIG. 41 illustrates details of an example connection mechanism for providing charging power and transferring code and/or data.

FIG. 41 illustrates details of another example connection 4100 between a Lucid charger embodiment 3800 or 3900 (or enabled device, such as a host device) as described previously herein, and a Lucid battery, such as battery embodiments 3600 or 3700 as described previously herein. As shown in FIG. 41, when a battery is coupled to an enabled charger, charging power may be provided from the charger 3800 to the battery 3600 via a power cable or other conductor 3611 and associated contacts or other connectors. In addition, data and/or instructions, such as firmware or software updates may be transferred from the charger via wired communication connection 3672A, and likewise data and/or instructions may be transferred from the battery 3600 to the charger 3800 via communication connection 3672B. For example, the latest operational code may be transferred between the devices and/or operational or other data may likewise be transferred. Data and/or code transfer may be done in this fashion to implement viral operations as described previously with respect to FIG. 34.

Figure 42:
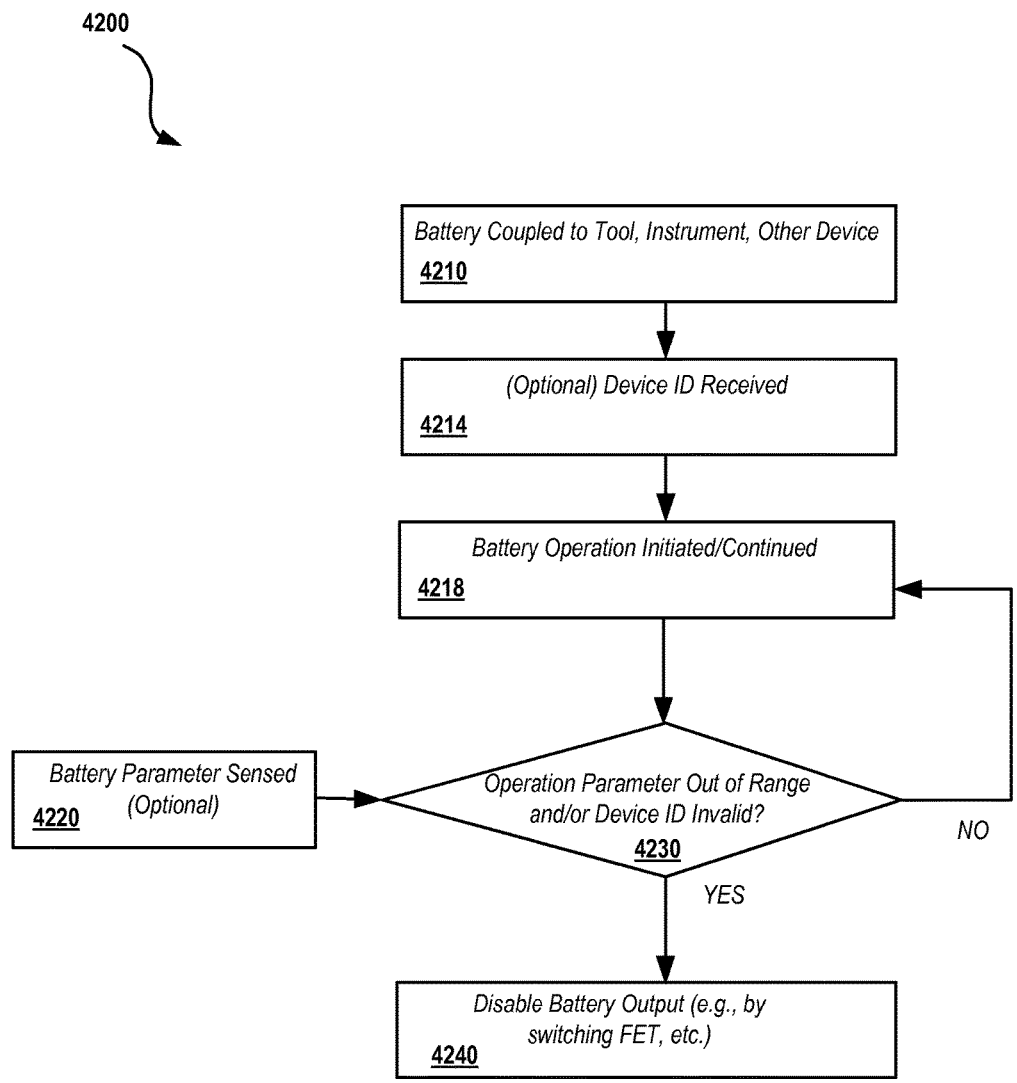
FIG. 42 illustrates details of an embodiment of a process for providing controlled battery output disablement based on improper connected device identification and/or battery or device operational parameters outside acceptable values.

FIG. 42 illustrates details of an example process embodiment 4200 for providing controlled smart disconnection of battery output at initial of a powering operation and/or during a powering operation. For example, process 4200 may begin at stage 4210 when a Lucid battery, such as batteries 3600 or 3700 as described previously herein are coupled to a battery powered device, such as device 3500 as described previously herein. A device ID associated with device 3500, such as the serial number stored in memory 3552 as shown in FIG. 35, may optionally be received by the battery at stage 4214. In some embodiments no device ID may be available, in which case stage 4214 may be ignored. At stage 4218 battery operation may be initiated or continued. In embodiments where batteries and/or connected devices include sensors or other monitoring elements, such as sensors 3512, 3612, 3622, and/or other sensor or monitoring elements, a battery parameter or condition may be sensed at stage 4220 and provided to a battery control circuit, such as control circuit 3620 as shown in FIG. 36. If the parameter is out of range and/or the device ID is a non-acceptable device (for example, if the device has a serial number matched to particular batteries and/or users associated with the device or battery, or if the device requires more power or power at different voltages or currents than the battery can provide, or for other improper combinations), the battery output may be limited or otherwise controlled and/or may be disabled entirely. This may be done by, for example, switching an output circuit, such as output switching circuit 3680 of FIG. 36, to an off state (or otherwise switching the output, such as through use of FETs, relays, etc.) at stage 4240. If operation is within range and the device ID is acceptable, normal battery operation may be continued at stage 4218.

In some configurations, the apparatus or systems described herein may include means for implementing features or providing functions described herein. In one aspect, the aforementioned means may be a module including a processor or processors, associated memory and/or other electronics in which embodiments of the invention reside, such as to implement image and/or video signal processing, switching, transmission, or other functions to process and/or condition camera outputs, control lighting elements, control camera selection, or provide other electronic or optical functions described herein. These may be, for example, modules or apparatus residing in camera assemblies, camera and lighting assemblies, or other assemblies disposed on or within a push-cable or similar apparatus.

In one or more exemplary embodiments, the electronic functions, methods and processes described herein and associated with battery packs and battery chargers may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to batteries, battery systems, tools, instruments, chargers, and other described devices may be implemented or performed in one or more processing elements using elements such as a general or special purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Processing elements may include hardware and/or software/firmware to implement the functions described herein in various combinations.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use various embodiments. Various modifications to these embodiments will be readily apparent to those skilled in the art, and the generic principles defined herein may be applied to other embodiments without departing from the spirit or scope of the disclosure.

Accordingly, the presently claimed invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with the appended claims and their equivalents.

We claim:

1. A battery, comprising:
    an outer casing assembly;
    a thermally conductive metallic structural housing element having a bottom, four sides, and a top enclosing an interior volume, and the thermally conductive structural housing element dimensioned and sized to house a battery assembly including a plurality of one or more battery cells in the interior volume, the thermally conductive structural housing element and including an opening in the top for placement of the battery assembly within the interior volume;
    a lid element shaped and sized to cover the opening in the top of the thermally conductive structural housing element and mechanically strengthen the thermally conductive structural housing element, the lid element including a printed circuit board (PCB) assembly including electrical contacts to electrically couple the one or more battery cells to a first coupled battery-powered tool device consisting of one or more of a utility locator, a utility locator transmitter, a drill a camera control unit (CCU), and a power saw;
    a vent assembly including a pressure relief valve and one or more openings and a semi-permeable membrane positioned across the one or more openings configured to allow exchange of gases to and from the thermally conductive structural housing element interior volume and restrict entry of water into the thermally conductive structural housing element interior volume; and
    an electronic circuit on the PCB assembly including a non-transitory memory storage medium and a processing element operatively coupled to the non-transitory memory and programmed with instructions in the non-transitory memory to monitor battery cell charge and discharge states and numbers of cycles and to transfer, automatically upon coupling of the battery to the first coupled battery-powered device, a new version of processor-executable code stored in the non-transitory memory of the battery to a non-transitory memory of the first coupled battery-powered device.

2. The battery enclosure of claim 1, wherein the one or more contact assemblies comprise a plurality of contact assemblies, and wherein a first subset of the plurality of contact assemblies provides an electrical power connection between the battery assembly and the first coupled battery-powered device and a second subset of the plurality of contact assemblies provides a data connection between the battery assembly and the first coupled battery-powered device for transferring processor-executable code to the battery-powered tool device.

3. The battery enclosure of claim 1, wherein the PCB includes a battery control element comprising an electronic circuit programmed to provide information on a battery assembly state and/or operating condition.

4. The battery enclosure of claim 1, wherein the memory and processing element of the battery are programmed to transfer data stored in the non-transitory memory of the battery, including battery charge and discharge data, to the non-transitory memory of the first coupled battery-powered tool device.

5. The battery enclosure of claim 4, wherein the memory and processing element of the battery are programmed to transfer data stored in the non-transitory memory of the battery to a non-transitory memory of a second coupled battery powered tool device different from the first coupled battery-powered tool device.

6. The battery enclosure of claim 5, wherein the memory and processing element of the battery are programmed to transfer processor-executable code stored in the non-transitory memory of the battery to a non-transitory memory of a third coupled device, different than the first coupled battery-powered tool device and the second coupled battery-powered tool device, to reprogram executable code in the third coupled device.

7. The battery enclosure of claim 4, wherein the memory and processing element of the battery are programmed to receive data from the non-transitory memory of the first coupled battery-powered tool device and store the received data in the non-transitory memory of the battery.

8. The battery enclosure of claim 7, wherein the memory and processing element of the battery are programmed to transfer the data received from the non-transitory memory of the first coupled battery-powered tool device to a non-transitory memory of a second coupled device-different from the first coupled battery powered device.

9. The battery enclosure of claim 1, wherein the first coupled battery-powered device is a utility locator and processor-executable code stored in the non-transitory memory of the battery is transferred to a non-transitory memory of the utility locator to reprogram executable code in the utility locator for subsequent execution thereon.

10. The battery enclosure of claim 1, wherein the first coupled battery-powered tool device is a camera control unit (CCU) of a video inspection system and processor-executable code stored in the non-transitory memory of the battery is transferred to a non-transitory memory of the CCU to reprogram executable code in the CCU for execution thereon.

11. The battery enclosure of claim 1, wherein the first coupled battery-powered tool device is a video camera system and processor-executable code stored in the non-transitory memory of the battery is transferred to a non-transitory memory of the video camera system to reprogram executable code in the video camera system for execution thereon.

12. A rechargeable battery, comprising:

an outer casing assembly;

a rechargeable battery assembly including one or more battery cells;

a single piece thermally conductive metallic structural housing element substantially enclosing an interior volume and having a top opening for placing the rechargeable battery assembly into the interior volume;

a circuit element to electrically couple one or more battery cells of the battery assembly to a battery-powered tool;

a vent assembly including one or more openings and a semi-permeable membrane positioned across the one or more openings to allow exchange of gases to and from the interior volume and restrict entry of water into the interior volume; and an electronic circuit including a non-transitory memory storage medium and a processing element programmed to transfer, automatically upon coupling of the battery to the battery-powered device, a new version of processor-executable code stored in the non-transitory memory of the battery to a non-transitory memory of the battery-powered device for replacement of existing executable code thereon, wherein the battery-powered tool is a utility locator, camera control unit of a video inspection system, and a video camera system.

13. The rechargeable battery of claim 12, wherein the non-transitory memory storage medium and processing element are programmed to transfer processor executable code stored in the memory to a non-transitory memory of the battery-powered device to replace a different version of executable code in the battery-powered tool.

14. The rechargeable battery of claim 12, wherein the memory and processing element of the battery are programmed to transfer data stored in the non-transitory memory of the battery to a non-transitory memory of the battery-powered tool.

15. The rechargeable battery of claim 14, wherein the memory and processing element of the battery are programmed to receive data from the non-transitory memory of the battery-powered device and store the received data in the non-transitory memory of the battery.

16. The rechargeable battery of claim 14, wherein the memory and processing element of the battery are programmed to transfer the data received from the non-transitory memory of the battery-powered tool to a second coupled battery-powered tool different from the battery-powered tool.

* * * * *